(12) United States Patent
Fujimaki

(10) Patent No.: US 7,381,517 B2
(45) Date of Patent: Jun. 3, 2008

(54) CURABLE COMPOSITION AND IMAGE FORMING MATERIAL CONTAINING THE SAME

(75) Inventor: Kazuhiro Fujimaki, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/075,768

(22) Filed: Mar. 10, 2005

(65) Prior Publication Data

US 2005/0202343 A1 Sep. 15, 2005

(30) Foreign Application Priority Data

Mar. 15, 2004 (JP) .......................... P.2004-073071

(51) Int. Cl.
*G03F 7/00* (2006.01)
*G03F 7/004* (2006.01)
*G03F 7/028* (2006.01)

(52) U.S. Cl. ............................ 430/270.1; 430/270.15; 430/270.18; 430/270.2; 430/944; 430/913

(58) Field of Classification Search ............. 430/270.1, 430/916, 926
See application file for complete search history.

(56) References Cited

U.S. PATENT DOCUMENTS

| | | | |
|---|---|---|---|
| 5,814,431 A | | 9/1998 | Nagasaka et al. |
| 5,879,772 A * | | 3/1999 | Morishima et al. ......... 428/64.1 |
| 5,958,650 A * | | 9/1999 | Wolleb et al. ......... 430/270.19 |
| 5,962,657 A * | | 10/1999 | Wolleb et al. ............... 534/696 |
| 6,413,607 B1 * | | 7/2002 | Kasada et al. ............... 428/64.1 |
| 6,660,446 B2 * | | 12/2003 | Shimada et al. ......... 430/270.1 |
| 6,727,037 B2 * | | 4/2004 | Nakamura ............... 430/270.1 |
| 6,759,177 B2 * | | 7/2004 | Shimada et al. ......... 430/270.1 |
| 6,770,422 B2 * | | 8/2004 | Nakamura et al. ....... 430/286.1 |
| 6,797,449 B2 * | | 9/2004 | Nakamura et al. .......... 430/160 |
| 6,830,861 B2 * | | 12/2004 | Takashima et al. ......... 430/138 |
| 6,838,222 B2 * | | 1/2005 | Aoshima et al. ............. 430/176 |
| 6,884,560 B2 * | | 4/2005 | Yanaka et al. ............... 430/138 |
| 2004/0023146 A1 | | 2/2004 | Maemoto et al. |
| 2004/0048195 A1 | | 3/2004 | Deroover et al. |

FOREIGN PATENT DOCUMENTS

| | | |
|---|---|---|
| EP | 0909657 A2 | 4/1999 |
| EP | 1145848 A2 | 10/2001 |
| EP | 1223196 A2 | 7/2002 |
| EP | 1400851 A2 | 3/2004 |
| JP | 2002-82429 A | 3/2002 |
| JP | 2002-90985 A | 3/2002 |
| JP | 2002-278057 A | 9/2002 |
| JP | 2003-270781 A | 9/2003 |

OTHER PUBLICATIONS

Partial English language machine translation of JP 2002-278057.*
Partial English language machine translation of JP 2002-082429.*
Partial English language machine translation of JP 2002-090985.*
Partial English language machine translation of JP 2003-270781.*
English language translation of JP 2002-278057.*
English language machine translation of JP 2002-278057.*

* cited by examiner

*Primary Examiner*—Amanda Walke
(74) *Attorney, Agent, or Firm*—Sughrue Mion, PLLC

(57) ABSTRACT

A curable composition comprising: (A) an infrared absorber which is a cyanine dye having a structure in which hetero rings are bonded to each other via a methine chain and which has at least one substituent having a structure selected from the group consisting of an amide bond, a urethane bond, a urea bond and a sulfonamide bond on at least one of aromatic rings at both ends, nitrogen atoms present on the hetero rings at both ends and the methine chain; (B) at least one of a radical generator and an acid generator; and (C) at least one of a radical polymerizable compound and an acid crosslinking agent.

5 Claims, No Drawings

CURABLE COMPOSITION AND IMAGE FORMING MATERIAL CONTAINING THE SAME

FIELD OF THE INVENTION

The present invention relates to a curable composition capable of being cured by imparting energy such as light and heat, which is used in three-dimensional shaping or holography, lithographic printing plate materials, synthetic resin letterpresses to be used for flexographic printing, color proofs, photoresists, image forming materials of color filters, inks, paints, adhesives, and the like. In particular, the invention relates a curable composition which is suitably used as a recording layer of a negative working lithographic printing plate precursor capable of being subjected to so-called direct plate making, which can be directly subjected to plate making using infrared laser from digital signals of a computer and the like and to an image forming material using the same.

BACKGROUND OF THE INVENTION

In recent years, the development of laser is remarkable. With respect to solid lasers and semiconductor lasers which radiate infrared light having a wavelength of from 760 nm to 1,200 nm (hereinafter sometimes referred to as "infrared laser"), ones which have a high output and a small size become easily available. Even in the field of lithographic printing, such lasers are very useful as a recording light source in undergoing directly plate making of a printing plate from digital data of a computer and the like. Following this, various studies have been made regarding image forming materials which are sensitive to these various lasers.

In general, as a negative working image forming material capable of undergoing recording upon irradiation with infrared light, there are known a polymerization system image forming material having a recording layer made of a polymerizable composition containing an infrared absorber capable of absorbing energy of infrared light to convert it into heat, a radical generator capable of generating a radical by the heat obtained from the infrared absorber, and a radical polymerizable compound capable of being polymerized with the generated radical as an initiator, in which a polymerization reaction of the radical polymerizable compound is caused and advanced in an exposed area, whereby the recording layer is cured to form an image; and an acid crosslinking system image forming material having a recording layer made of an acid crosslinking composition containing an infrared absorber capable of absorbing energy of infrared light to convert it into heat, an acid generator capable of generating an acid by the heat obtained from the infrared absorber, and an acid crosslinking agent capable of being crosslinked with the generated acid as an initiator, in which a crosslinking reaction of the acid crosslinking agent is caused and advanced in an exposed area, whereby the recording layer is cured to form an image.

Such a negative working image forming material is liable to be lowered in sensitive as compared with a positive working image forming material in which solubilization of a recording layer is caused by energy of infrared light. As a result, the curing reaction of the recording layer in the exposed area became insufficient so that a problem rose in resistance to printing (press life). Accordingly, a composition which is highly sensitive to such an infrared recording light source, namely a negative working curable composition in which solubility in a developing solution is largely lowered upon exposure with infrared light, is being demanded.

As a polymerization system curable composition which is aimed to enhance the sensitivity, for example, in sensitive materials utilizing a polymerization reaction of an ethylenically unsaturated compound, there are known a sensitive material having a reduction type additive added thereto (for example, see JP-A-2002-82429) and a sensitive material having a dithio compound, etc, added thereto (for example, see JP-A-2002-90985). However, even all of these sensitive materials were not satisfactory with respect to the sensitivity in practical use. Further, such sensitive materials containing components having excellent reactivity with light or heat involved such an anxiety that the storage stability is inferior, for example, an undesired reaction is caused in handling under white light or during the preservation, or by any change of the circumferential temperature, or polymerization hindrance is caused due to oxygen in air.

On the other hand, an attempt to solve the foregoing problems has been made by controlling the structure of an infrared absorber. As such a sensitive material, there are known a sensitive material using a cyanine dye having an electron withdrawing group or a heavy atom-containing substituent on at least one of aromatic rings at both ends (for example, see JP-A-2002-278057) and a sensitive material using a cyanine dye having a specified substituent on nitrogen atoms at both ends (for example, see JP-A-2003-270781). By these sensitive materials, an enhancement of the characteristics was observed to a certain extent. However, when all of the foregoing characteristics are taken into consideration, there was still room for further improvement.

Also, in general cyanine dyes, after developing with an alkaline aqueous developing solution, the cyanine dye is liable to be deposited in the developing solution. For that reason, there was encountered a problem that the deposit adsorbed in an image area or a non-image area, thereby deteriorating the image quality of the resulting printing plate.

SUMMARY OF THE INVENTION

An object of the invention which has been made while taking into consideration the foregoing drawbacks of the related art technologies is to provide an image forming material which is excellent in sensitivity, resistance to printing and storage stability and which does not generate development scum (insoluble matters) in an alkaline developing solution and a curable composition which is useful as a recording material of such an image forming material.

The present inventors made extensive and intensive investigations. As a result, it has been found that the foregoing object can be achieved by using a cyanine dye having a specified substituent in a specified site as an infrared absorber, leading to accomplishment of the invention.

Specifically, a curable composition of the invention according to claim 1 comprises (A) an infrared absorber which is a cyanine dye having a structure in which hetero rings are bonded to each other via a methine chain and which has at least one substituent having a structure selected from an amide bond, a urethane bond, a urea bond, and a sulfonamide bond on at least one of aromatic rings at both ends, nitrogen atoms present on the hetero rings at both ends, and the methine chain (hereinafter properly referred to as "specified infrared absorber"), (B) a radical generator or an acid generator, and (C) a radical polymerizable compound or an acid crosslinking agent.

An image forming material of the invention according to claim 2 comprises a support having thereon a recording layer containing (A) an infrared absorber which is a cyanine dye having a structure in which hetero rings are bonded to each other via a methine chain and which has at least one substituent having a structure selected from an amide bond, a urethane bond, a urea bond, and a sulfonamide bond on at least one of aromatic rings at both ends, nitrogen atoms present on the hetero rings at both ends, and the methine chain (hereinafter properly referred to as "specified infrared absorber"), (B) a radical generator or an acid generator, and (C) a radical polymerizable compound or an acid crosslinking agent.

In the invention, it is preferable that the structure of the cyanine dye is a structure represented by the following formula (I).

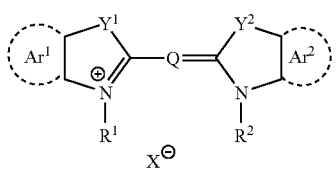

Formula (I)

In the formula (I), $R^1$ and $R^2$ each independently represents a monovalent organic group; $Ar^1$ and $Ar^2$ each independently represents an optionally substituted aromatic group or heterocyclic group; $Y^1$ and $Y^2$ each independently represents a sulfur atom, an oxygen atom, a selenium atom, a dialkylmethylene group having not more than 12 carbon atoms, or a —CH═CH— group; Q represents a pentamethine group or a heptamethine group; and $X^-$ represents an anion.

At least one of $R^1$, $R^2$, $Ar^1$, $Ar^2$, and Q has at least one substituent having a structure selected from an amide bond, a urethane bond, a urea bond, and a sulfonamide bond (hereinafter properly referred to as "specified substituent").

Further, it is more preferable that the cyanine dye is of a structure represented by the following formula (II).

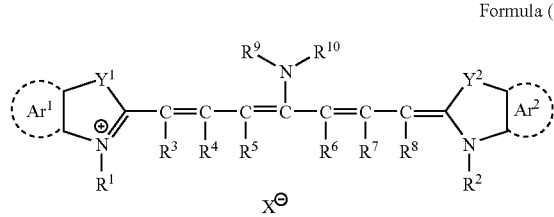

Formula (II)

In the formula (II), $R^1$, $R^2$, $Ar^1$, $Ar^2$, $Y^1$, $Y^2$, and $X^-$ are synonymous with those in the foregoing formula (I).

$R^3$, $R^4$, $R^7$, and $R^8$ each independently represents a hydrogen atom or a monovalent organic group; and $R^5$ and $R^6$ each independently represents a hydrogen atom or a monovalent organic group and may be taken together to form a ring structure. $R^9$ and $R^{10}$ each independently represents a monovalent organic group and may be taken together to form a ring structure.

At least one of $R^1$ to $R^{10}$, $Ar^1$, and $Ar^2$ has at least one specified substituent.

Further, it is the most preferable that the cyanine dye is of a structure represented by the following formula (III).

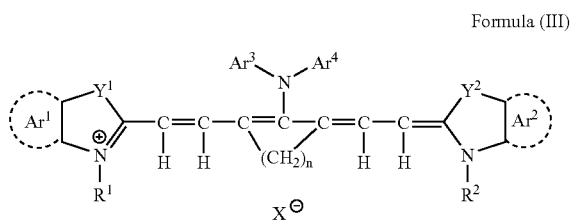

Formula (III)

In the formula (III), $R^1$, $R^2$, $Ar^1$, $Ar^2$, $Y^1$, $Y^2$, and $X^-$ are synonymous with those in the foregoing formula (I).

n represents 1 or 2; and $Ar^3$ and $Ar^4$ each independently represents an optionally substituted aromatic group or heterocyclic group.

At least one of $R^1$, $R^2$, $Ar^1$, $Ar^2$, $Ar^3$, and $Ar^4$ has at least one specified substituent.

The action of the invention is not always clear but is estimated as follows.

The specified infrared absorber to be used in the invention has at least one specified substituent on at least one of aromatic rings at both ends, nitrogen atoms present on the hetero rings at both ends, and the methine chain. Therefore, such a specified substituent forms a hydrogen bond together with the specified substituent on other specified infrared absorber or a hydrogen-binding substituent to be contained in other components, whereby rotation of the metline chain in the excited state of a dye molecule at the time of exposure is inhibited. Thus, it is estimated that in the specified infrared absorber, thermal inactivation by the molecular motion from the excited state is reduced, whereby the life of the excited state is extended in proportion thereto.

For that reason, it is thought that the curable composition using the specified infrared absorber according to the invention realizes high sensitization so that a polymerization reaction of the radical polymerizable compound or a crosslinking reaction of the acid crosslinking agent rapidly proceeds, whereby a firm cured film is obtained. Also, since deposition of the specified infrared absorber during the storage is inhibited by the hydrogen bond, there is no anxiety of the generation of staining in a non-image area with time. Accordingly, it is thought that the image forming material in which such a curable composition is used in the recording layer is excellent in sensitivity, resistance to printing and storage stability.

Also, it is thought that since the specified substituent has high polarity and excellent affinity with water, the image forming material is likely dissolved or dispersed in an alkaline developing solution, thereby inhibiting the generation of development scum during the development.

According to the invention, it is possible to obtain an image forming material which is excellent in sensitivity, resistance to printing and storage stability and which does not generate development scum (insoluble matters) in an alkaline developing solution and a curable composition which is useful as a recording material of such an image forming material.

DETAILED DESCRIPTION OF THE INVENTION

[Curable Composition]

The curable composition of the invention can be classified into a polymerizable composition containing (A) a specified infrared absorber, (B1) a radical generator, and (C1) a radical polymerizable compound; and an acid crosslinking composition containing (A) a specified infrared absorber, (B2) an acid generator, and (C2) an acid crosslinking agent.

The respective components of these polymerizable composition and acid crosslinking composition will be successively described below in detail.

-Polymerizable Composition-

The polymerizable composition according to the invention contains (A) a specified infrared absorber, (B1) a radical generator, and (C1) a radical polymerizable compound as essential components. It is preferable that (D1) a binder polymer is further added for the purpose of enhancing the film forming properties, etc. In such a polymerizable composition, the radical generator is decomposed by energy of infrared light which the infrared absorber absorbs, thereby generating a radical; and a polymerization reaction of the radical polymerizable compound is generated in series by the generated radical so that the solubility in alkalis is lowered, whereby the polymerizable composition becomes insoluble.

[(A) Specified Infrared Absorber]

The specified infrared absorber (A) which is a characteristic component of the invention is a cyanine dye having a structure in which hetero rings are bonded to each other via a methine chain and is characterized by having at least one substituent (specified substituent) having a structure selected from an amide bond, a urethane bond, a urea bond, and a sulfonamide bond on at least one of aromatic rings at both ends, nitrogen atoms present on the hetero rings at both ends, and the methine chain.

First of all, the specified substituent will be described below.

The specified substituent according to the invention is not particularly limited so far as it has at least one structure selected from an amide bond, a urethane bond, a urea bond, and a sulfonamide bond. Further, the specified substituent may have the plural number of these structures.

Preferred examples of the specified substituent having such a structure include ones represented by the following formulae (T-1) to (T-6).

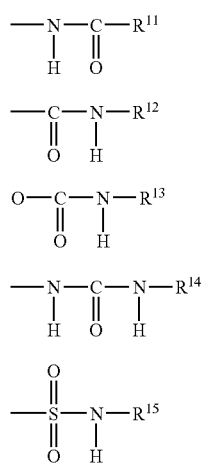

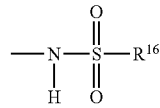

In the foregoing formulae (T-1) to (T-6), $R^{11}$, $R^{13}$, and $R^{16}$ each independently represents a monovalent organic group; and $R^{12}$, $R^{14}$, and $R^{15}$ each independently represents a hydrogen atom or a monovalent organic group.

Of these, ones represented by the formula (T-2), ones represented by the formula (T-3), and ones represented by the formula (T-4) are preferable; ones represented by the formula (T-2) wherein $R^{12}$ represents a monovalent organic group and ones represented by the formula (T-3) are especially preferable; and ones represented by the formula (T-3) are the most preferable.

It is only a requirement that the specified substituent is bonded on at least one of aromatic rings at both ends of the cyanine dye, nitrogen atoms present on the hetero rings at both ends, and the methine chain directly or via an organic connecting group. The organic connecting group is a polyvalent organic group composed of non-metallic atoms and is preferably one composed of from 1 to 60 carbon atoms, from 0 to 10 nitrogen atoms, from 0 to 50 oxygen atoms, from 1 to 100 hydrogen atoms, and from 0 to 20 sulfur atoms are preferable.

More specific examples of de connecting group include ones having at least one of the following structures.

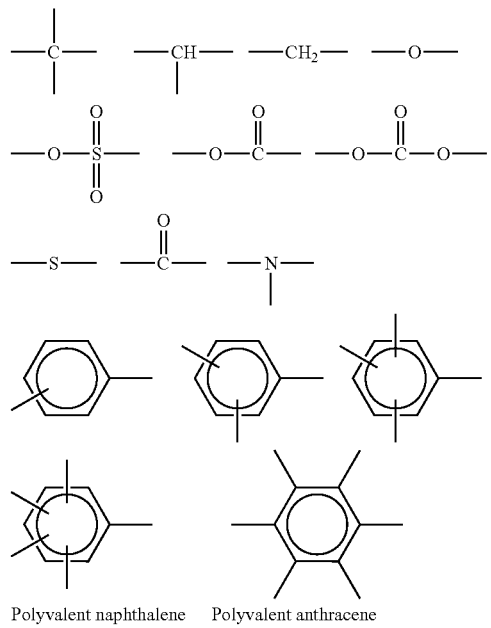

Also, the foregoing connecting group may have a substituent. Examples of such a substituent include a halogen atom, a hydroxyl group, a carboxyl group, a sulfonato group, a nitro group, a cyano group, an amide group, an amino group, an alkyl group, an alkenyl group, an alkynyl group, an aryl group, a substituted oxy group, a substituted sulfonyl group, a substituted carbonyl group, a substituted sulfinyl group, a sulfo group, a phosphono group, a phosphonato group, a silyl group, and a heterocyclic group.

In the foregoing formulae (T-1) to (T-6), as the monovalent organic group represented by $R^{11}$ to $R^{16}$, an alkyl group, an alkenyl group, an alkynyl group, an aryl group, and a heterocyclic group, each of which may have a substituent, are preferable.

As such an alkyl group, linear, branched or cyclic alkyl groups having from 1 to 20 carbon atoms can be enumerated. Specific examples thereof include a methyl group, an ethyl group, a propyl group, a butyl group, a pentyl group, a hexed group, a heptyl group, an octyl group, a nonyl group, a decyl group, an undecyl group, a dodecyl group, a tridecyl group, a hexadecyl group, an octadecyl group, an eicosyl group, an isopropyl group, an isobutyl group, a sec-butyl group, a t-butyl group, an isopentyl group, a neopentyl group, a 1-methylbutyl group, an isohexyl group, a 2-ethylhexyl group, a 2-methylhexyl group, a cyclohexyl group, a cyclopentyl group, and a 2-norbonyl group. Of these, linear alkyl groups having from 1 to 12 carbon atoms, branched alkyl groups having from 3 to 12 carbon atoms, and cyclic alkyl groups having from 5 to 10 carbon atoms are more preferable.

As the substituent of the substituted alkyl group, groups composed of a monovalent non-metallic atomic group exclusive of a hydrogen atom are used. Preferred examples thereof include a halogen atom (for example, —F; —Br, —Cl, and —I), a hydroxyl group, an alkoxy group, an aryloxy group, a mercapto group, an alkylthio group, an arylthio group, an alkylditho group, an aryldithio group, an amino group, an N-alkylamino group, an N,N-dialkylamino group, an N-arylamino group, an N,N-diarylamino group, an N-alkyl-N-arylamino group, an acyloxy group, a carbamoyloxy group, an N-alkylcarbamoyloxy group, an N-arylcarbamoyloxy group, an N,N-dialkylcarbamoyloxy group, an N,N-diarylcarbamoyloxy group, an N-alkyl-N-arylcarbamoyloxy group, an alkylsulfoxy group, an arylsulfoxy group, an acylthio group, an acylamino group, an N-alkylacylamino group, an N-arylacylamino group, an ureido group, an N'-alkylureido group, an N',N'-dialkylureido group, an N'-arylureido group, an N',N'-diarylureido group, an N'-alkyl-N'-arylureido group, an N-alkylureido group, an N-arylureido group, an N'-alkyl-N-alkylureido group, an N'-alkyl-N-arylureido group, an N',N'-dialkyl-N-alkylureido group, an N',N'-dialkyl-N-arylureido group, an N'-aryl-N-alkylureido group, an N'-aryl-N-arylureido group, an N',N'-diaryl-N-alkylureido group, an N',N'-diaryl-N-arylureido group, an N'-alkyl-N'-aryl-N-alkylureido group, an N'-alkyl-N'-aryl-N-arylureido group, an alkoxycarbonylamino group, an aryloxycarbonylamino group, an N-alkyl-N-alkoxycarbonylamino group, an N-alkyl-N-aryloxycarbonylamino group, an N-aryl-N-alkoxycarbonylamino group, an N-aryl-N-aryloxycarbonylamino group, a formyl group, an acyl group, a carboxyl group, an alkoxycarbonyl group, an aryloxycarbonyl group, a carbamoyl group, an N-alkylcarbamoyl group, an N,N-dialkylcarbamoyl group, an N-arylcarbamoyl group, an N,N-diarylcarbamoyl group, an N-alkyl-N-arylcarbamoyl group, an alkylsulfinyl group, an arylsulfinyl group, an alkylsulfonyl group, an arylsulfonyl group, a sulfo group (—$SO_3H$) and a conjugated base group thereof (referred to as "sulfonato group"), an alkoxysulfonyl group, an aryloxysulfonyl group, a sulfinamoyl group, an N-alkylsulfinamoyl group, an N,N-dialkylsulfinamoyl group, an N-arylsulfinamoyl group, an N,N-diarylsulfinamoyl group, an N-alkyl-N-arylsulfinamoyl group, a sulfamoyl group, an N-alkylsulfamoyl group, an N,N-dialkylsulfamoyl group, an N-arylsulfamoyl group, an N,N-diarylsulfamoyl group, all N-alkyl-N-arylsulfamoyl group, a phosphono group (—$PO_3H_2$) and a conjugated based group thereof (referred to as "phosphonato group"), a dialkylphosphono group (—$PO_3(alkyl)_2$), a diarylphosphono group (—$PO_3(aryl)_2$), an alkylarylphosphono group (—$PO_3(alkyl)(aryl)$), a monoalkylphosphono group (—$PO_3H(alkyl)$) and a conjugated base group thereof (referred to as "alkylphosphonato group"), a monoarylphosphono group (—$PO_3H(aryl)$) and a conjugated base group thereof (referred to as "arylphosphonato group"), a phosphonooxy group (—$OPO_3H_2$) and a conjugated based group thereof (referred to as "phosphonatooxy group"), a dialkylphosphonooxy group (—$OPO_3H(alkyl)_2$), a diarylphosphonooxy group (—$OPO_3H(aryl)_2$), an alkylarylphosphonooxy group (—$OPO_3(alkyl)(aryl)$), a monoalkylphosphonooxy group (—$OPO_3H(alkyl)$) and a conjugated base group thereof (referred to as "alkylphosphonatooxy group"), a monoarylphosphonooxy group (—$OPO_3H(aryl)$) and a conjugated base group thereof (referred to as "arylphosphonatooxy group"), a cyano group, a nitro group, an aryl group, an alkenyl group, an alkynyl group, a heterocyclic group, and a silyl group.

As specific examples of the alkyl group in these substituents, the foregoing alkyl groups are enumerated. Specific examples the aryl group in the foregoing substituents include a phenyl group, a biphenyl group, a naphthyl group, a tolyl group, a xylyl group, a mesityl group, a cumenyl group, a chlorophenyl group, a bromophenyl group, a chloromethylphenyl group, a hydroxyphenyl group, a methoxyphenyl group, an ethoxyphenyl group, a phenoxyphenyl group, an acetoxyphenyl group, a benzoyloxyphenyl group, a methylthiophenyl group, a phenylthiophenyl group, a methylaminophenyl group, a dimethylaminophenyl group, an acetylaminophenyl group, a carboxyphenyl group, a methoxycarbonylphenyl group, an ethoxyphenylcarbonyl group, a phenoxycarbonylphenyl group, an N-phenylcarbamoylphenyl group, a cyanophenyl group, a sulfophenyl group, a sulfonatophenyl group, a phosphonophenyl group, and a phosphonatophenyl group.

Also, examples of the alkenyl group include a vinyl group, a 1-propenyl group, a 1-butenyl group, a cinnamyl group, and a 2-chloro-1-ethenyl group; and examples of the alkynyl group include an ethynyl group, a 1-propynyl group, a 1-butynyl group, and a trimethylsilylethynyl group.

As $R^{01}$ of the acyl group ($R^{01}CO$—), a hydrogen atom and the foregoing alkyl groups and aryl groups can be enumerated. Of these substituents, a halogen atom (for example, —F, —Br, —Cl, and —I), an alkoxy group, an aryloxy group, an alkylthio group, an arylthio group, an N-alkylamino group, an N,N-dialkylamino group, all acyloxy group, an N-alkylcarbamoyloxy group, an N-arylcarbamoyloxy group, an acylamino group, a formyl group, an acyl group, a carboxyl group, an alkoxycarbonyl group, an aryloxycarbonyl group, a carbamoyl group, an N-alkylcarbamoyl group, an N,N-dialkylcarbamoyl group, an N-arylcarbamoyl group, an N-alkyl-N-arylcarbamoyl group, a sulfo group, a sulfonato group, a sulfamoyl group, an N-alkylsulfamoyl group, an N,N-dialkylsulfamoyl group, an N-arylsulfamoyl group, an N-alkyl-N-arylsulfamoyl group, a phosphono group, a phosphonato group, a dialkylphosphono group, a diarylphosphono group, a monoalkylphosphono group, an alkylphosphonato group, a monoarylphosphono group, an arylphosphonato group, a phosphonooxy group, a phosphonatooxy group, an aryl group, and an alkenyl group are more preferable.

Examples of the heterocyclic group include a pyridyl group and a piperidinyl group. Examples of the silyl group include a trimethylsilyl group.

On the other hand, as the alkylene group in the substituted alkyl group, divalent organic residues resulting from elimination of any one of the hydrogen atoms on the foregoing alkyl group having from 1 to 20 carbon atoms can be enumerated; and linear alkylene groups having from 1 to 12 carbon atoms, branched alkylene groups having from 3 to 12 carbon atoms, and cyclic alkylene groups having from 5 to 10 carbon atoms can be preferably enumerated. Preferred examples of the substituted alkyl group obtained by combining such a substituent with the alkylene group include a chloromethyl group, a bromomethyl group, a 2-chloroethyl group, a trifluoromethyl group, a methoxymethyl group, an isopropoxymethyl group, a butoxymethyl group, a sec-butoxybutyl group, a methoxyethoxyethyl group, an allyloxymethyl group, a phenoxymethyl group, a methylthioethyl group, a tolylthiomethyl group, a pyridylmethyl group, a tetramethylpiperidinylmethyl group, an N-acetyltetramethylpiperidinylmethyl group, a trimethylsilylmethyl group, a methoxyethyl group, an ethylaminoethyl group, a diethylaminopropyl group, a morpholinopropyl group, an acetyloxymethyl group, a benzoyloxymethyl group, an N-cyclohexylcarbamoyloxyethyl group, an N-phenylcarbamoyloxyethyl group, an acetylaminoethyl group, an N-methylbenzoylaminopropyl group, a 2-oxoethyl group, a 2-oxopropyl group, a carboxypropyl group, a methoxycarbonylethyl group, an allyloxycarbonylbutyl group, a chlorophenoxycarbonylmethyl group, a carbamoylmethyl group, an N-methylcarbamoylethyl group, an N,N-dipropylcarbamoylmethyl group, an N-(methoxyphenyl)carbamoylethyl group, an N-methyl-N-(sulfophenyl)carbamoylmethyl group, a sulfobutyl group, a sulfonatobutyl group, a sulfamoylbutyl group, an N-ethylsulfamoylmethyl group, an N,N-dipropylsulfamoylpropyl group, an N-tolylsulfamoylpropyl group, an N-methyl-N-(phosphonophenyl)sulfamoyloctyl group, a phosphonobutyl group, a phosphonatohexyl group, a diethylphosphonobutyl group, a diphenylphosphonopropyl group, a methylphosphonobutyl group, a methylphosphonatobutyl group, a tolylphosphonohexyl group, a tolylphosphonatohexyl group, a phosphonooxypropyl group, a phosphonatooxybutyl group, a benzyl group, a phenethyl group, an α-methylbenzyl group, a 1-methyl-1-phenylethyl group, a p-methylbenzyl group, a cinnamyl group, an allyl group, a 1-propenylmethyl group, a 2-butenyl group, a 2-methylallyl group, a 2-methylpropenylmethyl group, a 2-propynyl group, a 2-butynyl group, and a 3-butynyl group.

As the aryl group, ones in which from 1 to 3 benzene rings form a fused ring and ones in which a benzene ring and a 5-membered unsaturated ring form a fused ring can be enumerated. Specific examples thereof include a phenyl group, a naphthyl group, an anthryl group, a phenanthryl group, an indenyl group, an acenaphthenyl group, and a fluorenyl group. Of these, a phenyl group and a naphthyl group are more preferable.

As the substituted aryl group, ones in which a group composed of a monovalent non-metallic atomic group exclusive of a hydrogen atom is present as a substituent on the ring-forming carbon atom of the foregoing aryl group are used. As preferred examples of the substituent, the foregoing alkyl groups and substituted alkyl groups and those enumerated as the substituent in the foregoing substituted alkyl group can be enumerated.

Specific examples of such a substituted aryl group include a biphenyl group, a tolyl group, a xylyl group, a mesityl group, cumenyl group, a chlorophenyl group, a bromophenyl group, a fluorophenyl group, a chloromethylphenyl group, a trifluoromethylphenyl group, a hydroxyphenyl group, a methoxyphenyl group, a methoxyethoxyphenyl group, an allyloxyphenyl group, a phenoxyphenyl group, a methylthiophenyl group, a tolylthiophenyl group, an ethylaminophenyl group, a diethylaminophenyl group, a morpholinophenyl group, an acetyloxyphenyl group, a benzoyloxyphenyl group, an N-cyclohexylcarbamoyloxyphenyl group, an N-phenylcarbamoyloxyphenyl group, an acetylaminophenyl group, an N-methylbenzoylaminophenyl group, a carboxyphenyl group, a methoxycarbonylphenyl group, an allyloxycarbonylphenyl group, a chlorophenoxycarbonylphenyl group, a carbamoylphenyl group, an N-methylcarbamoylphenyl group, an N,N-dipropylcarbamoylphenyl group, an N-(methoxyphenyl)carbamoylphenyl group, an N-methyl-N-(sulfophenyl)carbamoylphenyl group, a sulfophenyl group, a sulphonatophenyl group, a sulfamoylphenyl group, an N-ethylsulfamoylphenyl group, an N,N-dipropylsulfamoylphenyl group, an N-toylsulfamoylphenyl group, an N-methyl-N-(phosphonophenyl)sulfamoylphenyl group, a phosphonophenyl group, a phosphonatophenyl group, a diethylphosphonophenyl group, a diphenylphosphonophenyl group, a methylphosphonophenyl group, a methylphosphonatophenyl group, a tolylphosphonophenyl group, a tolylphosphonatophenyl group, an allylphenyl group, a 1-propenylmethylphenyl group, a 2-butenylphenyl group, a 2-methylallylphenyl group, a 2-methylpropenylphenyl group, a 2-propynylphenyl group, a 2-butynylphenyl group, and a 3-butynylphenyl group.

As the alkenyl group, substituted alkenyl group, alkynyl group and substituted alkynyl group (—C($R^{02}$)═C($R^{03}$)($R^{04}$) and —C≡C($R^{05}$)), ones in which $R^{02}$, $R^{03}$, $R^{04}$, and $R^{05}$ are each a group composed of a monovalent non-metallic atomic group can be used. As preferred examples of $R^{02}$, $R^{03}$, $R^{04}$, and $R^{05}$, a hydrogen atom, a halogen atom, an alkyl group, a substituted alkyl group, an aryl group, and a substituted aryl group can be enumerated. As specific examples thereof, those described previously can be enumerated. As more preferred groups of $R^{02}$, $R^{03}$, $R^{04}$, and $R^{05}$, a hydrogen atom, a halogen atom, and a linear, branched or cyclic alkyl group having from 1 to 10 carbon atoms can be enumerated.

Preferred specific examples of these alkenyl group, substituted alkenyl group, alkynyl group and substituted alkynyl group include a vinyl group, a 1-propenyl group, a 1-butenyl group, a 1-pentenyl group, a 1-hexenyl group, a 1-octenyl group, a 1-methyl-1-propenyl group, a 2-methyl-1-propenyl group, a 2-methyl-1-butenyl group, a 2-phenyl-1-ethenyl group, a 2-chloro-1-ethenyl group, an ethynyl group, a 1-propynyl group, a 1-butynyl group, and a phenylethynyl group.

As the heterocyclic group, a pyridyl group exemplified as the substituent of the substituted alkyl group and the like can be enumerated.

As the foregoing substituted oxy group ($R^{06}$O—), ones in which $R^{06}$ is a group composed of a monovalent non-metallic atomic group exclusive of a hydrogen atom can be used. As preferred examples of the substituted oxy group, an alkoxy group, an aryloxy group, an acyloxy group, a carbamoyloxy group, an N-alkylcarbamoyloxy group, an N-arylcarbamoyloxy group, an N,N-dialkylcarbamoyloxy group, an N,N-diarylcarbamoyloxy group, an N-alkyl-N-arylcarbamoyloxy group, an alkylsulfoxy group, an arylsulfoxy group, a phosphonooxy group, and a phosphonatooxy group can be enumerated. As the alkyl group and aryl group in these groups, those enumerated as the foregoing alkyl group, substituted alkyl group, aryl group and substituted aryl group can be enumerated. Also, as the acyl group ($R^{O7}CO$—) in the acyloxy group, ones in which $R^{O7}$ represents the foregoing alkyl group, substituted alkyl group, aryl group or substituted aryl group can be enumerated. Of these substituents, an alkoxy group, an aryloxy group, an acyloxy group, and an arylsulfoxy group are more preferable. Preferred specific examples of the substituted oxy group include a methoxy group, an ethoxy group, a propyloxy group, an isopropyloxy group, a butyloxy group, a pentyloxy group, a hexyloxy group, a dodecyloxy group, a benzyloxy group, an allyloxy group, a phenethyloxy group, a carbxoyethyloxy group, a methoxycarbonylethyloxy group, an ethoxycarbonylethyloxy group, a methoxyethoxy group, a phenoxyethoxy group, a methoxyethoxyethoxy group, an ethoxyethoxyethoxy group, a morpholinoethoxy group, a morpholinopropyloxy group, an allyloxyethoxyethoxy group, a phenoxy group, a tolyloxy group, a xylyloxy group, a mesityloxy group, a mesityloxy group, a cumenyloxy group, a methoxyphenyloxy group, an ethoxyphenyloxy group, a chlorophenyloxy group, a bromophenyloxy group, an acetyloxy group, a benzoyloxy group, a naphthyloxy group, a phenylsulfonyloxy group, a phosphonooxy group, and a phosphonatooxy group.

As the substituted amino group ($R^{O8}NH$ and ($R^{O9}$)($R^{O10}$)N—) including an amide group, ones in which $R^{O8}$, $R^{O9}$, and $R^{O10}$ are each a group composed of a monovalent non-metallic atomic group exclusive of a hydrogen atom can be used. $R^{O9}$ and $R^{O10}$ may be taken together to form a ring. As preferred examples of the substituted amino group, an N-alkylamino group, an N,N-dialkylamino group, an N-arylamino group, an N,N-diarylamino group, an N-alkyl-N-arylamino group, an acylamino group, an N-alkylacylamino group, an N-arylacylamino group, an ureido group, an N'-alkylureido group, an N',N'-dialkylureido group, an N'-arylureido group, an N',N'-diarylureido group, an N'-alkyl-N'-arylureido group, an N-alkylureido group, an N-arylureido group, an N'-alkyl-N-alkylureido group, an N'-alkyl-N-arylureido group, an N',N'-dialkyl-N-alkylureido group, an N'-alkyl-N'-arylureido group, an N',N'-dialkyl-N-alkylureido group, an N',N'-dialkyl-N'-arylureido group, an N'-aryl-N-alkylureido group, an N'-aryl-N-arylureido group, an N',N'-diaryl-N-alkylureido group, an N',N'-diaryl-N-arylureido group, an N'-alkyl-N'-aryl-N-alkylureido group, an N'-alkyl-N'-aryl-N-arylureido group, an alkoxycarbonylamino group, an aryloxycarbonylamino group, an N-alkyl-N-alkoxycarbonylamino group, an N-alkyl-N-aryloxycarbonylamino group, an N-aryl-N-alkoxycarbonylamino group, and an N-aryl-N-aryloxycarbonylamino group can be enumerated. As the alkyl group and aryl group in these groups, those enumerated as the foregoing alkyl group, substituted alkyl group, aryl group and substituted aryl group can be enumerated; and $R^{O7}$ of the acyl group ($R^{O7}CO$—) in the acylamino group, N-alkylacylamino group and N-arylacylamino group is the same as described previously. Of these, an N-alkylamino group, an N,N-dialkylamino group, an N-arylamino group, and an acylamino group are more preferable. Preferred specific examples of the substituted amino group include a methylamino group, an ethylamino group, a diethylamino group, a morpholino group, a piperidino group, a pyrrolidino group, a phenylamino group, a benzoylamino group, and an acetylamino group.

As the substituted sulfonyl group ($R^{O11}$—$SO_2$—), ones in which $R^{O11}$ is a group composed of a monovalent non-metallic atomic group can be used. As more preferred examples thereof, an alkylsulfonyl group and an arylsulfonyl group can be enumerated. As the alkyl group and aryl group in these groups, those enumerated as the foregoing alkyl group, substituted alkyl group, aryl group and substituted aryl group can be enumerated. Specific examples of such a substituted sulfonyl group include a butylsulfonyl group, a phenylsulfonyl group, and a chlorophenylsulfonyl group.

The sulfonato group (—$SO_3^-$) means a conjugated base anion group of a sulfo group (—$SO_3H$) as described previously. In general, it is preferable that the sulfonato group is used together with a counter cation. As such a counter cation, ones which are generally known, i.e., various oniums (for example, aminoniums, sulfoniums, phosphoniums, iodoniums, and aziniums) and metal ions (for example, $Na^+$, $K^+$, $Ca^{2+}$, and $Zn^{2+}$), are enumerated.

As the substituted carbonyl group ($R^{O13}$—CO—), ones in which $R^{O13}$ is a group composed of a monovalent non-metallic atomic group can be used. Preferred examples of the substituted carbonyl group include a formyl group, an acyl group, a carboxyl group, an alkoxycarbonyl group, an aryloxycarbonyl group, a carbamoyl group, an N-alkylcarbamoyl group, an N,N-dialkylcarbamoyl group, an N-arylcarbamoyl group, an N,N-diarylcarbamoyl group, and an N-alkyl-N'-arylcarbamoyl group. As the alkyl group and aryl group in these groups, those enumerated as the foregoing alkyl group, substituted alkyl group, aryl group and substituted aryl group can be enumerated. Of these substituted carbonyl groups, a formyl group, an acyl group, a carboxyl group, an alkoxycarbonyl group, an aryloxycarbonyl group, a carbamoyl group, an N-alkylcarbamoyl group, an N,N,-dialkylcarbamoyl group, and an N-arylcarbamoyl group are preferable; and a formyl group, an acyl group, an alkoxycarbonyl group, and an aryloxycarbonyl group are further preferable. Preferred specific examples of the substituted carbonyl group include a formyl group, an acetyl group, a benzoyl group, a carboxyl group, a methoxycarbonyl group, an ethoxycarbonyl group, an allyloxycarbonyl group, a dimethylaminophenylethenylcarbonyl group, a methoxycarbonylmethoxycarbonyl group, an N-methylcarbamoyl group, an N-phenylcarbamoyl group, an N,N-diethylcarbamoyl group, and a morpholinocarbonyl group.

As the substituted sulfinyl group ($R^{O14}$—SO—), ones in which $R^{O14}$ is a group composed of a monovalent non-metallic atomic group can be used. Preferred examples thereof include an alkylsulinyl group, an arylsulfinyl group, a sulfinamoyl group, an N-alkylsulfinamoyl group, an N,N-dialkylsulfinamoyl group, an N-arylsulfinamoyl group, an N,N-diarylsulfinamoyl group, and an N-alkyl-N-arylsulfinamoyl group. As the alkyl group and aryl group in these groups, those enumerated as the foregoing alkyl group, substituted alkyl group, aryl group and substituted aryl group can be enumerated. Of these, an alkylsinyl group and an arylsulfinyl group are more preferable. Specific examples of such a substituted sulfinyl group include a hexylsulfinyl group, a benzylsulfinyl group, and a tolylsulfinyl group.

The substituted phosphono group as referred to herein means a phosphono group in which one or two hydroxyl groups thereon are substituted with other organic oxo group. Preferred examples thereof include the foregoing dialkylphosphono group, diarylphosphono group, alkylarylphosphono group, monoalkylphosphono group and monoarylphosphono group. Of these, a dialkylphosphono group and a diarylphosphono group are more preferable. Specific examples of such a substituted phosphono group include a diethylphosphono group, a dibutylphosphono group, and a diphenylphosphono group.

The phosphonato group (—PO$_3^{2-}$ and —PO$_3$H$^-$) means a conjugated base anion group derived from acid first dissociation or acid second dissociation of a phosphono group (—PO$_3$H$_2$) as described previously. In general, it is preferable that the phosphonato group is used together with a counter cation. As such a counter cation, ones which are generally known, i.e., various oniums (for example, ammoniums, sulfoniums, phosphoniums, iodoniums, and aziniums) and metal ions (for example, Na$^+$, K$^+$, Ca$^{2+}$, and Zn$^{2+}$), are enumerated.

The substituted phosphonato group as referred to herein is a conjugated base anion group resulting from substitution of one hydroxyl group on the foregoing substituted phosphono group with an organic oxo group. Specific examples thereof include conjugated bases of the foregoing monoalkylphosphono group (—PO$_3$H(alkyl)) and monoarylphosphono group (—PO$_3$H(aryl)).

The specified infrared absorber (A) having such a specified substituent is preferably a cyanine dye represented by the following formula (I).

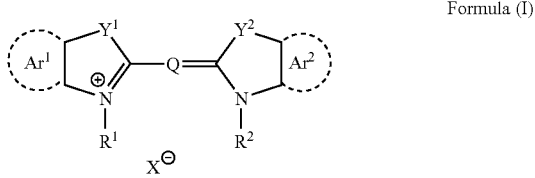

Formula (I)

In the formula (I), $R^1$ and $R^2$ each independently represents a monovalent organic group, and preferably an optionally substituted hydrocarbon group having not more than 20 carbon atoms.

$Ar^1$ and $Ar^2$ each independently represents an optionally substituted aromatic group or heterocyclic group. As the preferred aromatic group, a benzene ring and a naphthalene ring are enumerated; and as the preferred heterocyclic group, a pyridine ring and a pyrazine ring are enumerated. Of these, a benzene ring and a naphthalene ring are preferable.

$Y^1$ and $Y^2$ each independently represents a sulfur atom, an oxygen atom, a selenium atom, a dialkylmethylene group having not more than 12 carbon atoms, or a —CH=CH— group. Of these, a dialkylmethylene group such as a dimethylmethylene group is preferable.

Q represents a pentamethine group or a heptamethine group. Of these, a heptamethine group is preferable in view of wavelength adaptability with infrared light and stability. Also, Q may be substituted with a group selected from an alkoxy group, an aryloxy group, an alkylthio group, an arylthio group, a dialkylamino group, a diarylamino group, a halogen atom, an alkyl group, an aralkyl group, a cycloalkyl group, an aryl group, an oxy group, and an iminium salt group. Preferred examples of the substituent include a diarylamino group such as a diphenylamino group and an arylthio group such as a phenylthio group.

$X^-$ represents an anion. In view of the storage stability of a coating liquid for recording layer, $X^-$ is preferably a halogen ion, a perchloric acid ion, a tetrafluoroborate ion, a hexafluorophosphate ion, or a sulfonic acid ion, and especially preferably a perchloric acid ion, a hexafluorophosphate ion, or an arylsulfonic acid ion.

The cyanine dye represented by the formula (I) is required to have at least one of the foregoing specified substituents on at least one of $R^1$, $R^2$, $Ar^1$, $Ar^2$, and Q.

Further, in the invention, it is preferable that the cyanine dye is of a structure represented by the following formula (II).

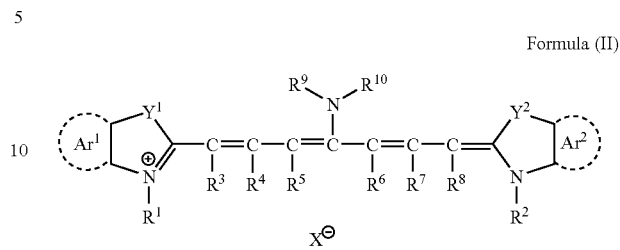

Formula (II)

In the formula (II), $R^1$, $R^2$, $Ar^1$, $Ar^2$, $Y^1$, $Y^2$, and $X^-$ are synonymous with those in the foregoing formula (I).

$R^3$, $R^4$, $R^7$, and $R^8$ each independently represents a hydrogen atom or a monovalent organic group. As the monovalent organic group, a hydrocarbon having not more than 12 carbon atoms and the like are enumerated. Of these, a hydrogen atom is preferable because a raw material is easily available.

$R^5$ and $R^6$ each independently represents a hydrogen atom or a monovalent organic group. As the monovalent organic group, a hydrocarbon having from 1 to 12 carbon atoms and the like are enumerated. Also, $R^5$ and $R^6$ may be taken together to form a ring structure. As the ring to be formed, a 5-membered ring and a 6-membered ring are preferable.

$R^9$ and $R^{10}$ each independently represents a monovalent organic group. As the monovalent organic group, an optionally substituted aromatic hydrocarbon group having from 6 to 10 carbon atoms and an optionally substituted alkyl group having from 1 to 8 carbon atoms are preferable. Also, $R^9$ and $R^{10}$ may be taken together to form a ring structure. As the ring to be formed, an aromatic group such as a phenyl group is preferable.

The cyanine dye represented by the formula (II) is required to have at least one of the foregoing specified substituents on at least one of $R^1$ to $R^{10}$, $Ar^1$, and $Ar^2$.

Moreover, in the invention, it is preferable that the cyanine dye is of a structure represented by the following formula (III).

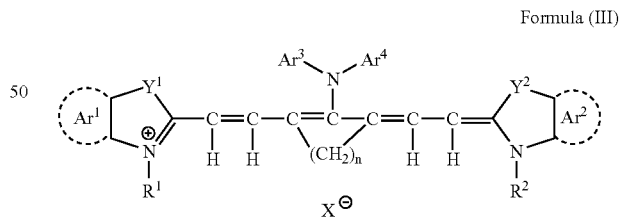

Formula (III)

In the formula (III), $R^1$, $R^2$, $Ar^1$, $Ar^2$, $Y^1$, $Y^2$, and $X^-$ are synonymous with those in the foregoing formula (I).

n represents 1 or 2.

$Ar^3$ and $Ar^4$ each independently represents an optionally substituted aromatic group or heterocyclic group.

It is required that at least one of $R^1$, $R^2$, $Ar^1$, $Ar^2$, $Ar^3$, and $Ar^4$ has at least one specified substituent.

In the invention, it is the most preferable that the cyanine dye is of a structure represented by the following formula (IV) or (V).

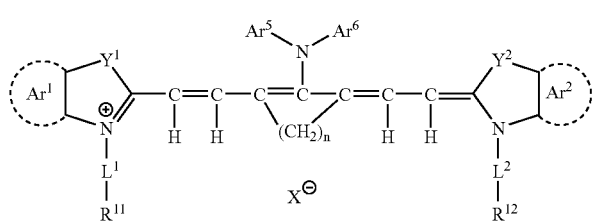

Formula (IV)

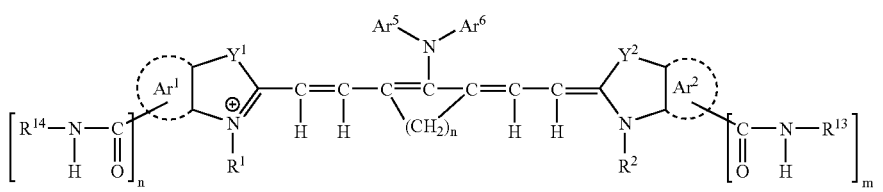

Formula (V)

In the formulae (IV) and (V), $R^1$, $R^2$, $Ar^1$, $Ar^2$, $Y^1$, $Y^2$, and $X^-$ are synonymous with those in the foregoing formula (I).

$Ar^5$ and $Ar^6$ each independently represents an optionally substituted aromatic group.

$L^1$ and $L^2$ each independently represents an alkylene group having from 1 to 10 carbon atoms.

$R^{11}$ and $R^{12}$ each independently represents a specified substituent.

$R^{13}$ and $R^{14}$ each independently represents a monovalent organic group such as an optionally substituted aromatic hydrocarbon group having from 6 to 10 carbon atoms and an optionally substituted alkyl group having from 1 to 8 carbon atoms. Of these, an aromatic hydrocarbon group such as a phenyl group is preferable.

n and m each independently represents an integer of 0 or more, and the total sum of n and m is 1 or more.

Also, the specified infrared absorber according to the invention is most preferably a cyanine dye having a structure represented by any one of the formulae (I) to (V), wherein at least one of a halogen atom and an alkoxycarbonyl group is present on $Ar^1$ and $Ar^2$, and the specified substituent is present on either one of $R^1$ and $R^2$ or either one of $R^{11}$ and $R^{12}$.

Specific examples of the specified infrared absorber (A) will be given below, but it should not be construed that the invention is limited thereto.

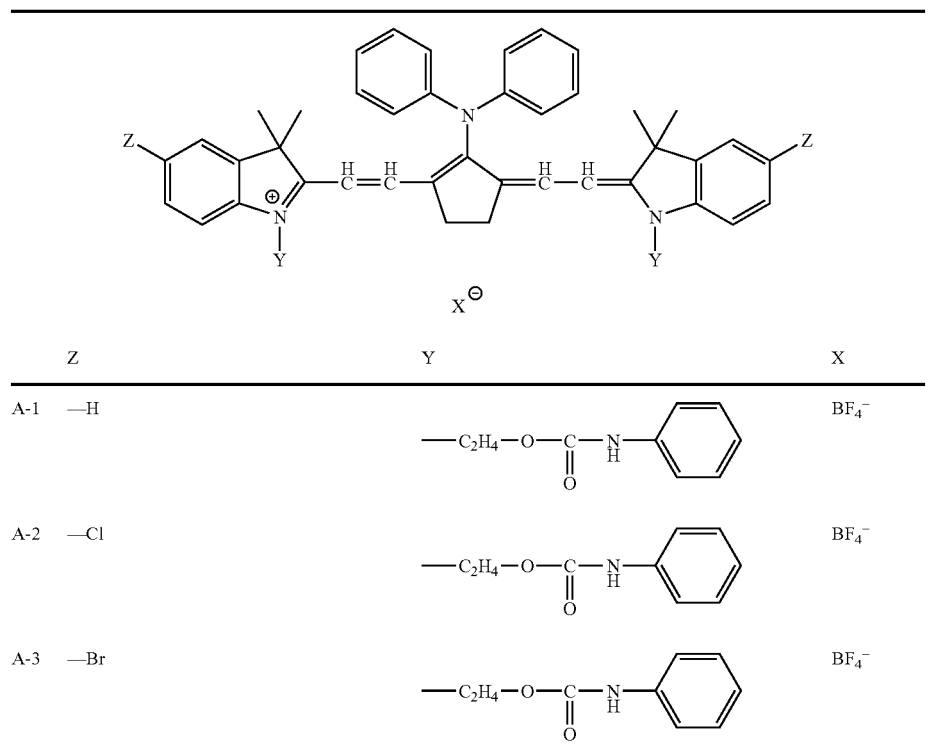

-continued
| | | | |
|---|---|---|---|
| A-4 | —CH₃ | 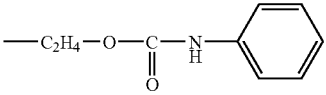 | BF₄⁻ |
| A-5 | —CO₂CH₃ | 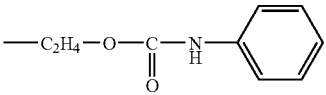 | BF₄⁻ |
| A-6 | —CO₂CH₂—Ph | 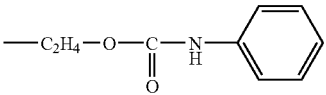 | BF₄⁻ |
| A-7 | —Cl | 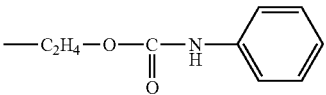 | CF₃SO₃⁻ |
| A-8 | —Cl | 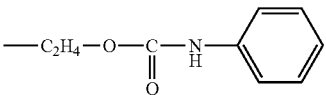 | ClO₄⁻ |
| A-9 | —Cl | 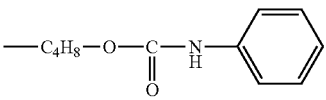 | ClO₄⁻ |
| A-10 | —Cl | 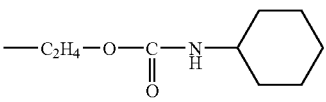 | BF₄⁻ |
| A-11 | —Cl | 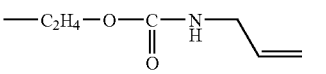 | BF₄⁻ |
| A-12 | —Cl | 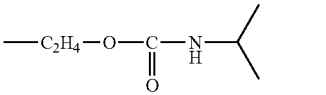 | BF₄⁻ |
| A-13 | —Cl | 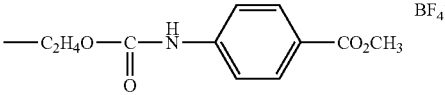 | BF₄⁻ |
| A-14 | —Cl | 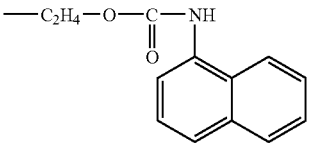 | BF₄⁻ |
| A-15 | —CO₂CH₃ | 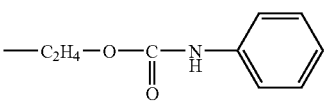 | CF₃SO₃⁻ |
| A-16 | —CO₂CH₃ | 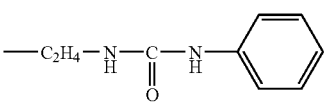 | CF₃SO₃⁻ |
| A-17 | —CO₂CH₃ | 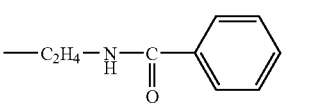 | CF₃SO₃⁻ |
| A-18 | —CO₂CH₃ | —CH₂—CONH₂ | CF₃SO₃⁻ |

-continued
| | | | |
|---|---|---|---|
| A-19 | —CO₂CH₃ | —C₂H₄—SO₂—NH₂ | CF₃SO₃⁻ |
| A-20 | —CO—NH—Ph | —CH₃ | BF₄⁻ |
| A-21 | 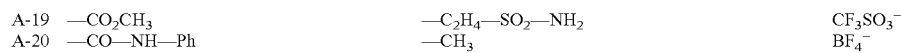 | —CH₃ | BF₄⁻ |
| A-22 | 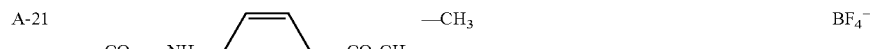 | —CH₂CH₃ | BF₄⁻ |
| A-23 | —CO—NH—Ph | —CH₂CH₂—Ph | CF₃SO₃⁻ |
| A-24 | —CO—NH—CH₃ | —CH₂CH₃ | BF₄⁻ |
| A-25 | —CO—NH—Ph | —CH₂CH₂—OH | BF₄⁻ |
| A-26 | 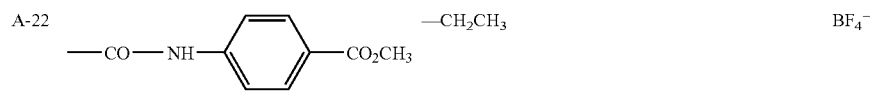 | 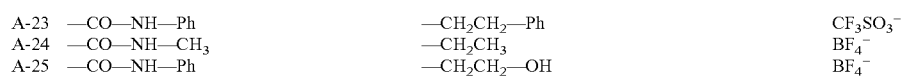 | BF₄⁻ |
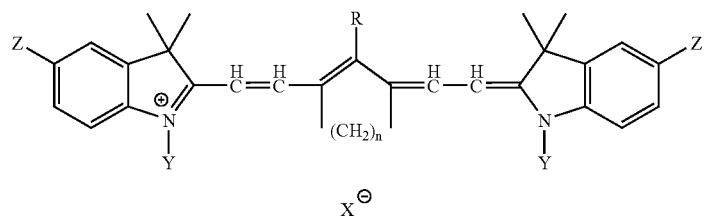
| | Z | Y | R | n | X⁻ |
|---|---|---|---|---|---|
| A-27 | —Cl | 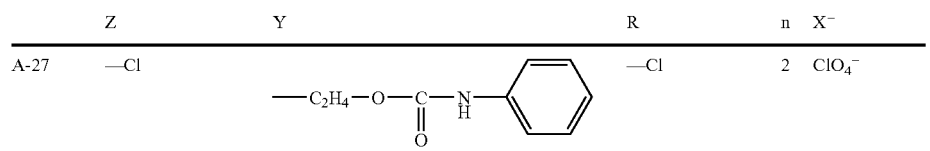 | —Cl | 2 | ClO₄⁻ |
| A-28 | —Cl | 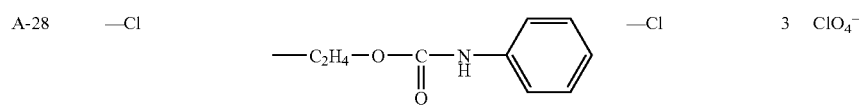 | —Cl | 3 | ClO₄⁻ |
| A-29 | —H | —CH₂—CONH₂ | —S—Ph | 2 | BF₄⁻ |
| A-30 | —H | —CH₂—CONH₂ | —O—Ph | 3 | BF₄⁻ |
| A-31 | —CO₂CH₃ | 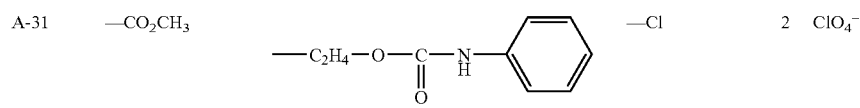 | —Cl | 2 | ClO₄⁻ |
| A-32 | —CONH—Ph | —CH₂CH₂—CO₂CH₃ | —S—Ph | 3 | ClO₄⁻ |
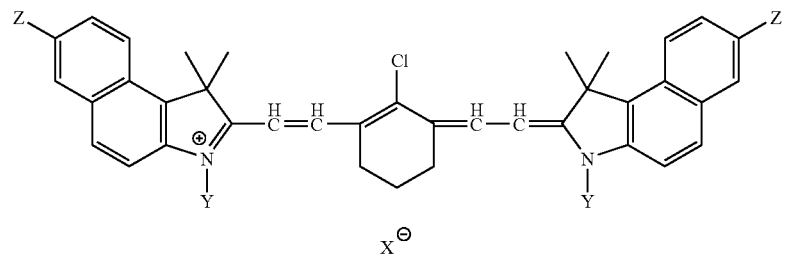
| | Z | Y | X |
|---|---|---|---|
| A-33 | —CO₂CH₃ | 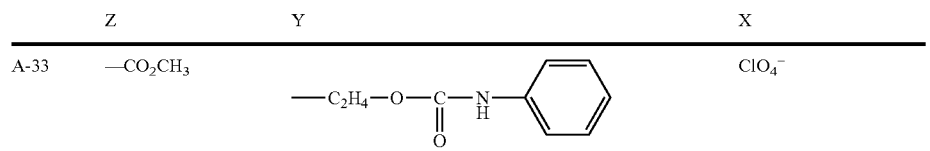 | ClO₄⁻ |

-continued

| | | | |
|---|---|---|---|
| A-34 | —CO₂CH₃ | —CH₂—CONH₂ | CF₃SO₃⁻ |
| A-35 | —CO₂CH₂—Ph | —CH₂—CONH₂ | CF₃SO₃⁻ |
| A-36 | —H | —CH₂—CONH₂ | CF₃SO₃⁻ |
| A-37 | —H | —C₂H₄—O—C(=O)—NH—C₆H₄—CO₂CH₃ | BF₄⁻ |

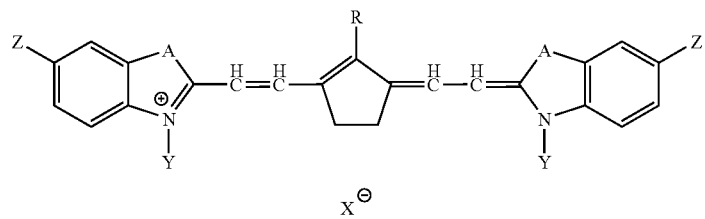

| | Z | Y | R | A | X |
|---|---|---|---|---|---|
| A-38 | —Cl | —C₂H₄—O—C(=O)—NH—Ph | —Cl | S | BF₄⁻ |
| A-39 | —H | —CH₂—CONH₂ | —Cl | S | BF₄⁻ |
| A-40 | —CO₂CH₂—Ph | —CH₂—CONH₂ | —S—Ph | S | CF₃SO₃⁻ |
| A-41 | —Cl | —C₂H₄—O—C(=O)—NH—Ph | —S—Ph | S | BF₄⁻ |
| A-42 | —CO₂CH₃ | —C₂H₄O—C(=O)—NH—C₆H₄—CO₂CH₃ | —NPh₂ | O | ClO₄⁻ |
| A-43 | —Cl | —C₂H₄O—C(=O)—NH—C₆H₄—CO₂CH₃ | —NPh₂ | S | ClO₄⁻ |

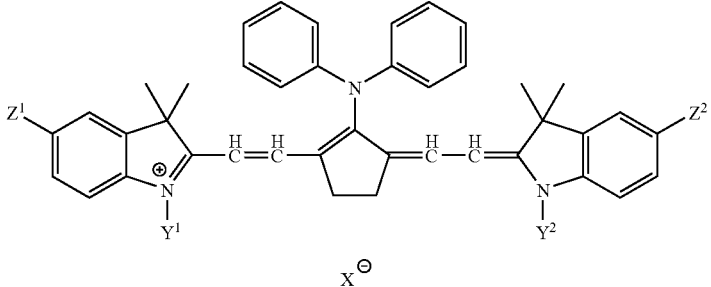

| | Z¹ | Z² | Y¹ | Y² | X |
|---|---|---|---|---|---|
| A-44 | —Cl | —H | —C₂H₄—O—C(=O)—NH—Ph | —C₂H₄—O—C(=O)—NH—Ph | BF₄⁻ |
| A-45 | —Cl | —Cl | —CH2—CONH2 | —CH₂CH₃ | BF₄⁻ |
| A-46 | —Cl | —H | —C₂H₄—O—C(=O)—NH—Ph | —CH₂CH₃ | CF₃SO₃⁻ |

-continued

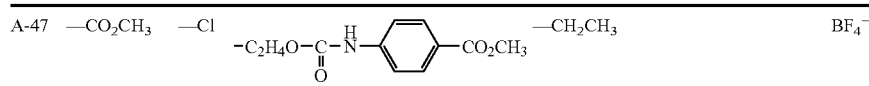

A representative synthesis example of the specified infrared absorber (A) will be described below, but it should not be construed that the invention is limited thereto.

<Synthesis of Specified Infrared Absorber (A-2)>

60.0 g of 5-chloro-2,3,3-trimethyl-3H-indolenine and 77.4 g of 2-bromoethanol were mixed and stirred at 120° C. for 2 hours. After cooling to room temperature, 200 mL of ethyl acetate was added, thereby depositing a crystal.

Next, the deposit was collected by filtration, washed with 400 mL of ethyl acetate, and then dried. 30.0 g of the resulting crystal was suspended in 150 mL of N,N-dimethylacetamide, to which were then added 11.1 g of phenyl isocyanate and 0.1 g of dibutyltin dilaurate, and the mixture was stirred at 100° C. for 4 hours. After cooling to room temperature, 300 mL of ethyl acetate was added, thereby depositing a crystal. The deposit was collected by filtration, washed with 500 mL of ethyl acetate, and then dried.

Subsequently, 35.0 g of the resulting crystal and 18.5 g of N-(2,5-bis((phenylamino)methylene)cyclopentylidene)-N-phenylbenzenealuminum tetrafluoroborate were dissolved in 380 mL of isopropyl alcohol, to which were then additionally added 10.2 of acetic anhydride and 25.3 g of triethylamine, and the mixture was refluxed by heating for 2 hours. After cooling to room temperature, 20.0 g of a 42% tetrafluoroboric acid aqueous solution and 15.0 g of acetic acid were added, and the mixture was stirred for 2 hours. A deposit was collected by filtration and washed with about 60 mL of ethyl acetate, thereby obtaining 20.0 g of the specified infrared absorber (A-2).

What the product is the specified infrared absorber (A-2) was confirmed by H-NMR, IR and mass spectrum.

The specified infrared absorber (A) according to the invention may be used singly or in admixture of two or more kinds thereof. From the viewpoints of sensitivity and prevention of staining in a non-image area, the addition amount of the specified infrared absorber is preferably from 0.01 to 50% by weight, more preferably from 0.1 to 20% by weight, and especially preferably from 1 to 10% by weight based on the total solids content of the polymerizable composition.

Also, a general-purpose infrared absorber as described later may be used jointly within the range where the effect of the invention is not hindered. In that case, the content of the general-purpose infrared absorber to be used jointly is preferably not more than 40% by weight in the total solids content of the whole of infrared absorbers.

(Infrared Absorber which can be Used Jointly)

As the infrared absorber which can be used jointly with the specified infrared absorber (A), known spectral sensitizing dyes or dyestuffs or pigments can be used so far as they have a function to absorb infrared light to convert it into heat energy.

<Spectral Sensitizing Dye or Dyestuff>

Examples of the spectral sensitizing dye or dyestuff preferred as the infrared absorber which can be used jointly in the invention include polynucleic aromatic compounds (for example, pyrene, perylene, and triphenylene), xanthenes (for example, fluorescein, eosine, erythrosine, Rhodamine B, and Rose Bengale), cyanines (for example, thiacarbocyanine and oxacarbocyanine), merocyanines (for example, merocyanine and carbomerocyanine), thiazines (for example, thionine, Methylene Blue, and Toluidine Blue), acridines (for example, Acridine Orange, chloroflavin, and acriflavine), phthalocyanines (for example, phthalocyanine and metalphthalocyanine), porphyrins (for example, tetraphenylporphyrin and central metal-substituted porphyrin), chlorophylls (for example, chlorophyll, chlorophyllin, and central metal-substituted chlorophyll), metal complexes, anthraquinones (for example, anthraquinone), squaliums (for example, squalium), and the following compound.

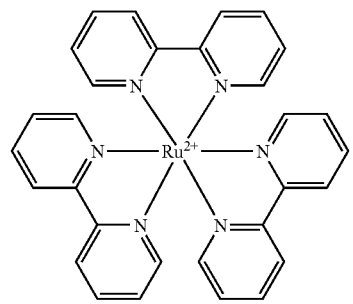

As more preferred spectral sensitizing dyes or dyestuffs, pyrylium salts described in JP-B-40-28499, for example,

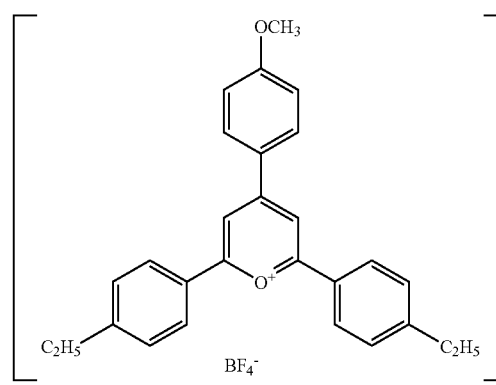

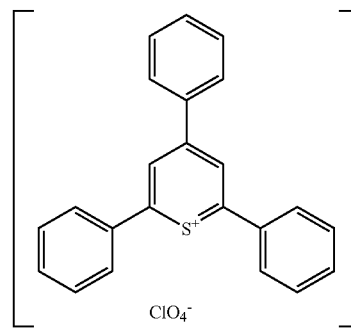

cyanines described in JP-B-46-42363, for example,
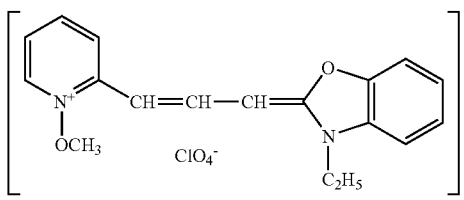
benzofuran dyes described in JP-A-2-63053, for example,
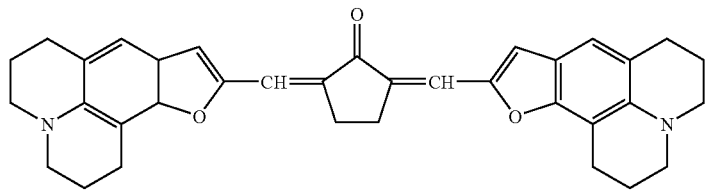
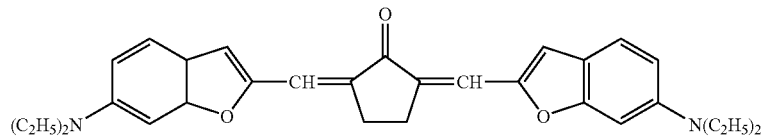
conjugated ketone dyes described in JP-A-2-85858 and JP-A-2-216154, for example,
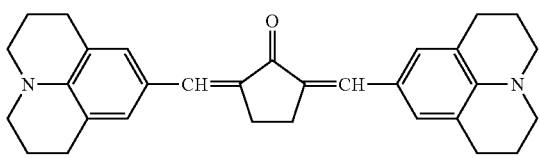
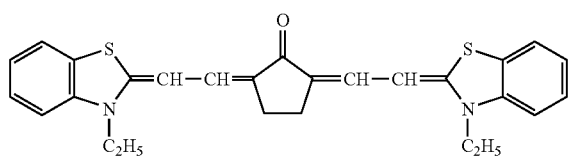
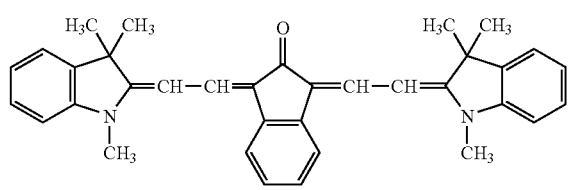
dyes described in JP-A-57-10605, azocinnamylidene derivatives described in JP-B-2-30321, for example,
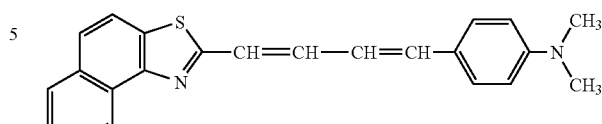
cyanine based dyes described in JP-A-1-287105, for example,
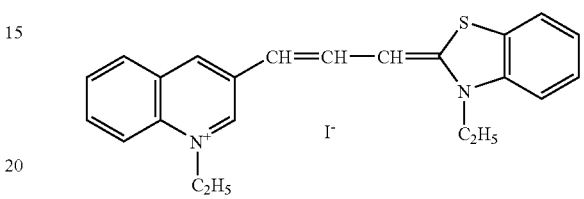
-continued
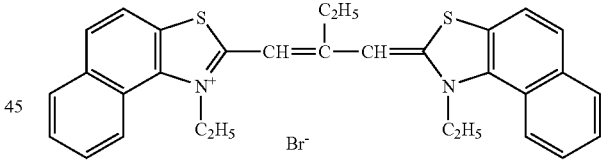
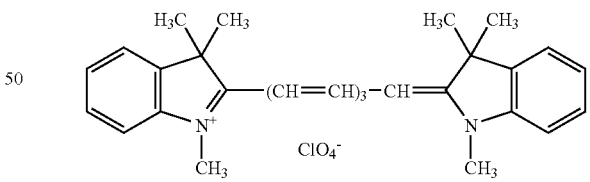
xanthene based dyes described in JP-A-62-31844, JP-A-62-31848, and JP-A-62-143043, for example,
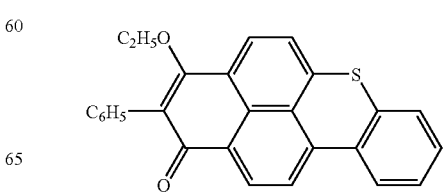

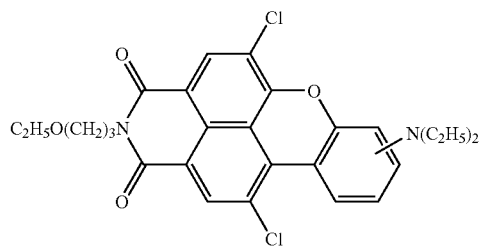

and aminostyryl ketones described in JP-B-59-28325, for example,

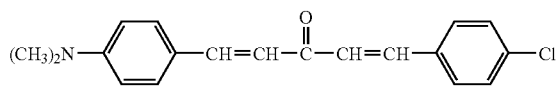

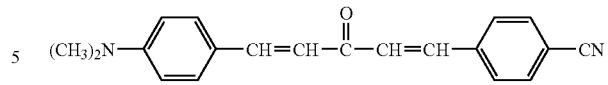

can be enumerated.

Also, as the sensitizing dye, the following infrared absorbers (dyestuffs or pigments) are especially preferably used. Preferred examples of the dyestuff include cyanine dyestuffs described in JP-A-58-125246, JP-A-59-84356, JP-A-59-202829, and JP-A-60-78787 and cyanine dyestuffs described in U.K. Patent No. 434,875.

Besides, as the cyanine dye which can be suitably used in the invention, ones described in paragraphs [0017] to [0019] of JP-A-2001-133969, paragraphs [0012] to [0038] of JP-A-2002-40638, and paragraphs [0012] to [0023] of JP-A-2002-23360 can be enumerated. Also, specific examples thereof will be given below.

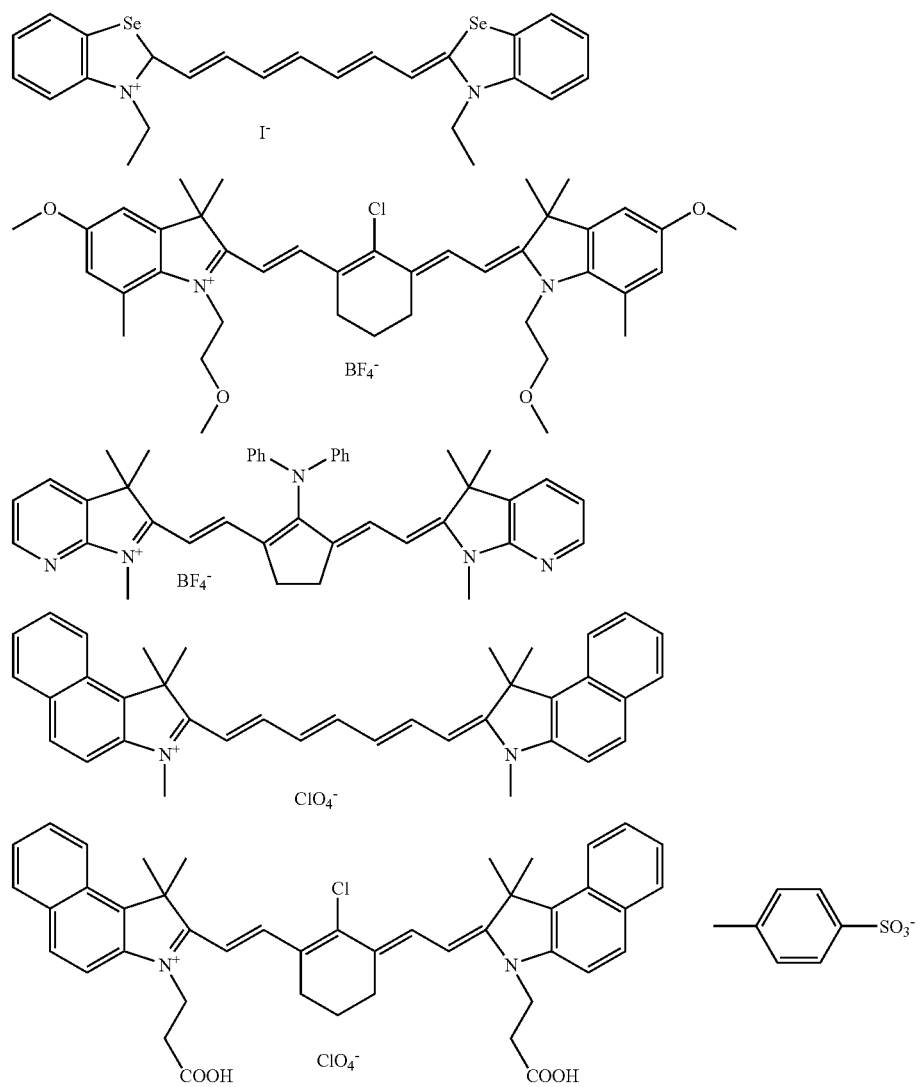

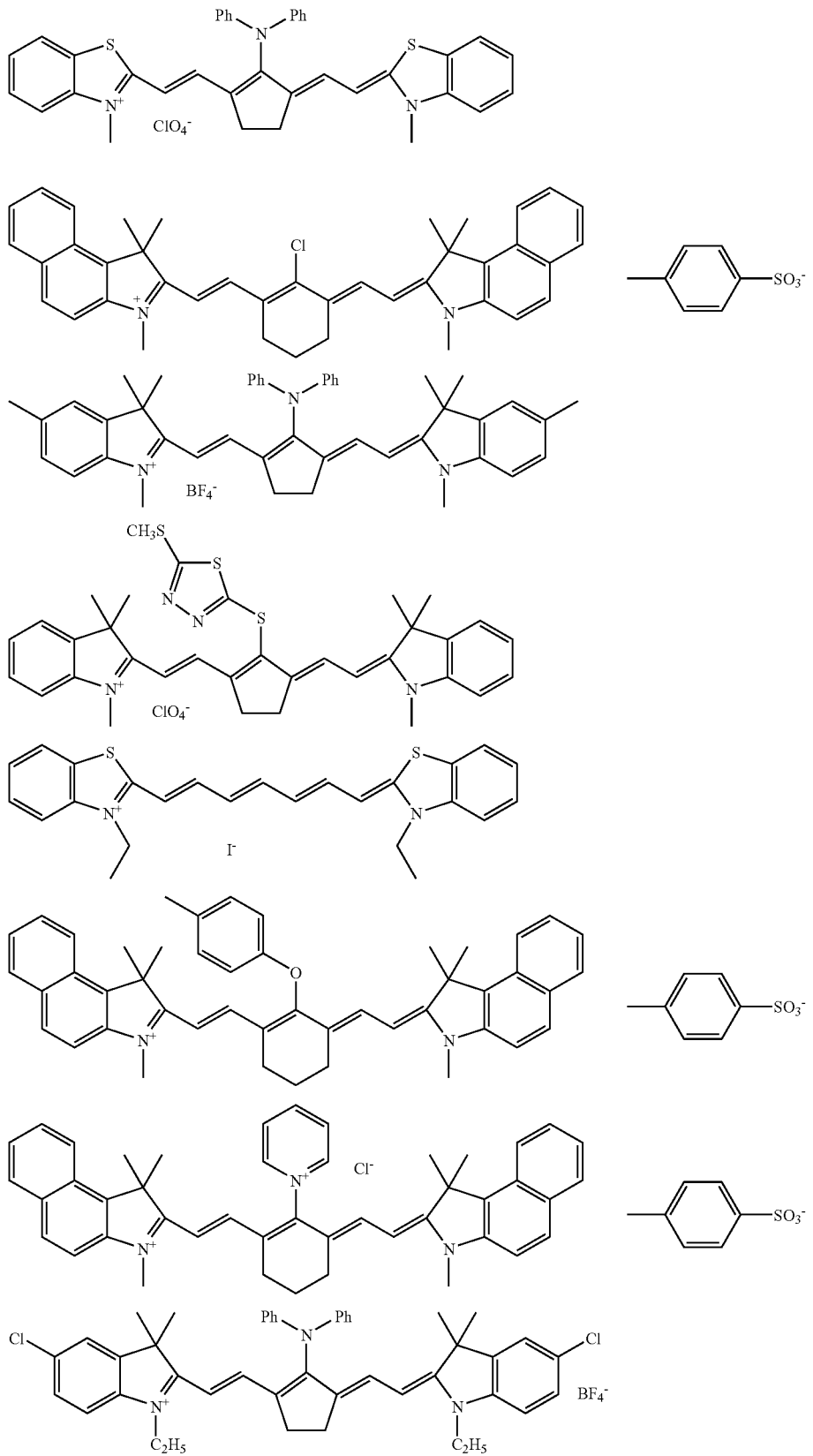

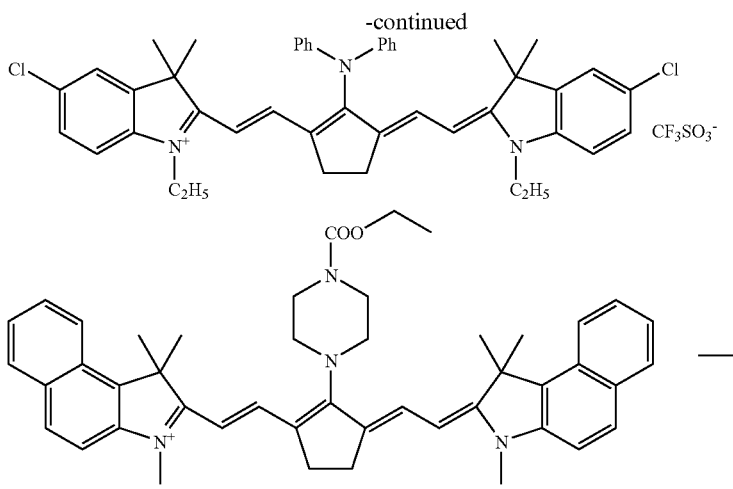

Also, near infrared absorbing sensitizers described in U.S. Pat. No. 5,156,938 are suitably used. Further, substituted aryl benzo(thio)pyrylium salts described in U.S. Pat. No. 3,881,924; trimethinethiapyrylium salts described in JP-A-57-142645 (U.S. Pat. No. 4,327,169); pyrylium based compounds described in JP-A-58-181051, JP-A-58-220143, JP-A-59-41363, JP-A-59-84248, JP-A-59-84249, JP-A-59-146063, and JP-A-59-146061; cyanine dyes described in JP-A-59-216146; pentamethinethiopyrylium salts described in U.S. Pat. No. 4,283,475; and pyrylium compounds described in JP-B-5-13514 and JP-B-5-19702 are preferably used, too.

Also, near infrared absorbing dyestuffs described as the formulae (I) and (II) in U.S. Pat. No. 4,756,993 and phthalocyanine based dyestuffs described in EP916513A2 can be enumerated as the preferred dyestuff.

Moreover, anionic infrared absorbers described in Japanese Patent Application No. 10-79912 can be suitably used. The anionic infrared absorber as referred to herein means one not having a cation structure on the mother nucleus of dye which substantially absorbs infrared light but having an anion structure. Examples thereof include (a) anionic metal complexes, (b) anionic carbon blacks, (c) anionic phthalocyanines, and (d) compounds represented by the following formula (VI). A counter cation of such an anionic infrared absorber is a proton-containing monovalent cation or polyvalent cation.

$$[G^9\text{-}M^5\text{-}G^{10}]_m(X^{10})^+.\qquad\text{Formula (VI)}$$

Here, the anionic metal complex (a) means one in which a central metal of the complex segment which substantially absorbs light and the whole of ligands form an anion.

As the anionic carbon black (b), carbon blacks in which an anion group such as a sulfonic group, a carboxylic group, and a phosphonic group is bonded as a substituent are enumerated. In order to introduce such a group into carbon black, there may be taken means for oxidizing carbon black with a prescribed acid as described in *Carbon Black Handbook, Third Edition* (edited by Carbon Black Association and published by Carbon Black Association, Apr. 5, 1995).

The anionic phthalocyanine (c) means one in which the anion group enumerated in preceding (b) is bonded as a substituent on the phthalocyanine skeleton, thereby forming an anion as a whole.

Next, the compound (d) represented by the formula (VI) will be described below in detail. In the foregoing formula (VI), $G^9$ represents an anionic substituent, and $G^{10}$ represents a neutral substituent. $(X^{10})^+$ represents a proton-containing cation having a valence of from 1 to m, and m represents an integer of from 1 to 6. $M^5$ represents a conjugated chain, and this conjugated chain $M^5$ may have a substituent or a ring structure. The conjugated chain $M^5$ can be represented by the following formula.

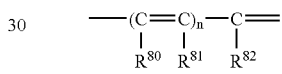

In the formula, $R^{80}$, $R^{81}$, and $R^{82}$ each independently represents a hydrogen atom, a halogen atom, a cyano group, an alkyl group, an aryl group, an alkenyl group, an alkynyl group, a carbonyl group, a thio group, a sulfonyl group, a sulfinyl group, an oxy group, or an amino group; and they may be taken together to form a ring structure. n represents an integer of from 1 to 8.

Of the anionic infrared absorbers represented by the foregoing formula (VI), the following IRA-1 to IRA-5 are preferably used.

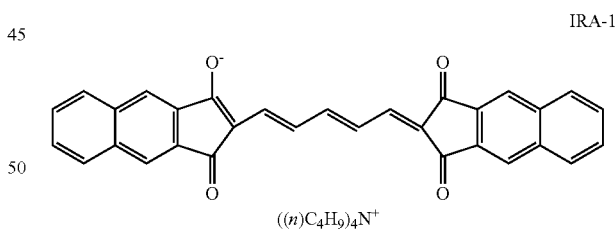

IRA-1

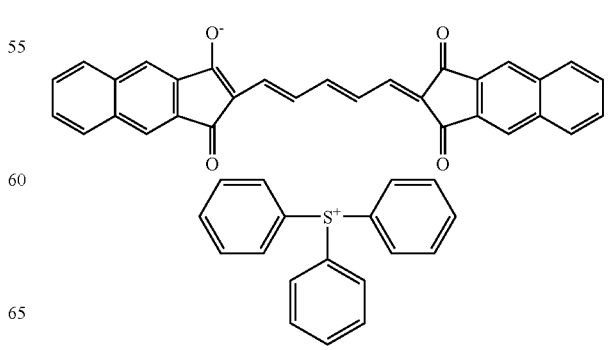

IRA-2

IRA-3
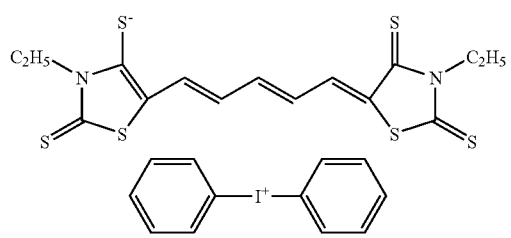
IRA-4
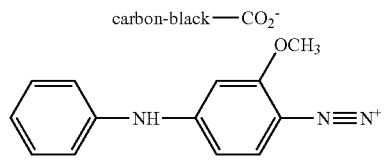
IRA-5
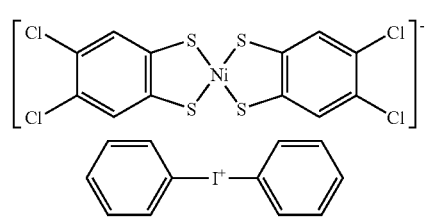
Also, cationic infrared absorbers represented by the following IRC-1 to IRC-44 can be preferably used.
IRC-1
IRC-2
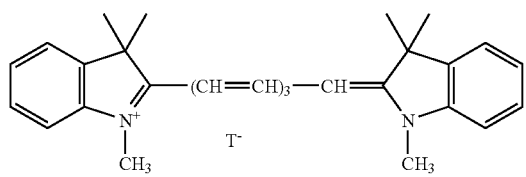 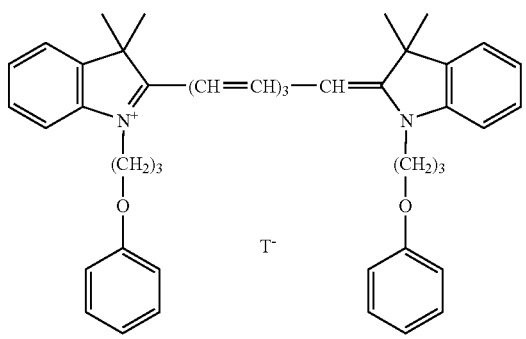
IRC-3
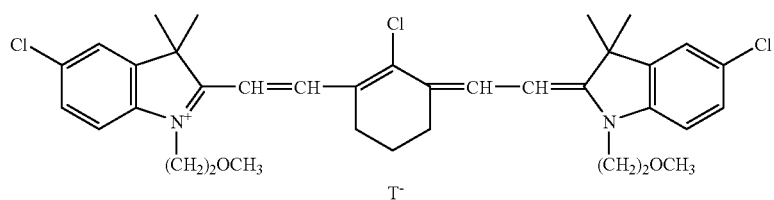
IRC-4
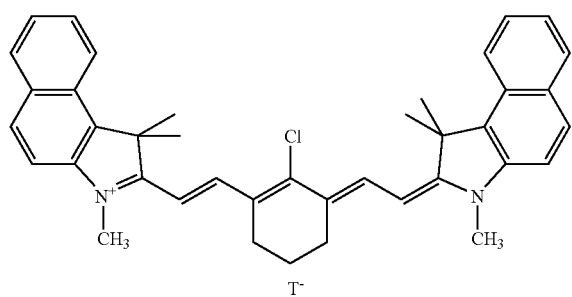

-continued
IRC-5
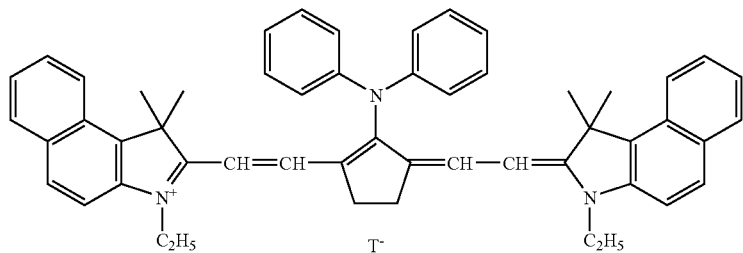
IRC-6
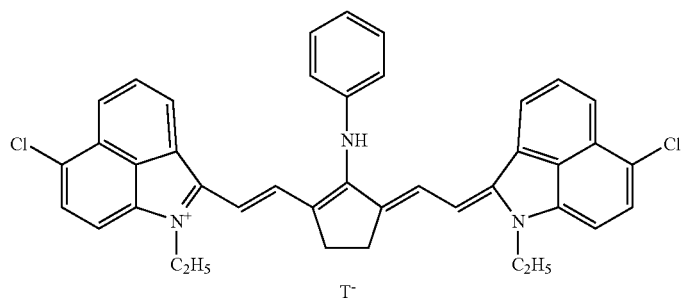
IRC-7
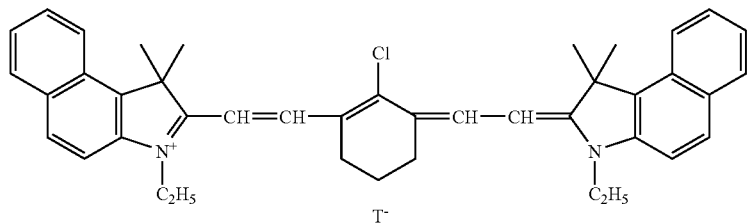
IRC-8
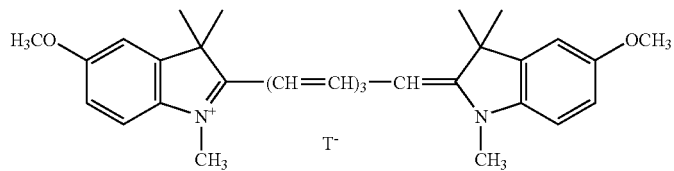
IRC-9
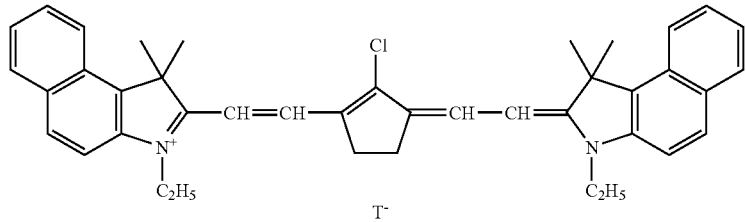
IRC-10  IRC-11
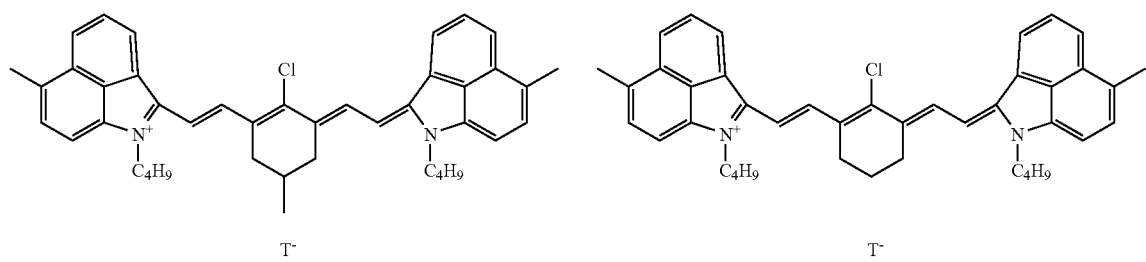

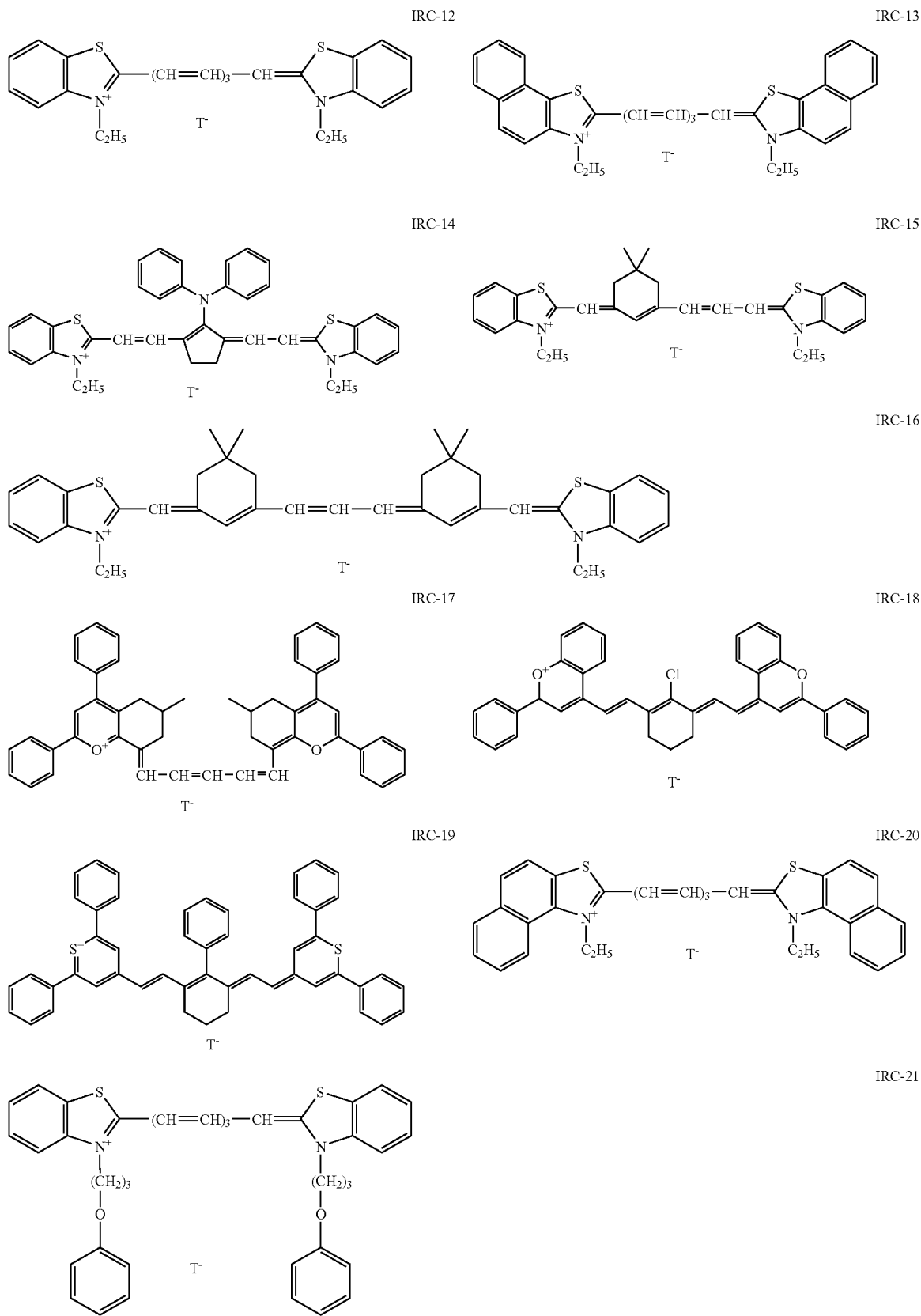

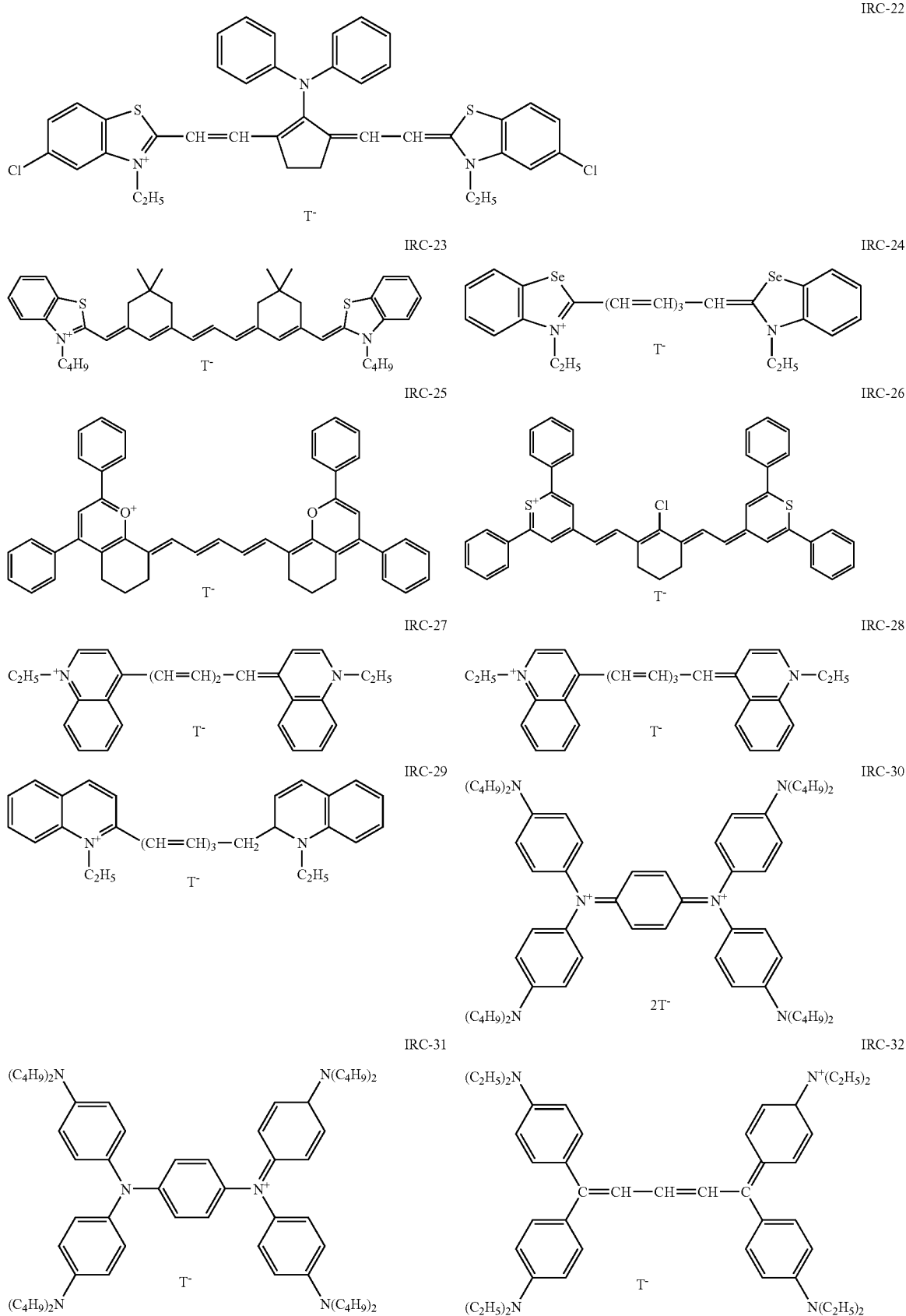

-continued
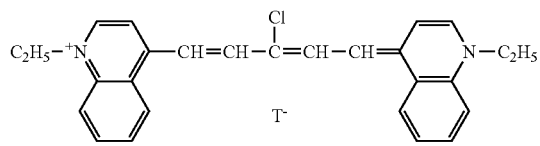
IRC-33
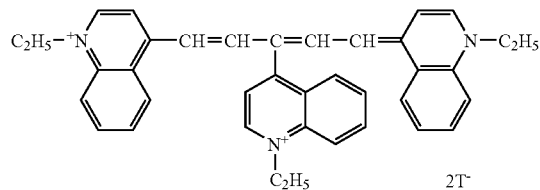
IRC-34
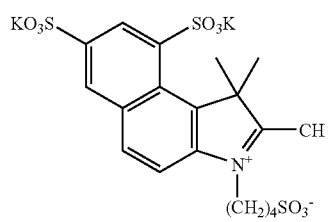
IRC-35
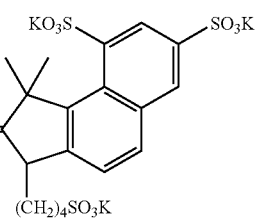
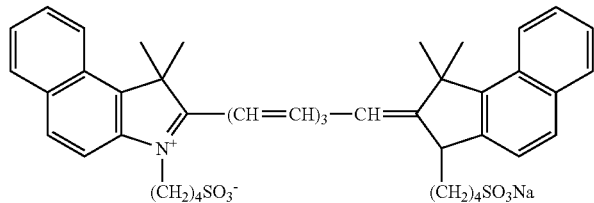
IRC-36
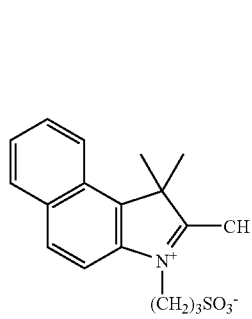
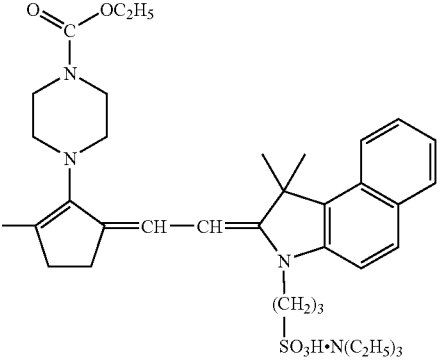
IRC-37
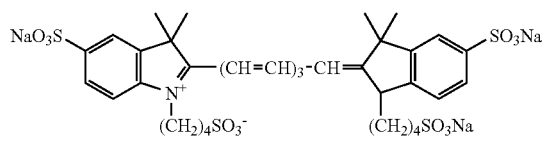
IRC-38
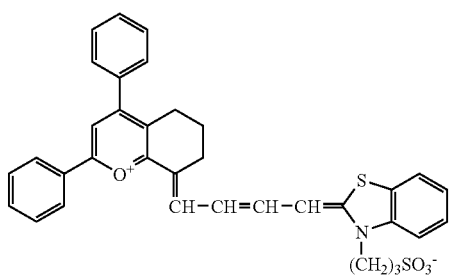
IRC-39
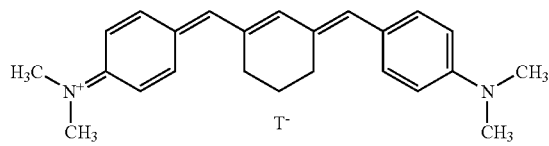
IRC-40
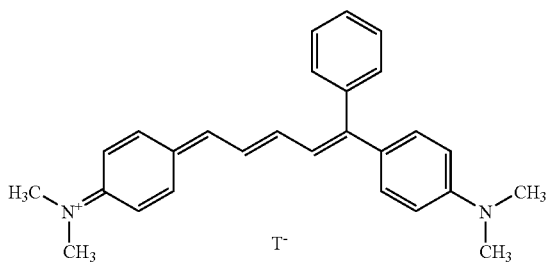
IRC-41

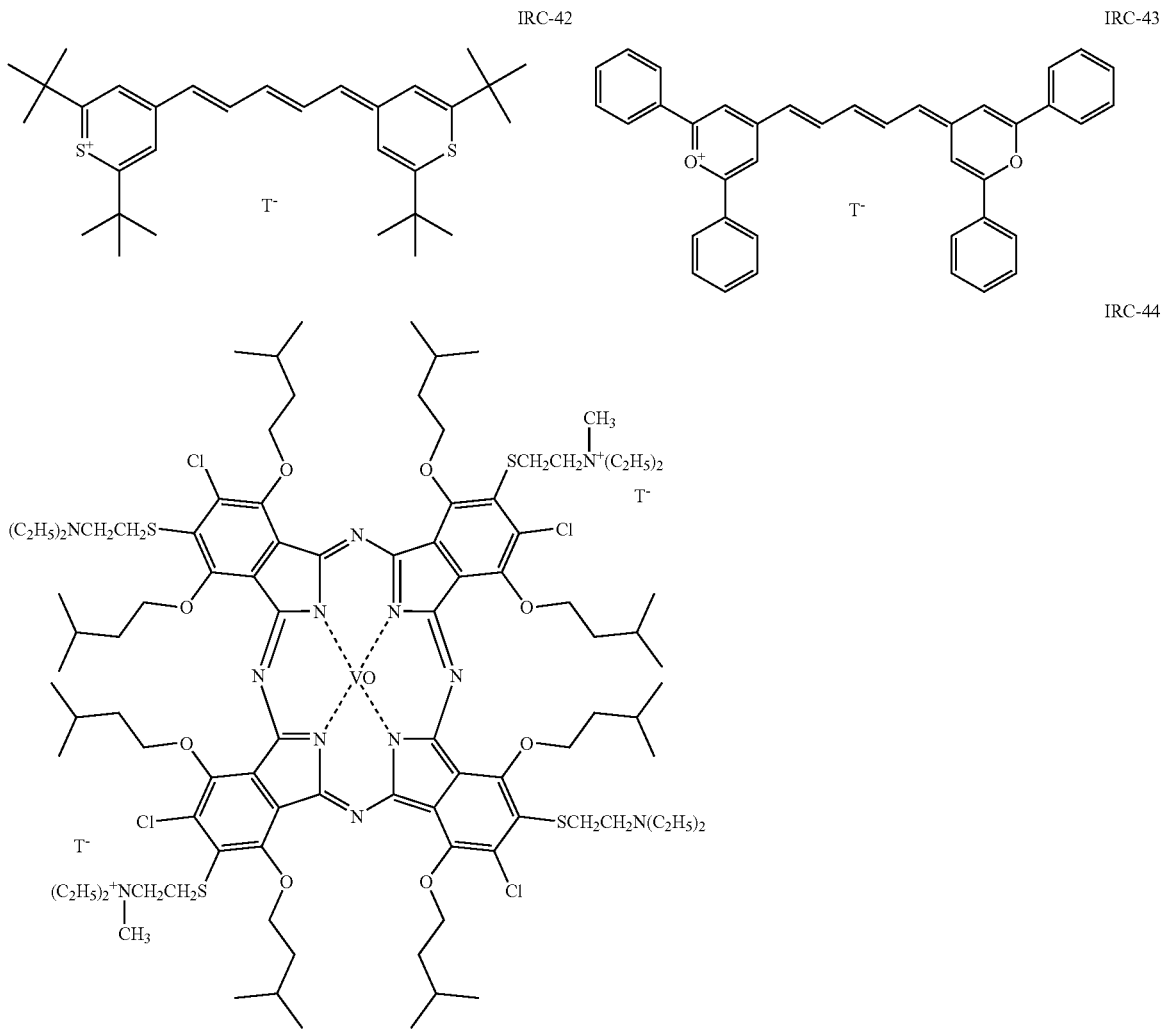

In the foregoing structural formulae, T⁻ represents a monovalent counter anion, and preferably a halogen anion (for example, $F^-$, $Cl^-$, $Br^-$, and $I^-$), a Lewis acid anion (for example, $BF_4^-$, $PF_6^-$, $SbCl_6^-$, and $ClO_4^-$), an alkylsulfonic acid anion, or an arylsulfonic acid anion.

The term "alkyl" of the foregoing alkylsulfonic acid means a linear, branched or cyclic alkyl group having from 1 to 20 carbon atoms, and specific examples thereof include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a hexadecyl group, an octadecyl group, an eicosyl group, a t-butyl group, an isopropyl group, an isobutyl group, a sec-butyl group, an isopentyl group, a neopentyl group, a 1-methylbutyl group, an isohexyl group, a 2-ethylhexyl group, a 2-methylhexyl group, a cyclohexyl group, a cyclopentyl group, and a 2-norbornyl group. Of these, linear alkyl groups having from 1 to 12 carbon atoms, branched alkyl groups having from 3 to 12 carbon atoms, and cyclic alkyl groups having from 5 to 10 carbon atoms are more preferable.

Also, the term "aryl" of the foregoing arylsulfonic acid means one composed of a single benzene ring, one in which two or three benzene rings form a fused ring, or one in which a benzene ring and a 5-membered unsaturated ring form a fused ring. Specific examples thereof include a phenyl group, a naphthyl group, an anthryl group, a phenanthryl group, an indenyl group, an acenaphthenyl group, and a fluorenyl group. Of these, a phenyl group and a naphthyl group are more preferable.

Also, nonionic infrared absorbers represented by the following IRN-1 to IRN-9 can be preferably used.

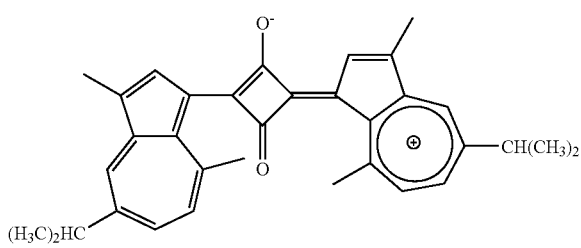

IRN-2
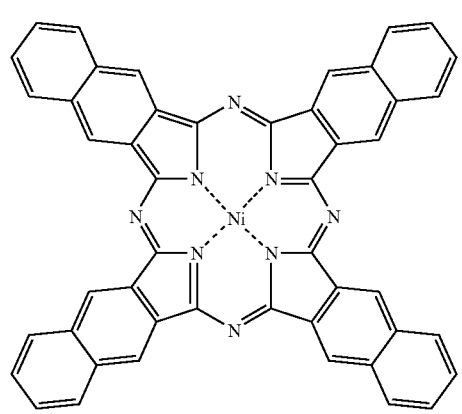

IRN-3
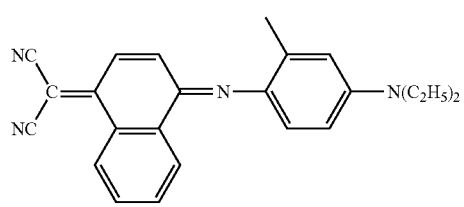

IRN-8
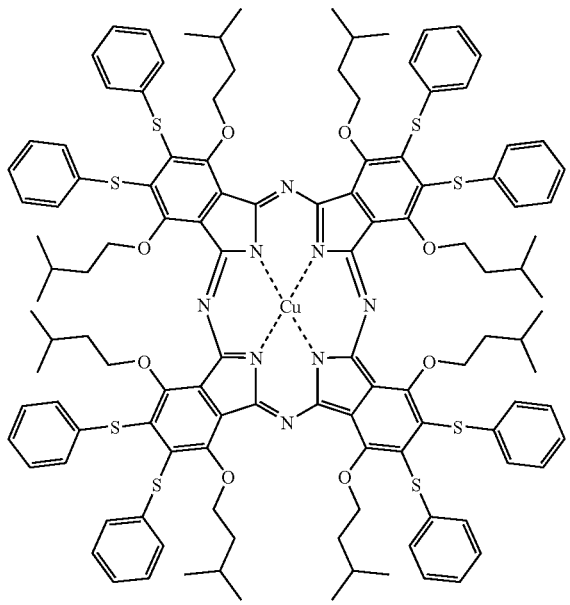

IRN-4
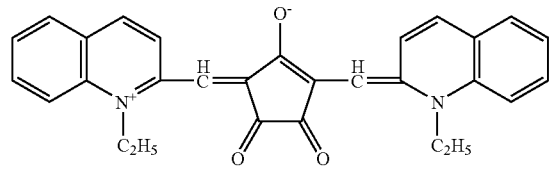

IRN-5
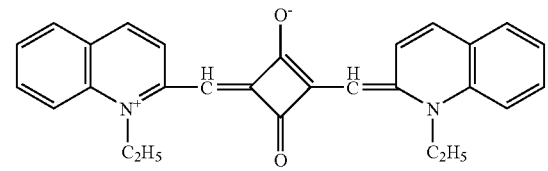

IRN-6
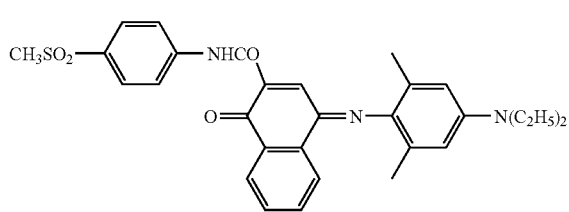

IRN-7
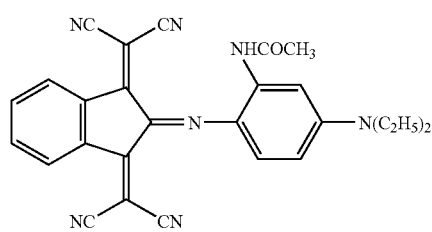

IRN-9

Of the foregoing illustrative compounds, IRA-1 is especially preferable as the anionic infrared absorber; IRC-7, IRC-30, IRC-40, and IRC-42 are especially preferable as the cationic infrared absorber; and IRN-9 is especially preferable as the nonionic infrared absorber.

<Pigment>

As the pigment which can be used jointly in the invention, commercially available pigments and pigments described in *Color Index (C.I.) Handbook, Saishin Ganryo Binran* (Latest Pigment Handbook) (edited by Japan Pigment Technical Association, 1977), *Saishin Ganyo Oho Gijutsu* (Latest Pigment Application Technology) (published by CMC Publishing Co., Ltd., 1986), and *Insatsu Inki Gijutsu* (Printing Ink Technology) (published by CMC Publishing Co., Ltd., 1984) can be utilized.

With respect to the kind of the pigment, black pigments, yellow pigments, orange pigments, brown pigments, red pigments, violet pigments, blue pigments, green pigments, fluorescent pigments, metal powder pigments, and others (for example, polymer-bonded dyes) are enumerated. Specific examples thereof include insoluble azo pigments, azo lake pigments, condensed azo pigments, chelate azo pigments, phthalocyanine based pigments, anthraquinone based pigments, perylene or perynone based pigments, thioindigo based pigments, quinacridone based pigments, dioxazine based pigments, isoindolinone based pigments, quinophthalone based pigments, dyeing lake pigments, azine pigments, nitroso pigments, nitro pigments, natural pigments, fluorescent pigments, inorganic pigments, and carbon black. Of these pigments, carbon black is preferable.

Such a pigment may be used without being subjected to a surface treatment or after being subjected to a surface treatment. As the method for surface treatment, a method of coating the pigment surface with a resin or a wax, a method of depositing a surfactant on the pigment surface, a method of binding a reactive substance (for example, silane coupling agents, epoxy compounds, and polyisocyanates) onto the pigment surface, and the like are considered. The foregoing surface treatment methods are described in *Kinzoku Sekken No Seishitsu To Oyo* (Nature and Application of Metallic Soap) (published by Saiwai Shobo Co., Ltd.), *Insatsu Inki Gijutsu* (Printing Ink Technology) (published by CMC Publishing Co., Ltd., 1984), and *Saishin Ganyo Oho Gijutsu* (Latest Pigment Application Technology) (published by CMC Publishing Co., Ltd., 1986).

The particle size of the pigment is preferably in the range of from 0.01 µm to 10 µM, more preferably from 0.05 µm to 1 µm, and especially preferably from 0.1 µm to 1 µm. The particle size of the pigment of less than 0.01 µm is not preferable in view of stability of a dispersion in the coating liquid for image recording layer, and the particle size of the pigment exceeding 10 µm is not preferable in view of uniformity of the image recording layer.

As a method for dispersing the pigment, known dispersion technologies which are employed in the ink production and toner production, etc. can be employed. Examples of dispersion machines include a supersonic dispersion machine, a sand mill, an attritor, a pearl mill, a super mill, a ball mill, an impeller, a disperser, a KD mill, a colloid mill, a dynatron, a three-screw mill, and a pressure kneader. The details are descried in *Saishin Ganyo Oho Gijutsu* (Latest Pigment Application Technology) (published by CMC Publishing Co., Ltd., 1986).

The infrared absorber which is added for the purpose of promoting a curing reaction of the polymerizable composition according to the invention may be directly added together with other components in the composition. The same effect can be obtained by providing an adjacent separate layer and adding the infrared absorber therein.

In particular, in the case where the polymerizable composition according to the invention is used as a material of a negative working recording layer of a lithographic printing plate precursor, the polymerizable composition may be added in the sane layer as the recording layer or may be added in a layer provided separately. However, in preparing a negative working lithographic printing plate precursor, it is preferable from the viewpoint of sensitivity that an optical density at the absorption maximum in the wavelength of the recording layer in the range of from 300 nm to 1,200 nm lies between 0.1 and 3.0. Since the optical density is determined by the addition amount of the infrared absorber and the thickness of the recording layer, a prescribed optical density is obtained by controlling the conditions of the both. The optical density of the recording layer can be measured by the ordinary manner. Examples of the measurement method include a method in which a recording layer having a thickness as properly determined within the necessary range of the coating amount after drying as a lithographic printing plate is formed on a transparent or white support, and its optical density is measured by a transmission type optical densitometer; and a method in which a recording layer is formed on a reflective support such as aluminum, and its reflection density is measured.

[(B1) Radical Generator]

The polymerizable composition according to the invention is characterized by containing a radical generator. The radical generator as referred to herein means a compound which generates a radical by light or heat energy and initiates and promotes a polymerization reaction of a radical polymerizable compound (C1) as described later.

In the invention, preferred examples of the radical initiator include (a) aromatic ketones, (b) onium salt compounds, (c) organic peroxides, (d) thio compounds, (e) hexaarylbiimidazole compounds, (f) keto oxime ester compounds, (g) borate compounds, (h) azinium compounds, (i) metallocene compounds, (O) active ester compounds, (k) carbon-halogen bond-containing compound, and (l) azo based compounds. Specific examples of the foregoing (a) to (l) will be given below, but it should not be construed that the invention is limited thereto.

(a) Aromatic Ketones:

Examples of the aromatic ketones (a) which are preferable as the radical generator to be used in the invention include compounds having a benzophenone skeleton or a thioxanthone skeleton as described in J. F. Fouassier and J. F. Rabek, *RADIATION CURING IN POLYMER SCIENCE AND TECHLOGY*, pp. 77-117 (1993). Specific examples thereof are as follows.

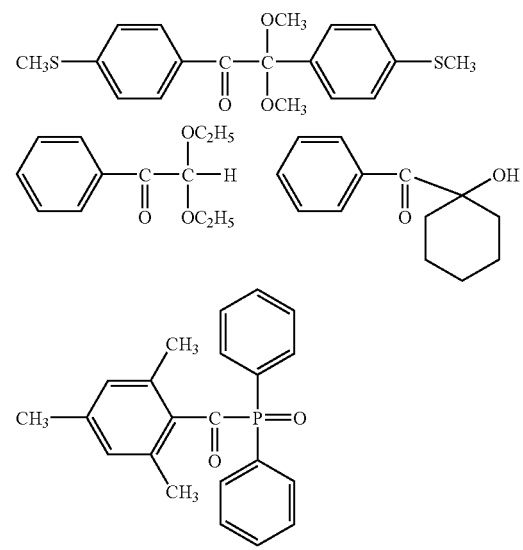

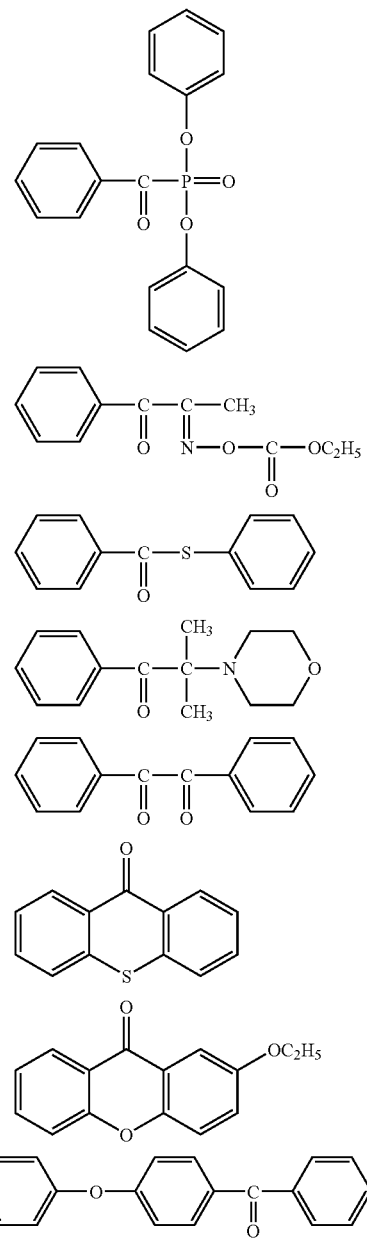

Of these, especially preferred examples of the aromatic ketone (a) are as follows.

α-Thiobenzophenone compounds described in JP-B-47-6416 and benzoin ether compounds described in JP-B-47-3981, for example, the following compound:

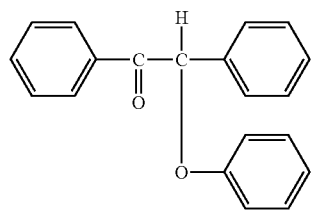

α-Substituted benzoin compounds described in JP-B-47-22325, for example, the following compound:

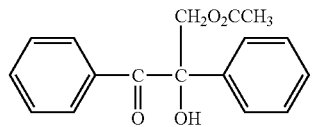

Benzoin derivatives described in JP-B-47-23664, aroylphosphonic esters described in JP-A-57-30704, and dialkoxybenzophenones described in JP-B 60-26483, for example, the following compound:

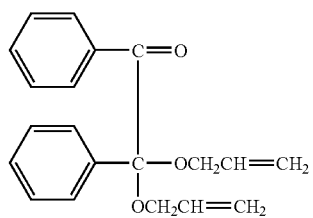

Benzoin ethers described in JP-B-60-26403 and JP-A-62-81345, for example, the following compound:

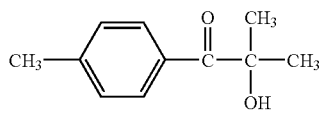

α-Aminobenzophenones described in JP-B-1-34242, U.S. Pat. No. 4,318,791, and European Patent No. 0284561A1, for example, the following compounds:

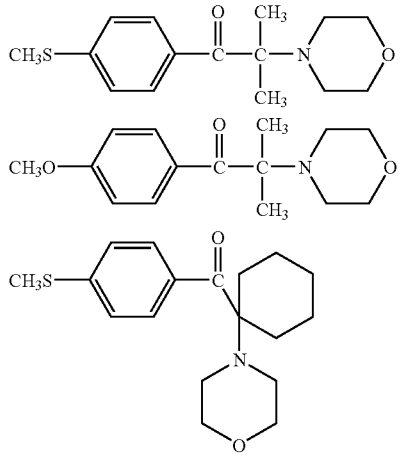

p-Di(dimethylaminobenzoyl)benzene described in JP-A-2-211452, which is represented by the following formula:

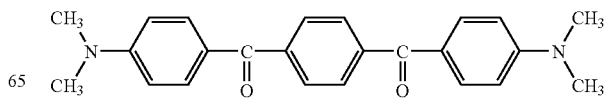

Thio substituted aromatic ketones described in JP-A-61-194062, for example, the following compound:

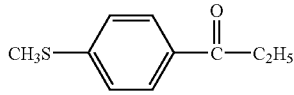

Acylphosphine sulfides described in JP-B-2-9597, for example, the following compounds:

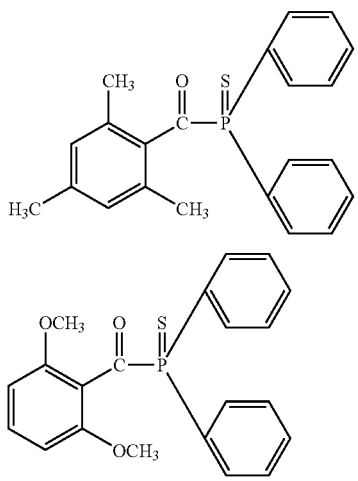

Acylphosphines described in JP-B-2-9596, for example, the following compounds:

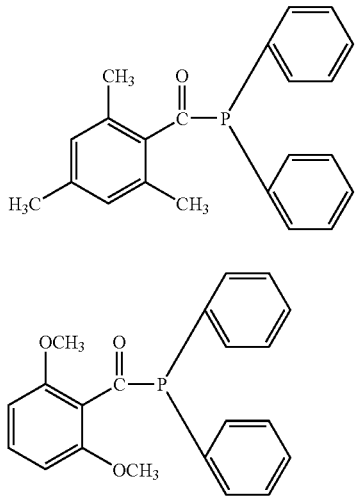

Also, thioxanthones described in JP-B-63-61950 and coumarins described in JP-B-59-42864 can be enumerated.

(b) Onium Salt Compounds:

Examples of the onium salt compounds (b) which are preferable as the radical generator to be used in the invention include compounds represented by the following formulae (1) to (3).

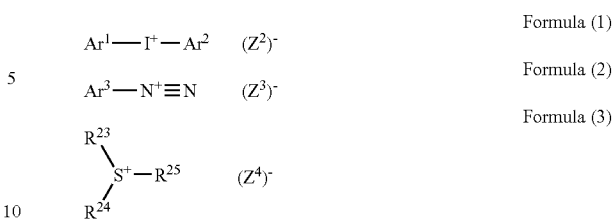

In the formula (1), $Ar^1$ and $Ar^2$ each independently represents an optionally substituted aryl group having not more than 20 carbon atoms. In the case where the aryl group has a substituent, preferred examples of the substituent include a halogen atom, a nitro group, an alkyl group having not more than 12 carbon atoms, an alkoxy group having not more than 12 carbon atoms, and an aryloxy group having not more than 12 carbon atoms. $(Z^2)^-$ represents a counter ion selected from the group consisting of a halogen ion, a perchloric acid ion, a carboxylic acid ion, a tetrafluoroborate ion, a hexafluorophosphate ion, and a sulfonic acid ion; and preferably a perchloric acid ion, a hexafluorophosphate ion, or an arylsuflonic acid ion.

In the formula (2), $Ar^3$ represents an optionally substituted aryl group having not more than 20 carbon atoms. Preferred examples of the substituent include a halogen atom, a nitro group, an alkyl group having not more than 12 carbon atoms, an alkoxy group having not more than 12 carbon atoms, an aryloxy group having not more than 12 carbon atoms, an alkylamino group having not more than 12 carbon atoms, a dialkylamino group having not more than 12 carbon atoms, an arylamino group having not more than 12 carbon atoms, and a diarylamino group having not more than 12 carbon atoms. $(Z^3)^-$ represents a counter ion which is synonymous with $(Z^2)^-$.

In the formula (3), $R^{23}$, $R^{24}$, and $R^{25}$ may be the same or different and each represents an optionally substituted hydrocarbon group having not more than 20 carbon atoms. Preferred examples of the substituent include a halogen atom, a nitro group, an alkyl group having not more than 12 carbon atoms, an alkoxy group having not more than 12 carbon atoms, and an aryloxy group having not more than 12 carbon atoms. $(Z^4)^-$ represents a counter ion which is synonymous with $(Z^2)^-$.

In the invention, specific examples of the onium salt which can be suitably used include ones described in paragraphs [0030] to [0033] of Japanese Patent Application No. 11-310623 and ones described in paragraphs [0015] to [0046] of Japanese Patent Application No. 2000-160323, all of which applications are previously proposed by the present applicant; and specified aromatic sulfonium salt compounds described in Japanese Patent Application Nos. 2000-266797, 2001-177150, 2000-160323, 2000-184603, 2000-310808, 2002-265467 and 2002-366539.

The onium salt which is used in the invention preferably has a maximum absorption wavelength of not more than 400 nm, and more preferably not more than 360 nm. In this way, by making the absorption wavelength fall within the ultraviolet region, it is possible to carry out handling of a lithographic printing plate precursor under white light.

(c) Organic Peroxides:

As the organic peroxide (c) which is preferable as the radical generator to be used in the invention, almost all of organic compounds having one or more oxygen-oxygen bonds in the molecule are included. Examples thereof include methyl ethyl ketone peroxide, cyclohexanone peroxide, 3,3,5-trimethylcyclohexanone peroxide, methylcyclohexanone peroxide, acetylacetone peroxide, 1,1-bis(tertiary butylperoxy)-3,3,5-trimethylcyclohexane, 1,1-bis(tertiary butylperoxy)cyclohexane, 2,2-bis(tertiary butylperoxy)butane, tertiary butyl hydroperoxide, cumene hydroperoxide, diisopropylbenzene hydroperoxide, p-methane hydroperoxide, 2,5-dimethylhexane-2,5-dihydroperoxide, 1,1,3,3-tetramethylbutyl hydroperoxide, di-tertiary butyl peroxide, tertiary butylcumyl peroxide, dicumyl peroxide, bis(tertiary butylperoxyisopropyl)benzene, 2,5-dimethyl-2,5-di(tertiary butylperoxy)hexane, 2,5-xanoyl peroxide, succinic acid peroxide, benzoyl peroxide, 2,4-dichlorobenzoyl peroxide, m-toluoyl peroxide, diisopropylperoxydicarbonate, di-2-ethylhexylperoxydicarbonate, di-2-ethoxyethylperoxydicarbonate, dimethoxyisopropylperoxycarbonate, di(3-methyl-3-methoxybutyl)peroxydicarbonate, tertiary butylperoxyacetate, tertiary butylperoxypivalate, tertiary butylperoxyneodecanoate, tertiary butylperoxyoctanoate, tertiary butylperoxy-3,5,5-trimethylhexanoate, tertiary butylperoxylaurate, tertiary carbonate, 3,3',4,4'-tetra-(t-butylperoxycarbonyl)benzophenone, 3,3',4,4'-tetra-(t-amylperoxycarbonyl)benzophenone, 3,3',4,4'-tetra-(t-hexylperoxycarbonyl)benzophenone, 3,3',4,4'-tetra-(t-octylperoxycarbonyl)benzophenone, 3,3',4,4'-tetra-(cumylperoxycarbonyl)benzophenone, 3,3',4,4'-tetra-(p-isopropylcumylperoxycarbonyl)benzophenone, carbonyldi(t-butylperoxydihydrogendiphthalate), and carbonyldi(t-hexylperoxydihydrogendiphthalate).

Of these, peroxy ester based compounds such as 3,3',4,4'-tetra-(t-butylperoxycarbonyl)benzophenone, 3,3',4,4'-tetra-(t-amylperoxycarbonyl)benzophenone, 3,3',4,4'-tetra-(t-hexylperoxycarbonyl)benzophenone, 3,3',4,4'-tetra-(t-octylperoxycarbonyl)benzophenone, 3,3',4,4'-tetra-(cumylperoxycarbonyl)benzophenone, 3,3',4,4'-tetra-(p-isopropylcumylperoxycarbonyl)benzophenone, and di-t-butyldiperoxyisophthalate are preferable.

(d) Thio Compounds:

Examples of the thio compounds (d) which are preferable as the radical generator to be used in the invention include compounds represented by the following formula (4).

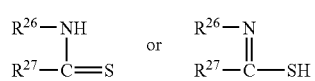

Formula (4)

Here, $R^{26}$ represents an alkyl group, an aryl group, or a substituted aryl group; and $R^{27}$ represents a hydrogen atom or an alkyl group. Also, $R^{26}$ and $R^{27}$ each represents a non-metallic atomic group necessary such that they are taken together to form a 5-membered to 7-membered ring which may contain a hetero atom selected from an oxygen atom, a sulfur atom, and a nitrogen atom.

As the alkyl group in the foregoing formula (4), ones having from 1 to 4 carbon atoms are preferable. Also, as the aryl group, ones having from 6 to 10 carbon atoms, such as phenyl and naphthyl, are preferable; and as the substituted aryl group, ones in which the foregoing aryl group is substituted with a halogen atom, an alkyl group (for example, a methyl group), or an alkoxy group (for example, a methoxy group and an ethoxy group) are included. $R^{27}$ is preferably an alkyl group having from 1 to 4 carbon atoms. Specific examples of the thio compound represented by the formula (4) will be given below.

| No. | $R^{26}$ | $R^{27}$ |
|---|---|---|
| 1 | —H | —H |
| 2 | —H | —$CH_3$ |
| 3 | —$CH_3$ | —H |
| 4 | —$CH_3$ | —$CH_3$ |
| 5 | —$C_6H_5$ | —$C_2H_5$ |
| 6 | —$C_6H_5$ | —$C_4H_9$ |
| 7 | —$C_6H_4Cl$ | —$CH_3$ |
| 8 | —$C_6H_4Cl$ | —$C_4H_9$ |
| 9 | —$C_6H_4$—$CH_3$ | —$C_4H_9$ |
| 10 | —$C_6H_4$—$OCH_3$ | —$CH_3$ |
| 11 | —$C_6H_4$—$OCH_3$ | —$C_2H_5$ |
| 12 | —$C_6H_4$—$OC_2H_5$ | —$CH_3$ |
| 13 | —$C_6H_4$—$OC_2H_5$ | —$C_2H_5$ |
| 14 | —$C_6H_4$—$OCH_3$ | —$C_4H_9$ |
| 15 | —$(CH_2)_2$— | |
| 16 | —$(CH_2)_2$—S— | |
| 17 | —$CH(CH_3)$—$CH_2$—S— | |
| 18 | —$CH_2$—$CH(CH_3)$—S— | |
| 19 | —$C(CH_3)_2$—$CH_2$—S— | |
| 20 | —$CH_2$—$C(CH_3)_2$—S— | |
| 21 | —$(CH_2)_2$—O— | |
| 22 | —$CH(CH_3)$—$CH_2$—O— | |
| 23 | —$C(CH_3)_2$—$CH_2$—O— | |
| 24 | —CH=CH—$N(CH_3)$— | |
| 25 | —$(CH_2)_3$—S— | |
| 26 | —$(CH_2)_2$—$CH(CH_3)$—S— | |
| 27 | —$(CH_2)_3$—O— | |
| 28 | —$(CH_2)_5$— | |
| 29 | —$C_6H_4$—O— | |
| 30 | —N=$C(SCH_3)$—S— | |
| 31 | —$C_6H_4$—NH— | |
| 32 | 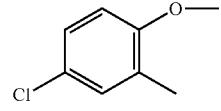 | |

(e) Hexaarylbiimidazole Compounds:

Examples of the hexaarylbiimidazole compounds (e) which are preferable as the radical generator to be used in the invention include lophine dimers described in JP-B-45-37377 and JP-B-44-86516, such as 2,2'-bis(o-chlorophenyl)-4,4',5,5'-tetraphenylbiimidazole, 2,2'-bis(o-bromophenyl)-4,4',5,5'-tetraphenylbiimidazole, 2,2'-bis(o,p-dichlorophenyl)-4,4',5,5'-tetraphenylbiimidazole, 2,2'-bis(o-chlorophenyl)-4,4',5,5'-tetra(m-methoxyphenyl) biimidazole, 2,2'-bis(o,o'-dichlorophenyl)-4,4',5,5'-tetraphenylbiimidazole, 2,2'-bis(o-nitrophenyl)-4,4',5,5'-tetraphenylbiimidazole, 2,2'-bis(o-methylphenyl)-4,4',5,5'-tetraphenylbiimidazole, and 2,2'-bis(o-trifluorophenyl)-4,4', 5,5'-tetraphenylbiimidazole.

(f) Keto Oxime Ester Compounds:

Examples of the keto oxime ester compounds (f) which are preferable as the radical generator to be used in the invention include 3-benzoyloxyiminobutan-2-one, 3-acetoxyiminobutan-2-one, 3-propionyloxyiminobutan-2-one, 2-acetoxyiminopentan-3-one, 2-acetoxyimino-1-phenylpropan-1-one, 2-benzoyloxyimino-1-phenylpropan-1-one, 3-p-toluenesulfonyloxyiminobutan-2-one, and 2-ethoxycarbonyloxyimino-1-phenylpropan-1-one.

(g) Borate Compounds:

Examples of the borate compounds (g) which are preferable as the radical generator to be used in the invention include compounds represented by the following formula (5).

Formula (5)

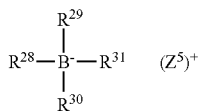

Here, $R^{28}$, $R^{29}$, $R^{30}$, and $R^{31}$ may be the same or different and each represents a substituted or unsubstituted alkyl group, a substituted or unsubstituted aryl group, a substituted or unsubstituted alkenyl group, a substituted or unsubstituted alkynyl group, or a substituted or unsubstituted heterocyclic group. Two or more of $R^{28}$, $R^{29}$, $R^{30}$, and $R^{31}$ may be taken together to form a cyclic structure. However, at least one of $R^{28}$, $R^{29}$, $R^{30}$, and $R^{31}$ is a substituted or unsubstituted alkyl group. $(Z^5)^+$ represents an alkali metal cation or a quaternary ammonium cation.

The alkyl group in the foregoing $R^{28}$ to $R^{31}$ includes linear, branched or cyclic alkyl groups, and ones having from 1 to 18 carbon atoms are preferable. Specific examples thereof include methyl, ethyl, propel, isopropyl, butyl, pentyl, hexyl, octyl, stearyl, cyclobutyl, cyclopentyl, and cyclohexyl. Also, the substituted alkyl group includes ones in which the foregoing alkyl group has a substituent such as a halogen atom (for example, —Cl and —Br), a cyano group, a nitro group, an aryl group (preferably a phenyl group), a hydroxyl group, —COOR$^{32}$ (wherein $R^{32}$ represents a hydrogen atom or an alkyl group having from 1 to 14 carbon atoms, or an aryl group), —OCOR$^{33}$ or —OR$^{34}$ (wherein $R^{33}$ and $R^{34}$ each represents an alkyl group having from 1 to 14 carbon atoms, or an aryl group), and a group represented by the following formula.

Here, $R^{35}$ and $R^{36}$ each independently represents a hydrogen atom, an alkyl group having from 1 to 14 carbon atoms, or an aryl group.

The aryl group in the foregoing $R^{28}$ to $R^{31}$ includes monocyclic to tricyclic aryl groups such as a phenyl group and a naphthyl group; and the substituted aryl group includes ones in which the foregoing aryl group has a substituent such as those in the foregoing substituted alkyl group and an alkyl group having from 1 to 14 carbon atoms. The alkenyl group in the foregoing $R^{28}$ to $R^{31}$ includes linear, branched or cyclic alkenyl groups having from 2 to 18 carbon atoms; and the substituent of the substituted alkenyl group includes those enumerated as the substituent for the foregoing substituted alkyl group. The alkynyl group in the foregoing $R^{28}$ to $R^{31}$ includes linear or branched alkynyl groups having from 2 to 28 carbon atoms; and the substituent of the substituted alkynyl group includes those enumerated as the substituent for the foregoing substituted alkyl group. Also, the heterocyclic group in the foregoing $R^{28}$ to $R^{31}$ includes 5-membered or more membered (preferably 5-membered to 7-membered) heterocyclic groups containing at least one of N, S and O; and the heterocyclic group may contain a fused ring. Further, the heterocyclic group may have a substituent such as those enumerated as the substituent for the foregoing substituted aryl group. Specific examples of the compound represented by the formula (5) include compounds described in U.S. Pat. Nos. 3,567,453 and 4,343,891 and European Patent Nos. 109,772 and 109,773 and compounds described below.

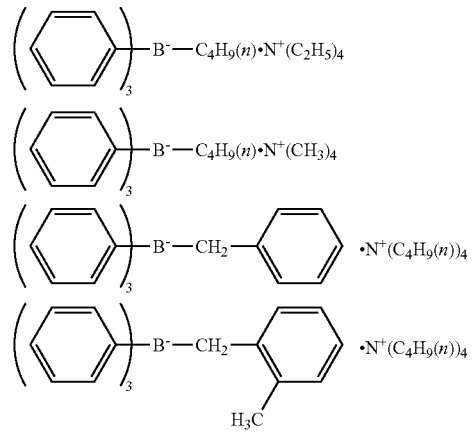

(h) Azinium Compounds:

Examples of the azinium compounds (h) which are preferable as the radical generator to be used in the invention include a group of N—O bond-containing compounds described in JP-A-63-138345, JP-A-63-142345, JP-A-63-142346, JP-A-63-143537, and JP-A-46-42363.

(i) Metallocene Compounds:

Examples of the metallocene compounds (i) which are preferable as the radical generator to be used in the invention include titanocene compounds described in JP-A-59-152396, JP-A-61-151197, JP-A-63-41484, JP-A-2-249, and JP-A-2-4705; and iron-arene complexes described in JP-A-1-304453 and JP-A-1-152109.

Specific examples of titanocene compounds include dicyclopentadienyl-Ti-dichloride, dicyclopentadienyl-Ti-bisphenyl, dicyclopentadienyl-Ti-bis-2,3,4,5,6-pentafluorophen-1-yl, dicyclopentadienyl-Ti-bis-2,3,5,6-tetrafluorophen-1-yl, dicyclopentadienyl-Ti-bis-2,4,6-trifluorophen-1-yl, dicyclopentadienyl-Ti-2,6-difluorophen-1-yl, dicyclopentadienyl-Ti-bis-2,4-difluorophen-1-yl, dimethylcyclopentadienyl-Ti-bis-2,3,4,5,6-pentafluorophen-1-yl, dimethylcyclopentadienyl-Ti-bis-2,3,5,6-tetrafluorophen-1-yl, dimethylcyclopentadienyl-Ti-bis-2,4-difluorophen-1-yl, bis(cyclopentadienyl)-bis(2,9-difluoro-3-(pyr-1-yl)phenyl) titanium, bis(cyclopentadienyl)bis-[2,6-difluoro-do-(methylsulfonamido)phene]titanium, bis-(cyclopentadienyl)bis[2,6-difluoro-3-(N-butylbiaroylamino)phenyl]titanium, bis(cyclopentadienyl)bis[2,6-difluoro-3-(N-butyl-(4-chlorobenzoyl)amino)phenyl]titanium, bis(cyclopentadienyl)bis[2,6-difluoro-3-(N-benzyl-2,2-dimethylpentanoylamino)phenyl]titanium, bis(cyclopentadienyl)bis[2,6-difluoro-3-(N-(2-ethylhexyl)-4-tolylsulfonylamino)phenyl]titanium, bis(cyclopentadienyl)bis[2,6-difluoro-3-(N-(3-oxaheptyl)benzoylamino)phenyl] titanium, bis-(cyclopentadienyl)bis[2,6-difluoro-3-(N-(3,6-dioxadecyl)benzoylamino)phenyl]titanium, bis(cyclopentadienyl)bis[2,6-difluoro-3-(trifluoromethylsulfonylamino)phenyl]titanium, bis(cyclopentadienyl)bis[2,6-difluoro-3-(trifluoroacetylamino) phenyl]titanium, bis(cyclopentadienyl)bis[2,6-difluoro-3-(2-chlorobenzoylamino)phenyl]titanium, bis(cyclopentadienyl)bis[2,6-difluoro-3-(4-chlorobenzoylamino)phenyl]titanium, bis (cyclopentadienyl)bis[2,6-difluoro-3-(N-(3,6-dioxadecyl)-2,2-dimethylpentanoylamino)phenyl]titanium, bis(cyclopentadienyl)bis[2,6-difluoro-3-(N-(3,7-dimethyl-7-methoxyoctyl)benzoylamino)phenyl]titanium, and bis(cyclopentadienyl)bis[2,6-difluoro-3-(N-cyclohexylbenzoylamino)phenyl]titanium.

(j) Active Ester Compounds:

Examples of the active ester compounds (j) which are preferable as the radical generator to be used in the invention include imidosulfonate compounds described in JP-B-62-6223 and active sulfonates described in JP-B-63-14340 and JP-A-59-174831.

(k) Carbon-halogen Bond-containing Compounds:

Examples of the active ester compounds (j) which are preferable as the radical generator to be used in the invention include compounds represented by the following formulae (6) to (12).

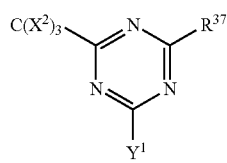

Formula (6)

In the formula (6), $X^2$ represents a halogen atom; and $Y^1$ represents $-C(X^2)_3$, $-NH_2$, $-NHR^{38}$, $-NR^{38}$, or $-OR^{38}$. Here, $R^{38}$ represents an alkyl group, a substituted alkyl group, an aryl group, or a substituted aryl group. Also, $R^{37}$ represents $-C(X^2)_3$, an alkyl group, a substituted alkyl group, an aryl group, a substituted aryl group, or a substituted alkenyl group.

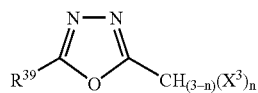

Formula (7)

In the formula (7), $R^{39}$ represents an alkyl group, a substituted alkyl group, an alkenyl group, a substituted alkenyl group, an aryl group, a substituted aryl group, a halogen atom, an alkoxy group, a substituted alkoxy group, a nitro group, or a cyano group; $X^3$ represents a halogen atom; and n represents an integer of from 1 to 3.

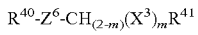

Formula (8)

In the formula (8), $R^{40}$ represents an aryl group or a substituted aryl group; $R^{41}$ represents one of the following groups or a halogen atom; $Z^6$ represents $-C(=O)-$, $-C(=S)-$, or $-SO_2-$; $X^3$ represents a halogen atom; and m is 1 or 2.

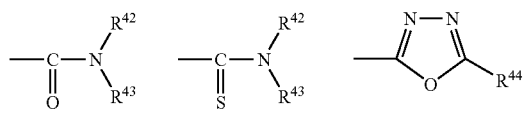

Here, $R^{42}$ and $R^{43}$ each represents an alkyl group, a substituted alkyl group, an alkenyl group, a substituted alkenyl group, an aryl group, or a substituted aryl group; and $R^{44}$ is synonymous with $R^{38}$ in the formula (6).

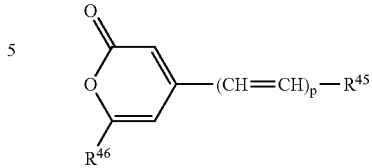

Formula (9)

In the formula (9), $R^{45}$ represents an optionally substituted aryl group or heterocyclic group; $R^{46}$ represents a trihaloalkyl group or a trihaloalkenyl group each having from 1 to 3 carbon atoms; and p is 1, 2 or 3.

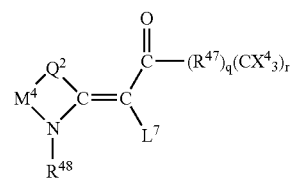

Formula (10)

The formula (10) represents a trihalogenomethyl group-containing carbonylmethylene heterocyclic compound. $L^7$ represents a hydrogen atom or a substituent of the formula: $CO-(R^{47})_q(C(X^4)_3)_r$; $Q^2$ represents a sulfur atom, a selenium atom, an oxygen atom, a dialkylmethylene group, an alken-1,2-ylene group, a 1,2-phenylene group, or an N—R group; $M^4$ represents a substituted or unsubstituted alkylene group or alkenylene group or a 1,2-arylene group, $R^{48}$ represents an alkyl group, an aralkyl group, or an alkoxyalkyl group; $R^{47}$ represents a carbocyclic or heterocyclic divalent aromatic group; $X^4$ represents a chlorine atom, a bromine atom, or an iodine atom; and q=0 and r=1, or q=1 and r=1 or 2.

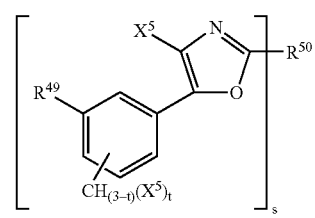

Formula (11)

The formula (11) represents a 4-halogeno-5-(halogenomethyl-phenyl)-oxazole derivative. $X^5$ represents a halogen atom; t represents an integer of from 1 to 3; s represents an integer of from 1 to 4; $R^{49}$ represents a hydrogen atom or a $CH_{3-t}X^5_t$ group; and $R^{50}$ represents an optionally substituted unsaturated organic group having a valence of s.

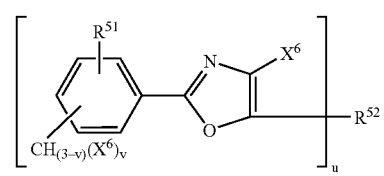

Formula (12)

The formula (12) represents a 2-(halogenomethyl-phenyl)-4-halogeno-oxazole derivative. $X^6$ represents a halogen atom; v represents an integer of from 1 to 3; u represents an integer of from 1 to 4; $R^{51}$ represents a hydrogen atom or a $CH_{3-v}X^6{}_v$ group; and $R^{52}$ represents an optionally substituted unsaturated organic group having a valence of u.

Specific examples of such a carbon-halogen bond-containing compound include compounds described in Wakabayashi, et al., *Bull. Chem. Soc. Japan,* 42, 2924 (1969), such as 2-phenyl-4,6-bis(trichloromethyl)-s-triazine, 2-(p-chlorophenyl)-4,6-bis(trichloromethyl)-s-triazine, 2-(p-tolyl)-4,6-bis(trichloromethyl)-s-triazine, 2-(p-methoxyphenyl)-4,6-bis(trichloromethyl)-s-triazine, 2-(2',4'-dichlorophenyl)-4,6-bis(trichloromethyl)-s-triazine, 2,4,6-tris(trichloromethyl)-s-triazine, 2-methyl-4,6-bis(trichloromethyl)-s-triazine, 2-n-nonyl-4,6-bis(trichloromethyl)-s-triazine, and 2-(α,α,β-trichloroethyl)-4,6-bis(trichloromethyl)-s-triazine. Besides, there cab be enumerated compounds described in U.K. Patent No. 1,388,492, such as 2-styryl-4,6-bis(trichloromethyl)-s-triazine, 2-(p-methylstyryl)-4,6-bis(trichloromethyl)-s-triazine, 2-(p-methoxystyryl)-4,6-bis(trichloromethyl)-s-triazine, and 2-(p-methoxystyryl)-4-amino-6-trichloromethyl-s-triazine; compounds described in JP-A-53-133428, such as 2-(4-methoxy-naphtho-1-yl)-4,6-bis-trichloromethyl-s-triazine, 2-(4-ethoxy-naphtho-1-yl)-4,6-bis-trichloromethyl-s-triazine, 2-[4-(2-ethoxyethyl)-naphtho-1-yl]-4,6-bis-trichloromethyl-s-triazine, 2-(4,7-dimethoxy-naphtho-1-yl)-4,6-bis-trichloromethyl-s-triazine, and 2-(acenaphtho-5-yl)-4,6-bis-trichloromethyl-s-triazine; and compounds described in German Patent No. 3,337,024, such as the following compounds.

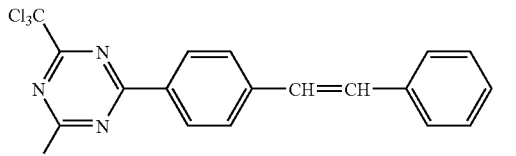

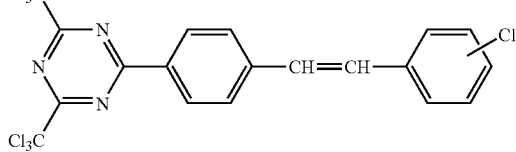

Also, there can be enumerated compounds described in F. C. Schaefer, et al., *J. Org. Chem.,* 29, 1527 (1964), such as 2-methyl-4,6-bis(tribromomethyl)-s-triazine, 2,4,6-tris(tribromomethyl)-s-triazine, 2,4,6-tris(dibromomethyl)-s-triazine, 2-amino-4-methyl-6-tribromomethyl-s-triazine, and 2-methoxy-4-methyl-6-trichloromethyl-s-triazine. Further, there can be enumerated compounds described in JP-A-62-58241, such as the following compounds.

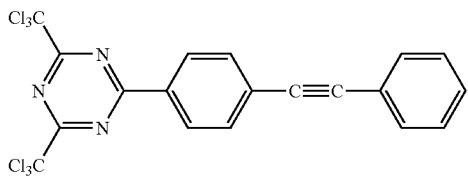

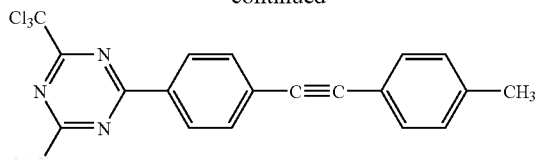

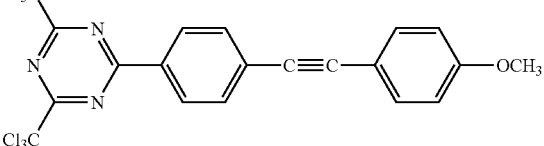

Moreover, there can be enumerated compounds described in JP-A-5-281728, such as the following compounds.

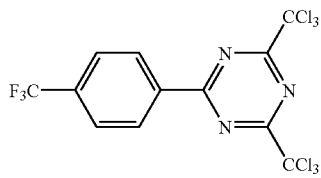

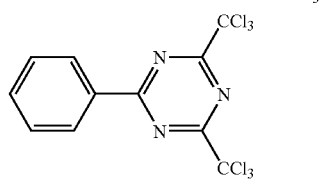

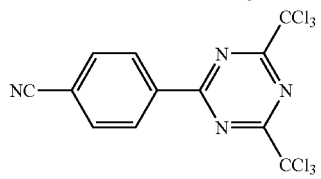

Still further, there can be enumerated a group of compounds which can be easily synthesized by a person skilled in the art according to synthesis methods described in M. P. Htt, E. F. Elslager and L. M. Herbel, *Journal of Heterocyclic Chemistry,* Vol. 7 (No. 3), pages 511, et seq. (1970), such as the following compounds.

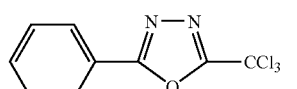

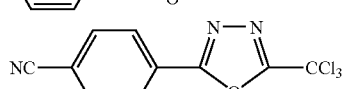

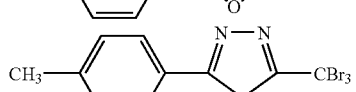

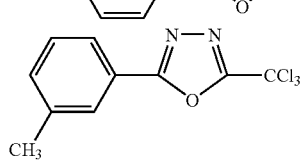

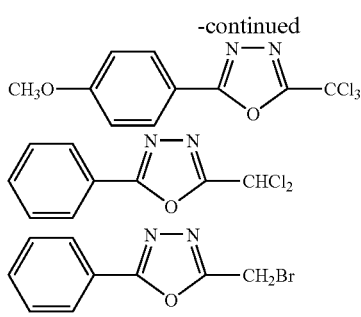

(I) Azo Based Compounds:

Examples of the azo based compounds (1) which are preferable as the radical generator to be used in the invention include 2,2'-azobisisobutyronitrile, 2,2'-azobispropionitrile, 1,1'-azobis(cyclohexane-1-carbonitrile), 2,2'-azobis(2-methylbutyronitrile), 2,2'-azobis(2,4-dimethylvaleronitrile), 2,2'-azobis(4-methoxy-2,4-dimethylValeronitrile), 4,4'-azobis(4-cyanovaleric acid), dimethyl 2,2'-azobisisobutyrate, 2,2'-azobis(2-methylpropionamidoxime), 2,2'-azo-bis[2-(2-imidazolin-2-yl)propane], 2,2'-azobis {2-methyl-N-[1,1-bis (hydroxymethyl)-2-hydroxyethyl]propionamide}, 2,2'-azobis[2-methyl-N-(2-hydroxyethyl)propionamide], 2,2'-azobis(N-butyl-2-methylpropionamide), 2,2'-azobis(N-cyclohexyl-2-methylpropionamide), 2,2'-azobis-[N-(2-propenyl)-2-methylpropionamide], and 2,2'-azobis(2,4,4-trimethylpentane).

As more preferred examples of the radical generator in the invention, there can be enumerated the foregoing aromatic ketones (a), onium salt compounds (b), organic peroxides (c), hexaarylbiimidazole compounds (e), metallocene compounds (i), and carbon-halogen bond-containing compounds (k). Of these, aromatic iodonium salts, aromatic sulfonium salts, titanocene compounds, and trihalomethyl-s-triazine compounds represented by the formula (6) are the most preferable.

Such a radical generator can be added in the polymerizable composition in a proportion of from 0.1 to 50% by weight, preferably from 0.5 to 30% by weight, and especially preferably from 5 to 20% by weight based on the total solids content of the polymerizable composition In the invention, the radical generator is suitably used singly or in admixture of two or more kinds thereof.

[(C1) Radical Polymerizable Compound]

The radical polymerizable compound which is used in the polymerizable composition according to the invention is selected among compounds having at least one ethylenically unsaturated bond, and preferably two or more ethylenically unsaturated bonds. A group of such compounds is well known in the subject industrial field, and these compounds can be used in the invention without particular limitations. These compounds have a chemical morphology such as monomers or prepolymers, i.e., dimers, trimers or oligomers, and mixtures or copolymers thereof. Examples of monomers and copolymers thereof include unsaturated carboxylic acids (for example, acrylic acid, methacrylic acid, itaconic acid, crotonic acid, isocrotonic acid, and maleic acid) and their esters and amides. Of these, esters of an unsaturated carboxylic acid and an aliphatic polyhydric alcohol and amides of an unsaturated carboxylic acid and an aliphatic polyhydric amine compound are preferably used. Also, addition reaction products of an unsaturated carboxylic ester or amide having a nucleophilic substituent (for example, a hydroxyl group, an amino group, and a mercapto group) and a monofunctional or polyfunctional isocyanate or an epoxy compound, dehydration condensation reaction products of the foregoing unsaturated carboxylic ester or amide and a monofunctional or polyfunctional carboxylic acid, and the like are suitably used. Also, addition reaction products of an unsaturated carboxylic ester or amide having an electrophilic substituent (for example, an isocyanate group and an epoxy group) and a monofunctional or polyfunctional alcohol, amine or thiol; and displacement reaction products of an unsaturated carboxylic ester or amide having an eliminating substituent (for example, a halogen group and a tosyloxy group) and a monofunctional or polyfunctional alcohol, amine or thiol are suitable. Also, as other examples, it is possible to use a group of compounds resulting from replacement of the foregoing unsaturated carboxylic acids with unsaturated phosphonic acids, styrenes, vinyl ethers, etc.

With respect to specific examples of monomers of esters of an aliphatic polyhydric alcohol compound and an unsaturated carboxylic acid, examples of acrylic esters include ethylene glycol diacrylate, triethylene glycol diacrylate, 1,3-butanediol diacrylate, tetramethylene glycol diacrylate, propylene glycol diacrylate, neopentyl glycol diacrylate, trimethylolpropane triacrylate, trimethylolpropane tri(acryloyloxypropyl) ether, trimethylolethane triacrylate, hexanediol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol hexaacrylate, sorbitol triacrylate, sorbitol tetraacrylate, sorbitol pentaacrylate, sorbitol hexaacrylate, tri(acryloyloxyethyl)isocyanurate, and polyester acrylate oligomers.

Examples of methacrylic esters include tetramethylene glycol dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis[p-(3-methacryloxy-2-hydroxypropoxy) phenyl]dimethylmethane, and bis[p-(methacryloxyethoxy) phenyl]dimethylmethane.

Examples of itaconic esters include ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate. Examples of crotonic esters include ethylene glycol dicrotonate, tetramethylene glycol dicrotonate, pentaerythritol dicrotonate, and sorbitol tetradicrotonate. Examples of isocrotonic esters include ethylene glycol diisocrotonate, pentaerythritol diisocrotonate, and sorbitol tetraisocrotonate. Examples of maleic esters include ethylene glycol dimaleate, triethylene glycol dimaleate, pentaerythritol dimaleate, and sorbitol tetramaleate.

As other examples of esters, for example, aliphatic alcohol based esters described in JP-B-46-27926, JP-B-51-47334, and JP-A-57-196231; esters having an aromatic skeleton described in JP-A-59-5240, JP-A-59-5241, and JP-A-2-226149; and esters having an amino group described in JP-A-1-165613 are suitably used. Further, the foregoing ester monomers can be used as mixtures.

Also, specific examples of monomers of amides of an aliphatic polyhydric amine compound and an unsaturated carboxylic acid include methylene bis-acrylamide, methylene bis-methacrylamide, 1,6-hexamethylene bis-acrylamide, 1,6-hexamethylene bis-methacrylamide, diethylene triamine trisacrylamide, xylene bis-acrylamide, and xylylene bis-methacrylamide. Examples of other preferred amide based monomers include ones having a cyclohexylene structure described in JP-B-54-21726.

Also, urethane based addition polymerizable compounds as produced using an addition reaction between an isocyanate and a hydroxyl group. Specific examples thereof include vinyl urethane compounds having two or more polymerizable vinyl groups in one molecular thereof, which are obtained by adding a hydroxyl group-containing vinyl monomer represented by the following formula (13) to a polyisocyanate compound having two or more isocyanate groups in one molecule thereof as described in JP-B-48-41708.

$$CH_2=C(R^A)COOCH_2CH(R^B)OH \qquad \text{Formula (13)}$$

Here, $R^A$ and $R^B$ each represents H or $CH_3$.

Also, urethane acrylates described in JP-A-51-37193, JP-B-2-32293, and JP-B-2-16765; and urethane compounds having an ethylene oxide based skeleton as described in JP-B-58-49860, JP-B-56-17654, JP-B-62-39417, and JP-B-62-39418 are suitable. Further, it is possible to obtain polymerizable compositions having an every excellent light-sensitive speed by using a radical polymerizable compound having an amino structure or a sulfide structure in the molecule as described in JP-A-63-277653, JP-A-63-260909, and JP-A-1-105238.

As other examples, there can be enumerated polyfunctional acrylates or methacrylates such as polyester acrylates and epoxy acrylates resulting from reaction of an epoxy resin with (meth)acrylic acid as described in JP-A-48-64183, JP-B-49-43191, and JP-B-52-3-490. Also, there can be enumerated specified unsaturated compounds described in JP-B-46-43946, JP-B-1-40337, and JP-B-1-40336; and vinylphosphonic acid based compounds described in JP-A-2-25493. Also, in some cases, a structure containing a perfluoroalkyl group as described in JP-A-61-22048 is suitably used. Further, compounds introduced as photocurable monomers and oligomers in *Journal of The Adhesion Society of Japan*, Vol. 20, No. 7, pp. 300-308 (1984) can be used.

With respect to these radical polymerizable compounds, the details of the use method such as structure, single use or joint use, and addition amount can be arbitrarily set up depending upon the purpose of use. For example, in the case where the polymerizable composition according to the invention is used as a recording material of lithographic printing plate precursor, the details are set up adaptive with the performance design of an ultimate lithographic printing plate precursor. For example, the details are selected from the following viewpoints. From the viewpoint of light-sensitive speed, a structure having a high content of unsaturated groups per molecule is preferable, and in many cases, bifunctional or polyfunctional structures are preferable. Also, for the sake of enhancing the strength of an image area, i.e., a cured film, trifunctional or polyfunctional structures are preferable. Further, it is useful to adjust both the sensitivity and the strength by jointly using compounds having a different functional number or a different polymerizable group (for example, acrylic esters, methacrylic esters, styrene based compounds, vinyl ether based compounds). In some case, a compound having a high molecular weight or a highly hydrophobic compound is excellent in light-sensitivity speed and film strength, but it is not preferable from the standpoint of development speed or occurrence of deposition in a developing solution. Also, the selection and use method of am addition polymerizable compound are an important factor with respect to affinity and dispersibility with other components (for example, a binder polymer, an initiator, and a coloring agent) in the recording layer. For example, the affinity may be possibly enhanced by use of a low-purity compound or joint use of two or more kinds of compounds. Also, for the purpose of enhancing adhesiveness to a substrate or an overcoat layer as described layer, a specified structure may be selected. With respect to the blending ratio of the polymerizable compound in the recording layer, a higher amount of the blending ratio is more advantageous in the sensitivity. However, when the blending ratio is too high, there may be possibly encountered the occurrence of undesired phase separation occurs and the generation of problems in the manufacturing step due to adhesion of the recording layer (for example, manufacturing failure derived from transfer or adhesion of the components of the recording layer) or deposition from a developing solution. From these viewpoints, the radical polymerizable compound is preferably used in an amount in the range of from 5 to 80% by weight, and more preferably from 25 to 75% by weight based on the non-volatile components in the polymerizable compositions. Also, the radical polymerizable compound may be used singly or in admixture of two or more kinds thereof. Besides, with respect to the use method of the radical polymerizable compound, its proper structure, blending and addition amount can be arbitrarily selected from the viewpoints of size of polymerization inhibition, resolution, fogging, change in refractive index, surface adhesiveness, etc. Further, as the case may be, layer construction and coating method such as undercoating and overcoating can be applied.

[(D1) Binder Polymer]

In the polymerizable composition according to the invention, for the purpose of enhancing the coating film characteristics, a binder polymer (D) can be used, if desired. It is preferred to use a linear organic polymer as the binder polymer. As such a "linear organic polymer", known polymers can be arbitrarily used. Preferably, for the purpose of making it possible to realize development with water or development with a weakly alkaline aqueous solution, a linear organic polymer which is soluble or swelling in water or a weakly alkaline aqueous solution is selected. The linear organic polymer is selected and used according to applications not only as a coating film-forming agent of the image recording layer but also as a water, weakly alkaline aqueous solution or organic solvent developer. For example, when a water-soluble organic polymer is used, the development with water becomes possible. Examples of such a linear organic polymer include radical polymers having a carboxyl group in the side chains thereof, for example, ones described in JP-A-59-44615, JP-B-54-34327, JP-B-58-12577, JP-B-54-25957, JP-A-54-92723, JP-A-59-53836, and JP-A-59-71048, that is, methacrylic acid copolymers, acrylic acid copolymers, itaconic acid copolymers, crotonic acid copolymers, maleic acid copolymers, and partially esterified maleic acid copolymers. Also, there can be enumerated acidic cellulose derivatives having a carboxyl group in the side chains thereof in the similar manner. Besides, ones resulting from addition of a cyclic acid anhydride to a polymer having a hydroxyl group are also useful.

Of these, (meth)acrylic resins having a benzyl group or an allyl group and a carboxyl group in the side chains thereof and alkali-soluble resins having a double bond in the side chains thereof as described in JP-A-2000-187322, JP-A-2002-62648, Japanese Patent Application Nos. 2001-253217 and 2002-287920, JP-A-2002-62648, and the like are especially suitable because they are excellent in balance among film strength, sensitivity and developability.

Also, acid group-containing urethane based binder polymers described in JP-B-7-120040, JP-B-7-120041, JP-B-7-120042, JP-B-8-12424, JP-A-63-287944, JP-A-63-287947, JP-A-1-271741, Japanese Patent Application No. 10-116232, and the like are very excellent in strength, and therefore, are advantageous from the standpoints of resistance to printing and low-exposure adaptability.

In addition, as other water-soluble linear organic polymers, polyvinylpyrrolidone and polyethylene oxide are useful. Also, for sake of enhancing the strength of the cured coating film, alcohol-soluble nylons and polyethers of 2,2-bis-(4-hydroxyphenyl)-propane and epichlorohydrin are useful.

In the polymer to be used in the invention, its weight average molecular weight is preferably in the range of 5,000 or more, and more preferably from 10,000 to 300,000; and its number average molecular weight is preferably in the range of 1,000 or more, and more preferably from 2,000 to 250,000. The polydispersion degree (weight average molecular weight/number average molecular weight) is preferably in the range of 1 or more, and more preferably from 1.1 to 10.

These polymers may be any of a random polymer, a block polymer, or a graft polymer but are preferably a random polymer.

The polymer which is used in the invention can be synthesized by conventionally known methods. Examples of a solvent which is used in the synthesis include tetrahydrofuran, ethylene dichloride, cyclohexanone, methyl ethyl ketone, acetone, methanol, ethanol, ethylene glycol monomethyl ether, ethylene glycol monoethyl ether, 2-methoxyethyl acetate, diethylene glycol dimethyl ether, 1-methoxy-2-propanol, 1-methoxy-2-propyl acetate, N,N-dimethylformamide, N,N-dimethylacetamide, toluene, ethyl acetate, methyl lactate, ethyl lactate, dimethyl sulfoxide, and water. These solvents are used singly or in admixture of two or more kinds thereof.

As a radical generator which is used in synthesizing the polymer to be used in the invention, known compounds such as azo based initiators and peroxide initiators can be used.

The binder polymer which is used in the invention may be used singly or in admixture. In particular, in the case where the polymerizable composition according to the invention is used as a recording layer of lithographic printing plate precursor, the binder polymer is added in a proportion of from 20 to 95% by weight, and preferably from 30 to 90% by weight based on the total solids content of the recording layer from the viewpoints of image-forming properties and strength of an image area. Also, a weight ratio of the compound having at least one ethylenically unsaturated double bond to the linear organic polymer is preferably in the range of from 1/9 to 7/3.

-Acid Crosslinking Composition-

Next, the acid crosslinking composition will be described below in detail.

The acid crosslinking composition according to the invention contains (A) a specified infrared absorber, (B2) an acid generator, and (C2) an acid crosslinking agent as essential components. It is preferable that (D2) an alkali-soluble polymer capable of reacting with the crosslinking agent in the presence of an acid for the purpose of forming a layer containing these components is further added. In this acid crosslinking composition, the acid generator is decomposed by energy of infrared light which the infrared absorber has absorbed to generate an acid, and the generated acid promotes works of the acid generator to form a firm crosslinking structure between the acid crosslinking agents or between the acid crosslinking agent and the alkali-soluble polymer, so that the solubility in alkali is lowered, whereby the composition becomes insoluble in a developing solution.

[(A) Specified Infrared Absorber]

As the specified infrared absorber which is used in the acid crosslinking composition according to the invention, those which are the same as described in the foregoing polymerizable composition can be used, and preferred embodiments and preferred addition amount thereof are also the same. Also, a general-purpose infrared absorber may be used jointly within the range where the effect of the invention is not hindered. With respect to the infrared absorber which can be used jointly, those which are the same as described previously can be used, too.

[(B2) Acid Generator]

As the acid generator which is used in the acid crosslinking composition according to the invention, any compound can be used without limitations so far as it generates an acid by energy of infrared light which the foregoing specified infrared absorber has absorbed. Examples of such an acid generator include known compounds which can cause heat decomposition to generate an acid (for example, photo initiators of photo-cationic polymerization, photo initiators of photo-radical polymerization, photo-fading agents of dyes, photo-discoloring agents, and known acid generators which are used in micro resists, etc.) and mixtures thereof, and compounds in which an acid-generating group or compound is introduced in the principal chain or side chains of the polymer.

As the acid generator which is used in the invention, compounds represented by the following formulae (14) to (18) are preferable.

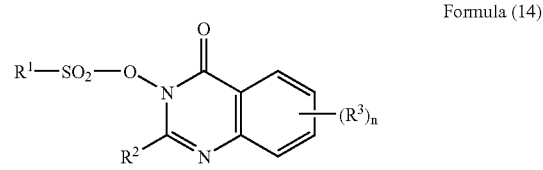

Formula (14)

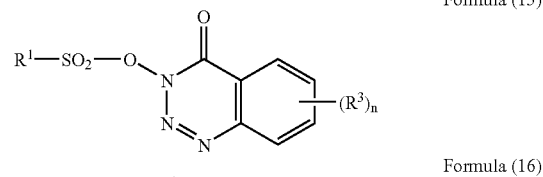

Formula (15)

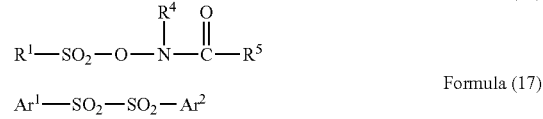

Formula (16)

Formula (17)

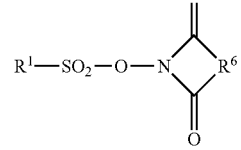

Formula (18)

In the foregoing formulae (14) to (18), $R^1$, $R^2$, $R^4$, and $R^5$ may be the same or different and each represents an optionally substituted hydrocarbon group having not more than 20 carbon atoms. $R^3$ represents a halogen atom, an optionally substituted hydrocarbon group having not more than 10 carbon atoms, or an alkoxy group having not more than 10 carbon atoms. $Ar^1$ and $Ar^2$ may be the same or different and each represents an optionally substituted aryl group having not more than 20 carbon atoms. $R^6$ represents an optionally substituted divalent hydrocarbon group having not more than 20 carbon atoms. n represents an integer of from 0 to 4.

In the foregoing formulae, $R^1$, $R^2$, $R^4$, and $R^5$ are each preferably a hydrocarbon group having from 1 to 14 carbon atoms.

Preferred embodiments of the acid generators represented by the foregoing formulae (14) to (18) are described in detail in paragraphs [0197] to [0222] of JP-A-2001-142230 as proposed previously by the present inventors. For example, these compounds can be synthesized by methods described in JP-A-2-100054 and JP-A-2-100055.

Also, as the acid generator, there can be enumerated onium salts in which a counter ion is a halide or sulfonic acid. Of these, ones having any one structural formula of an iodonium salt, a sulfonium salt, and a diazonium salt represented by the following formulae (19) to (21) can be suitably enumerated.

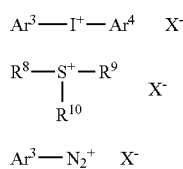

Formula (19)

Formula (20)

Formula (21)

In the foregoing formulae (19) to (21), $X^-$ represents a halide ion, $ClO_4^-$, $PF_6^-$, $SbF_6^-$, $BF_4^-$, or $R^7SO_3^-$; and $R^7$ represents an optionally substituted hydrocarbon group having not more than 20 carbon atoms. $Ar^3$ and $Ar^4$ each independently represents an optionally substituted aryl group having not more than 20 carbon atoms. $R^8$, $R^9$, and $R^{10}$ each presents an optionally substituted represents a hydrocarbon group having not more than 18 carbon atoms.

Such onium salts are described as compounds represented by the formulae (I) to (III) in paragraphs [0010] to [0035] of JP-A-10-39509.

The addition amount of the acid generator is preferably from 0.01 to 50% by weight, more preferably from 0.1 to 25% by weight, and most preferably from 0.5 to 20% by weight based on the total solids content of the acid crosslinking composition from the viewpoints of image forming properties and inhibition of staining in a non-image area when the acid crosslinking composition is used as a recording layer of lithographic printing plate precursor.

The acid generator may be used singly or in combinations of two or more kinds thereof.

[(C2) Acid Crosslinking Agent]

As the acid crosslinking agent to be used in the acid crosslinking composition according to the invention, the following compounds can be enumerated.
(i) Aromatic compound substituted with a hydroxymethyl group or an alkoxymethyl group
(ii) Compound having an N-hydroxymethyl group, an N-alkoxymethyl group or an N-acyloxymethyl group
(iii) Epoxy compound The foregoing compounds (i) to (iii) will be described below in detail.

Examples of the aromatic compound substituted with a hydroxymethyl group or an alkoxymethyl group (i) include aromatic compounds or heterocyclic compounds polysubstituted with a hydroxymethyl group, an acetoxymethyl group, or an alkoxymethyl group. However, compounds in the resin form, which are known as a resole resin as obtained by polycondensation of a phenol and an aldehyde under basic conditions, are included.

Of the aromatic compounds or heterocyclic compounds polysubstituted with a hydroxymethyl group or an alkoxymethyl group, compounds having a hydroxymethyl group or an alkoxymethyl group in the position adjacent to the hydroxyl group are preferable.

Also, of the aromatic compounds or heterocyclic compounds polysubstituted with an alkoxymethyl group, compounds in which the alkoxymethyl group has not more than 18 carbon atoms are preferable; and compounds represented by the following formulae (22) to (25) are more preferable.

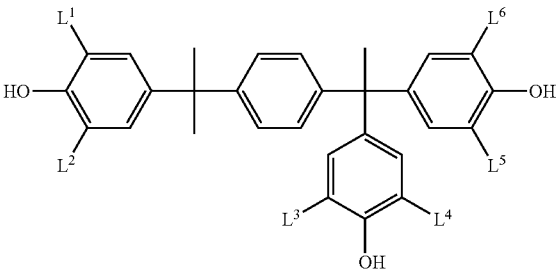

Formula (22)

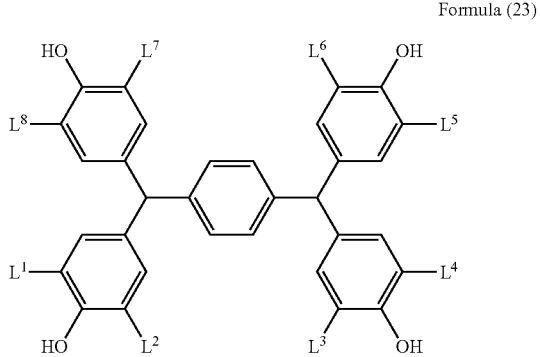

Formula (23)

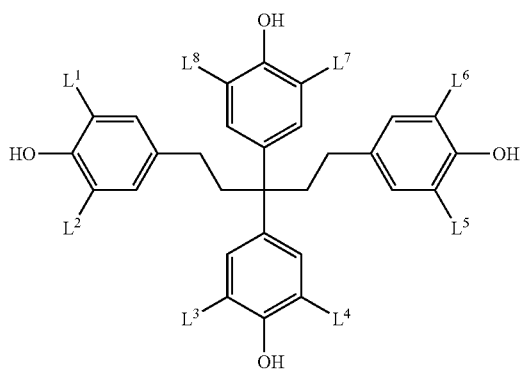

Formula (24)

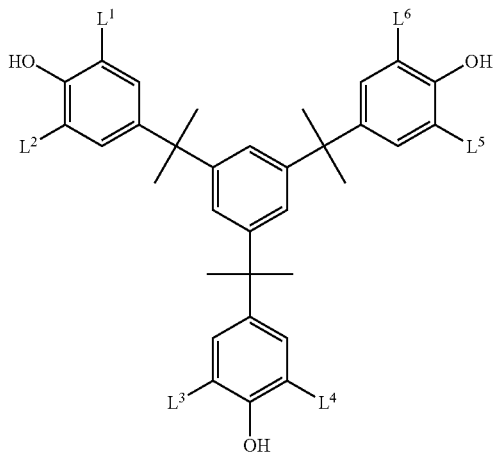

Formula (25)

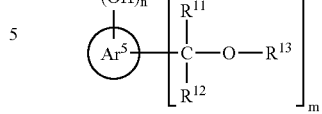

Formula (26)

In the foregoing formulae (22) to (25), $L^1$ to $L^8$ each independently represents a hydroxymethyl group or an alkoxymethyl group, each of which is substituted with an alkoxy group having not more than 18 carbon atoms such as methoxymethyl and ethoxymethyl.

These acid generators are preferable because they have high crosslinking efficiency and can enhance resistance to printing.

Examples of the compound having an N-hydroxymethyl group, an N-alkoxymethyl group or an N-acyloxymethyl group (ii) include monomer and oligomer-melamine-formaldehyde condensates and urea-formaldehyde condensates described in European Patent Publication (hereinafter referred to as "EP-A") No. 0,133,216 and West German Patent Nos. 3,634,671 and 3,711,264; and alkoxy-substituted compounds described in EP-A No. 0,212,482.

Of these, for example, melamine-formaldehyde derivatives having at least two free N-hydroxymethyl groups, N-alkoxymethyl groups or N-acylxoymethyl groups are preferable; and N-alkoxymethyl derivatives are the most preferable.

Examples of the epoxy compound (iii) include epoxy compounds having at least one epoxy group in the monomer, dimer, oligomer or polymer state, for example, reaction products between bisphenol A and epichlorohydrin and reaction products between a low-molecular phenol-formaldehyde resin and epichlorohydrin.

Besides, there can be enumerated epoxy resins described and used in U.S. Pat. No. 4,026,705 and U.K. Patent No. 1,539,192.

In the case of using the foregoing compounds (i) to (iii) as the acid crosslinking agent, the addition amount is preferably from 5 to 80% by weight, more preferably from 10 to 75% by weight, and most preferably from 20 to 70% by weight based on the weight of the whole of solids of the acid crosslinking composition from the viewpoints of durability of the formed coating film and storage stability.

In the invention, a phenol derivative (iv) represented by the following formula (26) can also be suitably used as the acid crosslinking agent.

In the foregoing formula (26), $Ar^5$ represents an optionally substituted aromatic hydrocarbon ring; and $R^{11}$, $R^{12}$, and $R^{13}$ each represents a hydrogen atom or a hydrocarbon group having not more than 12 carbon atoms. m represents an integer of from 2 to 4; and n represents an integer of from 1 to 3.

In view of easiness of availability of a raw material, the aromatic hydrocarbon ring is preferably a benzene ring, a naphthalene ring, or an anthracene ring. Also, preferred examples of the substituent of the aromatic hydrocarbon ring include a halogen atom, a hydrocarbon group having not more than 12 carbon atoms, an alkoxy group having not more than 12 carbon atoms, an alkylthio group having not more than 12 carbon atoms, a cyano group, a nitro group, and a trifluoromethyl group.

Of these, $Ar^5$ is more preferably an unsubstituted benzene ring or naphthalene ring, or a benzene ring or a naphthalene ring each having a substituent including a halogen atom, a hydrocarbon group having not more than 6 carbon atoms, an alkoxy group having not more than 6 carbon atoms, an alkylthio group having not more than 6 carbon atoms, an alkylcarbamoyl group having not more than 12 carbon atoms, and a nitro group because high sensitivity can be obtained.

As the hydrocarbon group represented by $R^{11}$ and $R^{12}$, a methyl group is preferable for the reason that the synthesis is easy. As the hydrocarbon group represented by $R^{13}$, a hydrocarbon group having not more than 7 carbon atoms, such as a methyl group and a benzyl group, for the reason that the sensitivity is high. Further, m is preferably 2 or 3, and n is preferably 1 or 2 for the reason that the synthesis is easy.

The addition amount of the foregoing compound (iv) to be used as the acid crosslinking agent is preferably from 3 to 70% by weight, more preferably from 10 to 60% by weight, and most preferably from 15 to 50% by weight based on the weight of the whole of solids of the acid crosslinking composition.

[(D2) Alkali-soluble Polymer]

As the alkali-soluble polymer which can be used in the acid crosslinking composition according to the invention, there are enumerated novolak resins and polymers having a hydroxyaryl group in the side chains thereof. Examples of the novolak resins include resins resulting from condensation of a phenol and an aldehyde under acidic conditions.

Of these, novolak resins obtained from phenol and formaldehyde, novolak resins obtained from m-cresol and formaldehyde, novolak resins obtained from p-cresol and formaldehyde, novolak resins obtained from o-cresol and formaldehyde, novolak resins obtained from octylphenol and formaldehyde, novolak resins obtained from a mixture of m-cresol and p-cresol and formaldehyde, novolak resins obtained from a mixture of phenol and cresol (any of a mixture of m-cresol, p-cresol and o-cresol, a mixture of m-cresol and p-cresol, a mixture of m-cresol and o-cresol, and a mixture of o-cresol and p-cresol) and formaldehyde, high-molecular novolak resins with a high ortho-binding rate, which are obtained by reacting phenol and p-formaldehyde as the starting materials in the sealed state under a high pressure without using a catalyst, are preferable.

A suitable novolak resin may be selected and used depending upon the purpose among those having a weight average molecular weight of from 800 to 300,000 and a number average molecular weight of from 400 to 60,000.

Also, the foregoing polymers having a hydroxyaryl group in the side chains thereof are preferable, and examples of the hydroxyaryl group in the polymer include an aryl group having at least one OH group bonded thereto.

Examples of the aryl group include a phenyl group, a napthyl group, an anthracenyl group, and a phenanthrenyl group. Of these, a phenyl group and a naphthyl group are preferable from the viewpoints of easiness of availability and physical properties.

As the polymer having a hydroxyaryl group in the side chains thereof which can be used in this embodiment, there can be enumerated polymers containing any one kind of constitutional units represented by the following formulae (27) to (30). However, it should not be construed that the invention is limited thereto.

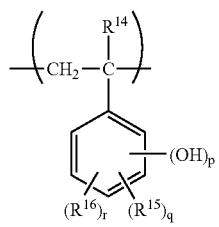

Formula (27)

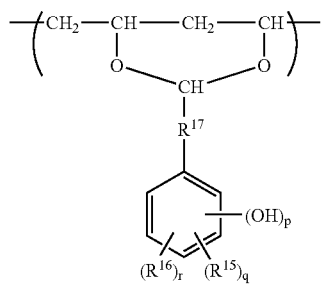

Formula (28)

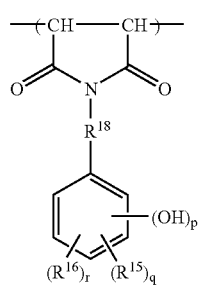

Formula (29)

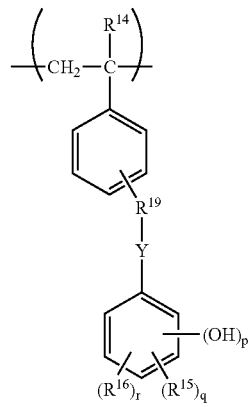

Formula (30)

In the formulae (27) to (30), $R^{14}$ represents a hydrogen atom or a methyl group. $R^{15}$ and $R^{16}$ may be the same or different and each represents a hydrogen atom, a halogen atom, a hydrocarbon group having not more than 10 carbon atoms, an alkoxy group having not more than 10 carbon atoms, or an aryloxy group having not more than 10 carbon atoms. Also, $R^{15}$ and $R^{16}$ may be fused together to form a benzene ring or a cyclohexane ring. $R^{17}$ represents a single bond or a divalent hydrocarbon group having not more than 20 carbon atoms. $R^{18}$ represents a single bond or a divalent hydrocarbon group having not more than 20 carbon atoms. $R^{19}$ represents a single bond or a divalent hydrocarbon group having not more than 10 carbon atoms. Y represents a single bond, an ether bond, a thioether bond, an ester bond, or an amide bond. p represents an integer of from 1 to 4. q and r each independently represents an integer of from 0 to 3.

These alkali-soluble polymers are described in detail in paragraphs [0130] to [0163] of JP-A-2001-142230 as previously proposed by the present applicant. The alkali-soluble polymers which can be used in this embodiment may be used singly or in combinations of two or more kinds thereof.

The addition amount of the alkali-soluble polymer is preferably from 5 to 95% by weight, more preferably from 10 to 95% by weight, and most preferably from 20 to 90% by weight based on the total solids content of the acid crosslinking composition from the viewpoints of durability of the formed coating film and image forming properties.

The thus obtained curable composition (polymerizable composition and acid crosslinking composition) is excellent in sensitivity, durability of the coating film after curing, and storage stability and is good in solubility in an alkaline developing solution. Therefore, it is suitably used as a recording material of image forming material for three-dimensional shaping or holography, lithographic printing plate precursors, synthetic resin letterpresses to be used for flexographic printing, color proofs, photoresists, and color filters. In particular, the curable composition is the most suitable as a recording material of lithographic printing plate precursor.

An image forming material which is a preferred application of the curable composition of the invention will be described below in detail.

[Image Forming Material]

The image forming material of the invention is characterized by having a recording material containing the foregoing curable composition on a support.

(Support)

The support to be used in the image forming material of the invention is not particularly limited so far as it is a dimensionally stable plate-like material. Examples thereof include papers, papers laminated with a plastic (for example, polyethylene, polypropylene, and polystyrene), metal plates (for example, aluminum, zinc, and copper), and plastic films (for example, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonates, and polyvinyl acetal). The support may be a sheet made of a single component such as a resin film and a metal plate, or a laminate of two or more materials. For example, papers or plastic films laminated or vapor deposited with the foregoing metals and laminated sheets of plastic films of a different kind are included.

As the support, polyester films or aluminum plates are preferable; and aluminum plates which are good in dimensional stability and relatively cheap are especially preferable. The suitable aluminum plate is a pure aluminum pate or an alloy plate containing aluminum as the major component and trace amounts of foreign elements; and plastic films laminated or vapor deposited with aluminum are also suitable. Examples of the foreign elements which are contained in the aluminum alloy include silicon, iron, manganese, copper, magnesium, chromium, zinc, bismuth, nickel, and titanium. The content of the foreign elements in the alloy is at most 10% by weight. In the invention, though pure aluminum is especially suitable as the aluminum, since it is difficult to produce completely pure aluminum in view of the smelting technology, the aluminum may be one containing slightly foreign elements. The aluminum plate which is applied in the invention is not specified with respect to the composition, but aluminum plates made of a raw material which have hitherto been publicly known and used can be properly applied.

The thickness of the aluminum plate is from approximately 0.1 to 0.6 mm, preferably from 0.15 to 0.4 mm, and especially preferably from 0.2 to 0.3 mm.

Prior to roughing the aluminum plate, if desired, a degreasing treatment with, for example, a surfactant, an organic solvent, or an alkaline aqueous solution is carried out for the purpose of removing a rolling oil on the surface.

A roughing treatment of the surface of the aluminum plate is carried out by various methods, for example, a method for mechanically roughing the surface, a method for electrochemically dissolving and roughing the surface, and a method for chemically selectively dissolving the surface. As the mechanical method, known methods such as a ball polishing method, a brush polishing method, a blast polishing method, and a buff polishing method can be employed. Also, as the electrochemical roughing method, there is a method in which the roughing treatment is carried out in a hydrochloric acid or nitric acid electrolytic liquid using an alternating current or a direct current. Also, a method comprising a combination of the both methods as disclosed in JP-A-54-63902 can be applied.

If desired, the thus roughed aluminum plate can be subjected to an anodic oxidation treatment for the purpose of enhancing water holding properties or abrasion resistance of the surface after an alkali etching treatment and a neutralization treatment. As an electrolyte to be used in the anodic oxidation treatment of the aluminum plate, various electrolytes capable of forming a porous oxidized coating film can be used. In general, sulfuric acid, phosphoric acid, oxalic acid, chromic acid, and mixed acids thereof are useful. The concentration of such an electrolyte is properly determined depending upon the kind of the electrolyte.

The treatment conditions of the anodic oxidation considerably vary depending upon the electrolyte to be used and cannot be unequivocally specified. In general, the ranges in which the concentration of the electrolyte in the solution is from 1 to 80% by weight, the liquid temperature is from 5 to 70° C., the current density is from 5 to 60 A/dm$^2$, the voltage is from 1 to 100 V, and the electrolysis time is from 10 seconds to 5 minutes are proper.

The amount of the anodically oxidized coating film is preferably in the range of 1.0 g/m$^2$ or more, and more preferably from 2.0 to 6.0 g/m$^2$. When the amount of the anodically oxidized coating film is less than 1.0 g/m$^2$, the resistance to printing may be possibly insufficient, and scuffs are likely formed in a non-image area of a lithographic printing plate, thereby likely causing so-called "scuff staining" which is caused by deposition of inks in the scuffs during printing.

Though this anodic oxidation treatment is applied onto the face of the support of the lithographic printing plate to be used during printing, an anodically oxidized coating film of from 0.01 to 3 g/m$^2$ is also generally formed on the back face due to turning around to the back face of an electric line of force.

A hydrophilic treatment of the surface of the support is applied after the anodic oxidation treatment, and conventionally known treatment methods are employable. As such a hydrophilic treatment, there is a method of using an alkali metal silicate (for example, a sodium silicate aqueous solution) as disclosed in U.S. Pat. Nos. 2,714,066, 3,181,461, 3,280,734 and 3,902,734. According to this method, the support is subjected to a dip treatment or electrolytic treatment with a sodium silicate aqueous solution. Besides, a method of treatment with potassium fluorozirconate as disclosed in JP-B-36-22063 and a method of treatment with polyvinylphosphonic acid as disclosed in U.S. Pat. Nos. 3,276,868, 4,153,461 and 4,689,272 are employable.

Of these, the treatment with a silicate is especially preferable as the hydrophilic treatment in the invention. The treatment with a silicate will be described below.

The anodically oxidized coating film of the aluminum plate as thus treated is dipped in an alkali metal silicate aqueous solution having a concentration of from 0.1 to 30% by weight, and preferably from 0.5 to 10% by weight and a pH at 25° C. of from 10 to 13, for example, at from 15 to 80° C. for from 0.5 to 120 seconds. When the pH of the alkali metal silicate aqueous solution is lower than 10, the liquid is gelled, whereas when it is higher than 13.0, the oxidized coating film is dissolved. Examples of the alkali metal silicate which is used in the invention include sodium silicate, potassium silicate, and lithium silicate. Examples of a hydroxide which is used for the purpose of increasing the pH of the alkali metal silicate aqueous solution include sodium hydroxide, potassium hydroxide, and lithium hydroxide. The foregoing treating liquid may be blended with an alkaline earth metal salt or a Group IVB metal salt. Examples of the alkaline earth metal salt include water-soluble salts such as nitrates (for example, calcium nitrate, strontium nitrate, magnesium nitrate, and barium nitrate), sulfates, hydrochlorides, phosphates, acetates, oxalates, and borates. Examples of the Group IVB metal salts include titanium tetrachloride, titanium trichloride, potassium titanium fluoride, potassium titanium oxalate, titanium sulfate, titanium tetraiodide, zirconium chloroxide, zirconium dioxide, zirconium oxychloride, and zirconium tetrachloride. The alkaline earth metal salt or Group IVB metal salt can be used singly or in combinations of two or more kinds thereof. The amount of such a metal salt is preferably in the range of from 0.01 to 10% by weight, and more preferably from 0.05 to 5.0% by weight.

Since the hydrophilicity on the surface of the aluminum plate is further improved by the treatment with a silicate, inks are hardly deposited in a non-image area during printing, whereby the staining performance is enhanced.

(Formation of Recording Layer)

As a method of providing the recording layer on the support, there is employed a method in which the foregoing curable composition is dissolved in a solvent to form a coating liquid for recording layer, which is then coated on the support. Examples of the solvent to be used include ethylene dichloride, cyclohexanone, methyl ethyl ketone, methanol, ethanol, propanol, ethylene glycol monomethyl ether, 1-methoxy-2-propanol, 2-methoxyethyl acetate, 1-methoxy-2-propyl acetate, dimethoxyethane, methyl lactate, ethyl lactate, N,N-dimethylacetamide, N,N-dimethylformamide, tetramethylurea, N-methylpyrrolidone, dimethyl sulfoxide, sulfolane, γ-butyrolactone, toluene, and water. However, it should not be construed that the invention is limited thereto. These solvents are used singly or in admixture. The concentration of the foregoing components (the whole of solids containing additives) in the solvent is preferably from 1 to 50% by weight.

Also, the coating amount (solids content) of the recording layer on the support obtained after drying varies depending upon the application. So far as a lithographic printing plate precursor is concerned, in general, the coating amount is preferably from 0.5 to 5.0 g/m$^2$. When the coating amount decreases, though an apparent sensitivity becomes high, the coating film characteristics of the recording layer are lowered.

As the coating method, various methods can be employed. Examples thereof include bar coater coating, rotary coating, spray coating, curtain coating, dip coating, air knife coating, blade coating, and roll coating.

In the coating liquid for recording layer according to the invention, a surfactant for improving the coating properties, for example, fluorine based surfactants described in JP-A-62-170950 can be added. The addition amount of the surfactant is preferably from 0.01 to 1% by weight, and more preferably from 0.05 to 0.5% by weight in the solids of the materials of the whole of recording layer.

Further, in the case where the image forming material of the invention is used as a negative working lithographic printing plate precursor, a backcoat layer, an interlayer, a protective layer, and the like as described later can be formed likewise the foregoing recording layer.

A lithographic printing plate precursor which is the most preferred application of the image forming material of the invention will be described below.

(Various Additives)

Various additives as enumerated below may be added in the recording layer of the lithographic printing plate precursor according to the invention.

For example, dyestuffs having large absorption in the visible region can be used as a coloring agent. Specifically, there can be enumerated Oil Yellow #101, Oil Yellow #103, Oil Pink #312, Oil Green BG, Oil Blue BOS, Oil Blue #603, Oil Black BY, Oil Black BS, and Oil Black T-505 (all of which are manufactured by Orient Chemical Industries, Ltd.), Victoria Pure Blue, Crystal Violet (CI42555), Methyl Violet (CI42535), Ethyl Violet, Rhodamine B (CI145170B), Malachite Green (CI42000), Methylene Blue (CI52015), and dyestuffs described in JP-A-62-293247. Also, pigments such as phthalocyanine based pigments, azo based pigments, carbon black, and titanium oxide can be suitably used.

The addition of such a coloring agent is preferable because after the image formation, an image area and a non-image area can be readily distinguished from each other. The addition amount of the coloring agent is from 0.01 to 10% by weight based on the total solids content of the coating liquid for recording layer.

Also, in the case where the foregoing polymerizable composition is used as the recording layer, it is desired to add a small amount of a heat polymerization inhibitor for the purpose of inhibiting unnecessary heat polymerization of the polymerizable composition from occurring during the preparation or preservation. Suitable examples of the heat polymerization inhibitor include hydroquinone, p-methoxyphenol, di-t-butyl-p-cresol, pyrogallol, t-butyl catechol, benzoquinone, 4,4'-thiobis(3-methyl-6-t-butylphenol), 2,2'-methylenebis(4-methyl-6-t-butylphenol), and N-nitro-so-N-phenylhydroxylaminealuminum salt. The addition amount of the heat polymerization inhibitor is preferably from about 0.01% by weight to about 5% by weight based on the weight of the whole composition. Also, if desired, for the purpose of preventing polymerization inhibition by oxygen, a higher fatty acid derivative such as behenic acid and behenic acid amide may be added and unevenly distributed on the surface of the recording layer in the drying step after coating. The addition amount of the higher fatty acid derivative is preferably from about 0.1% by weight to about 10% by weight of the whole composition.

Also, in order to expand the treatment stability against the development conditions of the recording layer, nonionic surfactants described in JP-A-62-251740 and JP-A-3-208514 or ampholytic surfactants described in JP-A-59-121044 and JP-A-4-13149 can be added.

Specific examples of the nonionic surfactants include sorbitan tristearate, sorbitan monopalmitate, sorbitan trioleate, stearic acid monoglyceride, and polyoxyethylene nonylphenyl ether.

Specific examples of the ampholytic surfactants include alkyldi(aminoethyl) glycines, alkylpolyaminoethyl glycine hydrochlorides, 2-alkyl-N-carboxyethyl-N-hydroxyethylimidazolium betaines, and an N-tetradecyl-N,N-betaine type (for example, a trade name: AMOGEN K, manufactured by DAI-ICHI KOGYO SEIYAKU CO., LTD.).

The proportion of the nonionic surfactant and ampholytic surfactant occupying in the coating liquid for recording layer is preferably from 0.05 to 15% by weight, and more preferably from 0.1 to 5% by weight.

Further, for the purpose of imparting flexibility, etc. to the coating film, a plasticizer is added in the coating liquid for recording layer according to the invention, if desired. Examples of the plasticizer include polyethylene glycol, tributyl citrate, diethyl phthalate, dibutyl phthalate, dihexyl phthalate, dioctyl phthalate, tricresyl phosphate, tributyl phosphate, trioctyl phosphate, and tetrahydrofurfuryl oleate.

(Backcoat Layer)

If desired, a backcoat layer is provided on the back face of the support of the lithographic printing plate precursor according to the invention. As such a backcoat layer, coating layers made of an organic high-molecular compound described in JP-A-5-45885 and a metal oxide obtained by hydrolysis and polycondensation of an organic or inorganic metal compound described in JP-A-6-35174 are preferably used.

Of these coating layers, a coating layer made of a metal oxide which is obtained from a cheaply available alkoxy compound of silicon such as $Si(OCH_3)_4$, $Si(OC_2H_5)_4$, $Si(OC_3H_7)_4$, and $Si(OCH_9)_4$ is excellent in resistance to development and is especially preferable.

(Interlayer)

For the purpose of improving the adhesiveness between the recording layer and the substrate or staining properties, an interlayer may be provided in the lithographic printing plate precursor according to the invention. Specific examples of such an interlayer include ones described in JP-B-50-7481, JP-A-54-72104, JP-A-59-101651, JP-A-60-149491, JP-A-60-232998, JP-A-3-56177, JP-A-4-282637, JP-A-5-16558, JP-A-5-246171, JP-A-7-159983, JP-A-7-314937, JP-A-8-202025, JP-A-8-320551, JP-A-9-34104, JP-A-9-236911, JP-A-9-269593, JP-A-10-69092, JP-A-10-115931, JP-A-10-161317, JP-A-10-260536, JP-A-10-282682, JP-A-11-84674, and Japanese Patent Application Nos. 8-225335, 8-270098, 9-195863, 9-195864, 9-89646, 9-106068, 9-183834, 9-264311, 9-127232, 9-245419, 10-127602, 10-170202, 11-36377, 11-165861, 11-284091 and 2000-14697.

(Protective Layer)

In the lithographic printing plate precursor according to the invention, since the exposure is usually carried out in the air, it is preferable that a protective layer is further provided on the foregoing recording layer. The protective layer prevents incorporation of low-molecular compounds (for example, oxygen and basic substances) present in the air, which likely hinder an image forming reaction generated by exposure in the recording layer, into the recording layer, thereby making it possible to achieve the exposure in the air. Accordingly, the protective layer is desired to have a characteristic such that it has low transmissibility of low-molecular compounds such as oxygen. Further, the protective layer is desired to have properties such that it does not substantially inhibit transmission of light to be used for the exposure, has excellent adhesiveness to the recording layer, and can be easily removed in the development step after the exposure.

Such designs regarding the protective layer have hitherto been made, and the details are described in U.S. Pat. No. 3,458,311 and JP-A-55-49729. As materials which can be used in the protective layer, for example, water-soluble high-molecular compounds having relatively excellent crystallinity are suitably used. As specific examples thereof, water-soluble polymers such as polyvinyl alcohol, polyvinylpyrrolidone, acidic celluloses, gelatin, gum arabic, and polyacrylic acid are known. Above all, when polyvinyl alcohol is used as the major component, the best results are given with respect to basic characteristics such as oxygen shielding properties and development eliminating properties. Since the polyvinyl alcohol to be used in the protective layer has necessary oxygen shielding properties and solubility in water, so far as it contains an unsubstituted vinyl alcohol unit, it may be partially substituted with an ester, an ether or an acetal. Also, a part of the polyvinyl alcohol may similarly have other copolymerization component. In particular, a mixture in which the polyvinyl alcohol is substituted with polyvinylpyrrolidone in the range of from 15 to 50% by weight is preferable from the viewpoint of storage stability.

Specific examples of the polyvinyl alcohol include ones having been hydrolyzed to an extent of from 71 to 100% and having a molecular weight in the range of from 300 to 2,400. Specifically, there are enumerated PVA-105, PVA-110, PVA-117, PVA-117H, PVA-120, PVA-124, PVA-124H, PVA-CS, PVA-CST, PVA-HC, PVA-203, PVA-204, PVA-205, PVA-210, PVA-217, PVA-220, PVA-224, PVA-217EE, PVA-217E, PVA-220E, PVA-224E, PVA-405, PVA-420, PVA-613, and L-8, all of which are manufactured by Kuraray Co., Ltd.

The components (selection of PVA and use of additives) of the protective layer, the coating amount, and the like are selected while taking into consideration fogging properties, adhesiveness and scuff resistance in addition to oxygen shielding properties and development eliminating properties. In general, when the degree of hydrolysis of PVA to be used becomes high (the content of the unsubstituted vinyl alcohol unit in the protective layer becomes high) and the film thickness becomes thick, the oxygen shielding properties becomes higher, and therefore, such is advantageous in view of the sensitivity. However, when the oxygen shielding properties are extremely increased, there are encountered such problems that an unnecessary polymerization reaction is generated at the time of production or storage in the unprocessed state and that unnecessary fogging and thickening of image lines are generated at the time of image exposure. Also, adhesiveness to an image area and scuff resistance are extremely important in handling a plate. That is, when a hydrophilic layer made of a water-soluble polymer is laminated on the lipophilic recording layer, film separation likely occurs due to an insufficient adhesive strength, whereby the separated portion causes film curing failure due to polymerization inhibition of oxygen. In order to overcome this failure, various proposals have been made for the purpose of improving adhesiveness between the two layers. For example, U.S. Pat. Nos. 292,501 and 44,563 describe that sufficient adhesiveness is obtained by mixing from 20 to 60% by weight of an acrylic emulsion or a water-insoluble vinylpyrrolidone-vinyl acetate copolymer in a hydrophilic polymer composed mainly of polyvinyl alcohol and laminating the mixture on a recording layer.

All of these known technologies can be applied to the protective layer in the invention. Such a coating method of the protective layer is described in, for example, U.S. Pat. No. 3,458,311 and JP-A-55-49729.

(Exposure, Development and Printing)

The lithographic printing plate precursor according to the invention can be recorded by infrared laser. Also, the lithographic printing plate precursor according to the invention can be thermally recorded by an ultraviolet lamp or a thermal head. In the invention, it is preferable that the lithographic printing plate precursor is image exposed by solid laser or semiconductor laser capable of radiating infrared light having a wavelength of from 760 nm to 1,200 nm.

After exposing by infrared laser, the lithographic printing plate precursor is preferably developed with water or an alkaline aqueous solution.

In the case where an alkaline aqueous solution is used as a developing solution, conventionally known alkaline aqueous solutions can be used as the developing solution and replenisher of the lithographic printing plate precursor according to the invention. For example, there are enumerated inorganic alkaline salts such as sodium silicate, potassium silicate, sodium tertiary phosphate, potassium tertiary phosphate, ammonium tertiary phosphate, sodium secondary phosphate, potassium secondary phosphate, ammonium secondary phosphate, sodium carbonate, potassium carbonate, ammonium carbonate, sodium hydrogencarbonate, potassium hydrogencarbonate, ammonium hydrogencarbonate, sodium borate, potassium borate, ammonium borate, sodium hydroxide, ammonium hydroxide, potassium hydroxide, and lithium hydroxide. Also, there are employed organic alkaline agents such as monomethylamine, dimethylamine, trimethylamine, monoethylamine, diethylamine, triethylamine, monoisopropylamine, diisopropylamine, triisopropylamine, n-butylamine, monoethanolamine, diethanolamine, triethanolamine, monoisopropanolamine, diisopropanolamine, ethyleneimine, ethylenediamine, and pyridine.

These alkaline agents are used singly or in combinations of two or more kinds thereof.

Further, in the case where the development is carried out using an automatic processor, it is known that by adding one which is the same as the developing solution or an aqueous solution (replenisher) having a higher alkaline strength than the developing solution to the developing solution, a large quantity of lithographic printing plate precursor can be treated without exchanging the developing solution in a development tank over a long period of time. In the invention, this replenishment system is preferably employed, too.

For the purposes of promoting or inhibiting developability, dispersing development scum and enhancing ink-philic properties of an image area of printing plate, various surfactants and organic solvents can be added in the developing solution and replenisher as the need arises. Preferred examples of the surfactant include anionic, cationic, nonionic and ampholytic surfactants. Preferred examples of the organic solvent include benzyl alcohol. Also, the addition of polyethylene glycol or a derivative thereof, or polypropylene glycol or a derivative thereof is preferable. Also, a non-reducing sugar such as arabitol, sorbitol, and mannitol can be added.

Further, hydroquinone, resorcin, inorganic salt based reducing agents such as sodium or potassium sulfite and sodium or potassium hydrogensulfite, organic carboxylic acids, an antifoaming agent, and a water softener can be added in the developing solution and replenisher as the need arises.

The printing plate having been developed using the foregoing developing solution and replenisher is subjected to a post treatment with washing water, a rinse liquid containing a surfactant, etc., and a desensitizing liquid containing gum arabic and a starch derivative. In the case where the curable composition of the invention is used as a printing plate material, a combination of these treatments can be employed as the post treatment.

In recent years, in the plate making and printing industries, for the sake of realizing rationalization and standardization of plate making works, an automatic processor for printing plate material is widely used. This automatic processor is in general comprised of a development section and a post treatment section and comprised of a unit for delivering a printing plate material, respective treatment liquid tanks and a spray unit, and achieves the development treatment by blowing each treatment liquid sucked by a pump from spray nozzles while delivering horizontally the exposed printing plate. Also, recently, there is known a method of treating the printing plate material by dipping and delivering by in-liquid guide rolls in a treatment liquid tank filled with the treatment liquid. In such automatic processing, the treatment can be achieved while replenishing the replenisher in each treatment liquid depending upon the treatment amount and working time. Also, the replenishment can be automatically achieved by detecting the electric conductivity by a sensor.

Also, a so-called disposal treatment system using a substantially unused treatment liquid can be employed.

The thus obtained lithographic printing plate can be provided for a printing step after coating a desensitizing gum, if desired. In the case where it is intended to obtain a lithographic printing plate with a higher printing power, a burning treatment is applied.

In the case of burning the lithographic printing plate, it is preferred to carry out a treatment with a surface conditioning liquid described in JP-B-61-2518, JP-B-55-28062, JP-A-62-31859, and JP-A-61-159655 prior to the burning.

Examples of this method include a method in which a surface conditioning liquid is coated on the lithographic printing plate using a sponge or absorbent cotton impregnated with the surface conditioning liquid; a method in which the printing plate is dipped in a vat filled with a surface conditioning liquid, thereby coating the surface conditioning liquid on the printing plate; and a method of undergoing coating using an automatic coater. Also, after coating, when the coating amount is made uniform using a squeegee or a squeegee roll, more preferred results are given.

In general, the coating amount of the surface conditioning liquid is properly from 0.03 to 0.8 $g/m^2$ (on a dry weight basis).

As the need arises, the lithographic printing plate on which the surface conditioning liquid has been coated is dried and then heated at high temperatures by a burning processor (for example, Burning Processor: BP-1300, which is sold from Fuji Photo Film Co., Ltd.) or the like. In this case, though the heating temperature and time vary depending upon the kind of components forming an image, the heating is preferably carried out at from 180 to 300° C. for from 1 to 20 minutes.

The burning-treated lithographic printing plate is subjected to treatments which are conventionally employed, such as water washing and gumming, as the need arises. In the case where a surface conditioning liquid containing a water-soluble high-molecular compound and the like is used, it is possible to omit a so-called desensitizing treatment such as gumming.

The lithographic printing plate obtained from the curable composition of the invention through the foregoing treatments is set in an offset printing machine, etc. and used for printing a number of sheets.

EXAMPLES

The invention will be described below in detail with reference to the following Examples, but it should not be construed that the invention is limited thereto. In the Examples, a lithographic printing plate precursor which is the most preferred application for the curable composition and the image forming material of the invention is tested, thereby evaluating the curable composition and the image forming material.

(Preparation of Support)

A melt of a JIS A1050 alloy containing 99.5% or more of aluminum, 0.30% of Fe, 0.10% of Si, 0.02% of Ti, and 0.013% of Cu was subjected to a cleaning treatment and cast. The cleaning treatment was carried out by a degasification treatment for the purpose of removing unnecessary gases in the melt such as hydrogen and a treatment using a ceramic tube filter. The casting was carried out by a DC casting process. A solidified ingot having a plate thickness of 500 mm was subjected to facing by 10 mm from the surface and then subjected to a homogenization treatment at 550° C. for 10 hours such that the intermetallic compound did not become coarse.

Next, the ingot was subjected to hot rolling at 400° C., intermediate annealing in a continuous annealing furnace at 500° C. for 60 seconds, and then cold rolling, thereby forming an aluminum rolled plate having a plate thickness of 0.30 mm. By controlling the roughness of the rolled roll, the center line average surface roughness Ra after cold rolling was controlled to be 0.2 μm. Thereafter, the resulting aluminum plate was applied in a tension leveler for the purpose of enhancing the flatness.

Next, for the purpose of obtaining a support for lithographic printing plate, the aluminum plate was subjected to a surface treatment.

First of all, for the purpose of removing a rolling oil on the surface of the aluminum plate, the aluminum plate was subjected to a degreasing treatment with a 10% sodium aluminate aqueous solution at 50° C. for 30 seconds, a neutralization treatment with a 30% sulfuric acid aqueous solution at 50° C. for 30 seconds, and then a smut removal treatment.

Subsequently, for the purposes of improving adhesiveness between the support and the recording layer and imparting water holding properties to a non-image area, the aluminum plate was subjected to a so-called sand blast treatment for roughing the surface of the support. That is, the sand blast treatment was carried out by passing an aluminum web into an aqueous solution containing 1% of nitric acid and 0.5% of aluminum nitrate while keeping the temperature at 45° C. and giving a quantity of electricity at the anode side of 240 C/dm$^2$ by an alternating current waveform having a current density of 20 A/dm$^2$ and a duty ratio of 1/1 by indirect electric supply cells. Thereafter, the aluminum plate was subjected to an etching treatment with a 10% sodium aluminate aqueous solution at 50° C. for 30 seconds, a neutralization treatment with a 30% sulfuric acid aqueous solution at 50° C. for 30 seconds, and then a smut removal treatment.

Further, for the purpose of enhancing abrasion resistance, chemical resistance and water holding properties, an oxidized film was formed on the support by anodic oxidation. That is, the anodic oxidation was carried out by using a 20% sulfuric acid aqueous solution as an electrolyte at 35° C. and undergoing an electrolytic treatment by a direct current of 14 A/dm$^2$ by indirect electric supply cells while delivering the aluminum web into the electrolyte, thereby forming an anodically oxidized film of 2.5 g/m$^2$.

-Polymerizable Composition-

Examples 1 to 11 and Comparative Examples 1 to 2

(Formation of Recording Layer)

A coating liquid 1 for recording layer having the following composition was prepared, coated on the above-obtained aluminum support using a wire bar, and then dried at 115° C. for 45 seconds by a warm air type drying unit, thereby forming a recording layer. The coating amount after drying fell within the range of from 1.2 to 1.3 g/m$^2$. Further, a coating liquid for overcoat layer having the following composition was coated using a slide hopper and dried at 120° C. for 75 seconds by a warm air type drying unit, thereby obtaining a lithographic printing plate precursor according to the invention. The coating amount of the overcoat layer was 2.3 g/m$^2$.

| <Coating liquid 1 for recording layer> | |
|---|---|
| (A) Component: Infrared absorber (a compound shown in Table 1 along with its amount) | |
| (B1) Component: Radical initiator (a compound shown in Table 1) | 0.40 g |
| (C1) Component: Polymerizable compound "M-1" (having a structure as described below) | 2.00 g |
| (D1) Component: Binder polymer (a compound shown in Table 1) | 2.0 g |
| Naphthalenesulfonic acid salt of Victoria Pure Blue | 0.04 g |
| Fluorine based surfactant (MEGAFAC F-176 manufactured by Dainippon Ink and Chemicals, Incorporated) | 0.01 g |
| Methyl ethyl ketone | 9.0 g |
| Methanol | 10.0 g |
| 1-Methoxy-2-propanol | 8.0 g |
| <Coating liquid for overcoat layer> | |
| Polyvinyl alcohol (degree of hydrolysis; 98.5% by mole, degree of polymerization: 500) | 2.3 g |
| Polyvinylpyrrolidone (K30 manufactured by Tokyo Ohka Kogyo Co., Ltd., molecular weight: 40,000) | 0.7 g |
| Nonionic surfactant (EMAREX NP-10 manufactured by Nihon-Emulsion Co., Ltd.) | 0.05 g |
| Ion-exchanged water | 96.95 g |

(Exposure)

The thus obtained negative working lithographic printing plate precursor was exposed using Creo's Trendsetter 3244 VFS mounted with water-cooling 40 W infrared semiconductor laser under conditions with an output of 9 W and at the rotation number of external drum of 210 rpm, plate face energy of 100 mJ/cm$^2$m and resolution of 2,400 dpi.

(Development Treatment)

After the exposure, the printing plate precursor was subjected to a development treatment using an automatic processor: STABLON 900N, manufactured by Fuji Photo Film Co., Ltd. With respect to the developing solution, a 1/4 water-diluted solution of DV-2 manufactured by Fuji Photo Film Co., Ltd. was used for both a charge solution and replenisher. The temperature of a developing bath was set up at 30° C. Also, a 1/1 water-diluted solution of FN-6 having a pH of 10.8, which is manufactured by Fuji Photo Film Co., Ltd., was used as a finisher.

[Evaluation of Resistance to Printing]

The thus obtained lithographic printing plate was subjected to printing using Roland's R-201 as a printing machine and using GEOS-G(N) manufactured by Dainippon Ink and Chemicals, Incorporated as an ink. Solid image portions of printed matters were observed, and resistance to printing was examined in terms of the number of sheets at which the image started to cause separation. The larger the number of sheets, the more excellent the resistance to printing is. The obtained results are also shown in Table 1.

[Evaluation of Sensitivity]

An amount of energy necessary for recording was calculated based on a line width of image obtained by the foregoing exposure (with infrared laser having a wavelength of from approximately 830 to 850 nm) and a laser output, a loss of the optical system and a scanning rate. The smaller the numerical value, the higher the sensitivity is. The obtained results are also shown in Table 1.

TABLE 1

| | Component (A) | Radical initiator | Binder polymer | Sensitivity (mJ/cm$^2$) | Resistance to printing (×10,000) |
|---|---|---|---|---|---|
| Example 1 | (A-1) 0.09 g | S-1 | B-1 | 70 | 6.2 |
| Example 2 | (A-2) 0.10 g | S-1 | B-1 | 55 | 7.5 |
| Example 3 | (A-4) 0.10 g | S-1 | B-1 | 70 | 6.3 |
| Example 4 | (A-5) 0.11 g | S-1 | B-1 | 55 | 8.0 |
| Example 5 | (A-6) 0.12 g | S-1 | B-1 | 55 | 7.8 |
| Example 6 | (A-7) 0.10 g | S-1 | B-1 | 55 | 7.5 |
| Example 7 | (A-7) 0.10 g | S-2 | B-1 | 55 | 7.3 |
| Example 8 | (A-7) 0.10 g | S-3 | B-1 | 60 | 6.5 |
| Example 9 | (A-7) 0.10 g | S-1 | B-2 | 45 | 9.1 |
| Example 10 | (A-8) 0.16 g | S-2 | B-1 | 55 | 7.3 |
| Example 11 | (A-9) 0.18 g | S-2 | B-2 | 45 | 8.9 |
| Comparative Example 1 | (IR-1) 0.10 g | S-1 | B-1 | 90 | 3.2 |
| Comparative Example 2 | (IR-4) 0.12 g | S-1 | B-1 | 90 | 3.2 |

According to the results shown in Table 1, it has been confirmed that the lithographic printing plate precursors of Examples 1 to 11 using the specified infrared absorber (A) which is a characteristic component of the invention are excellent in both the sensitivity and the resistance to printing as compared with those of Comparative Examples 1 to 2 not using the specified infrared absorber (A).

The infrared absorbers used in the Examples are each the specified infrared absorber described in this specification; and the structures of the infrared absorbers (IR-1) to (IR-4) used in the Comparative Examples are ones described below.

(IR-1)

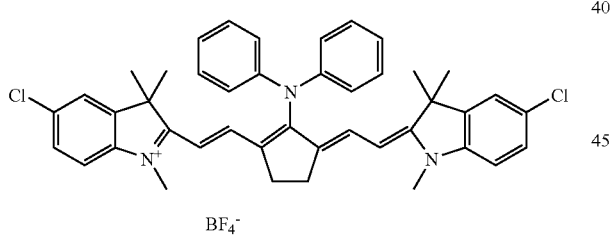

BF$_4^-$ (IR-2)

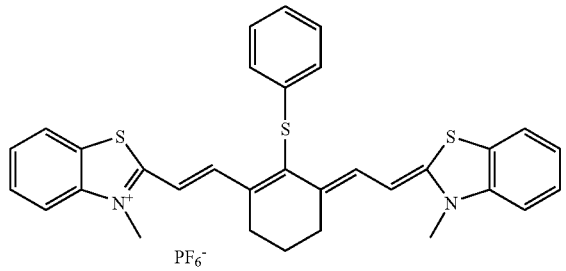

PF$_6^-$

-continued (IR-3)

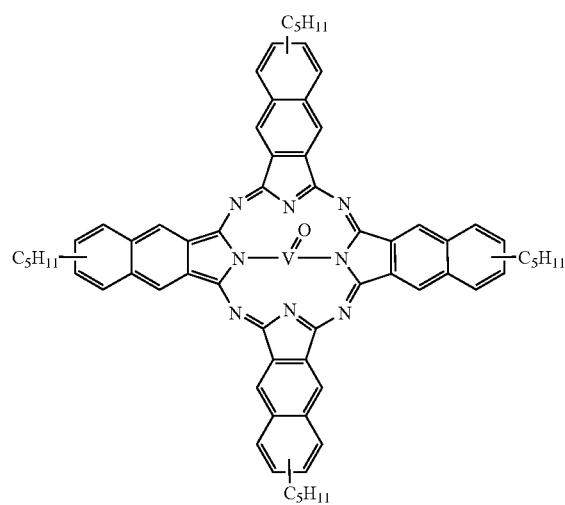

(IR-4)

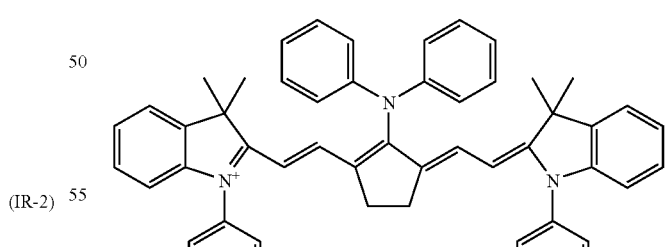

BF$_4^-$

Also, the structures of the radical generators (S-1) to (S-6), the radical polymerizable compounds (M-1) to (M-3), the binder polymers (P-1) to (P-3), and the compound (J-1) as used in the Examples and Comparative Examples are shown below.

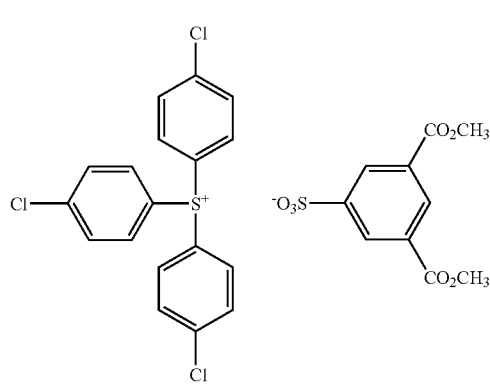 (S-1)
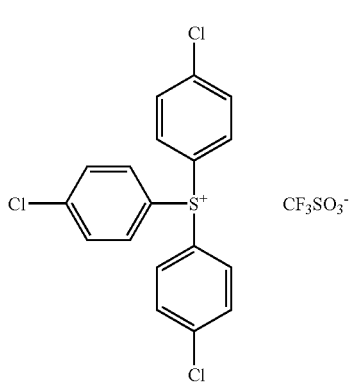 (S-2)
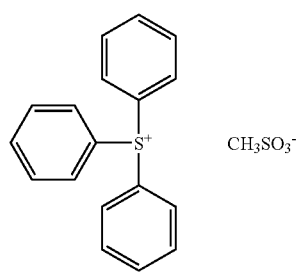 (S-3)
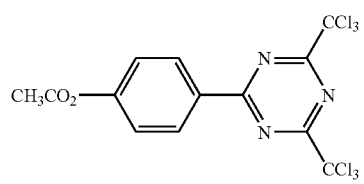 (S-4)
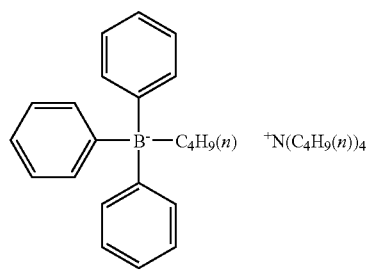 (S-5)
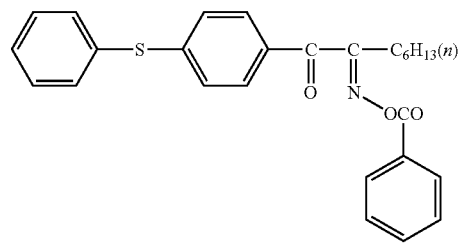 (S-6)
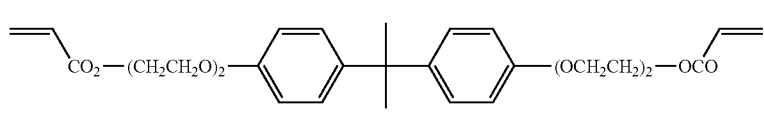 (M-1)
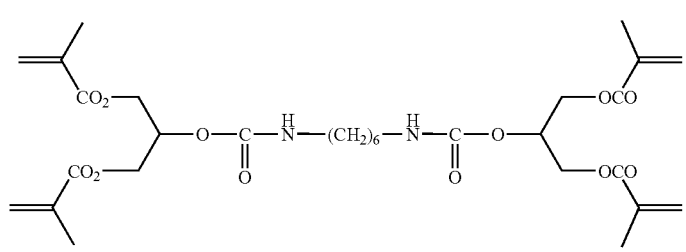 (M-2)
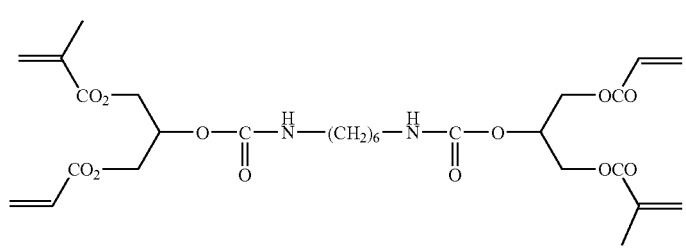 (M-3)

-continued

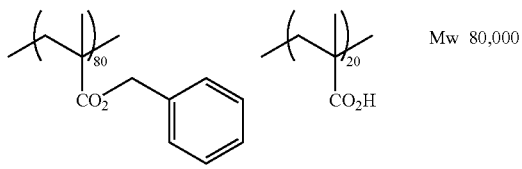
(P-1)

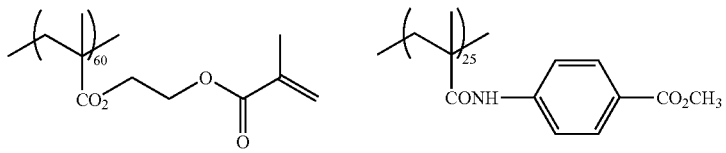
(P-2)

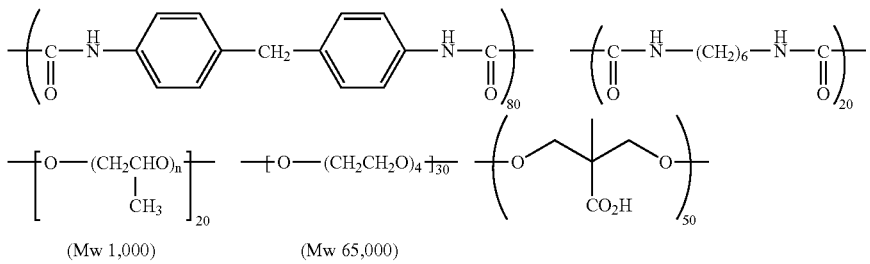
(P-3)

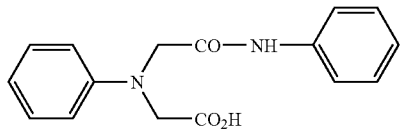
(J-1)

Examples 12 to 20 and Comparative Examples 3 to 4

(Formation of Undercoat Layer)

An undercoating liquid having the following composition was coated on the same aluminum support as in Example 1 and dried at 90° C. for 30 seconds using a warm air type drying unit. The coating amount after drying was 10 mg/m$^2$.

| <Undercoating liquid> | |
| --- | --- |
| β-Alanine | 0.1 g |
| Phenylphosphonic acid | 0.1 g |
| Methanol | 40 g |
| Pure water | 60 g |

(Formation of Recording Layer)

Next, a coating liquid 2 for recording layer having the following composition was prepared, coated on the undercoated aluminum plate using a wire bar, and then dried at 115° C. for 45 seconds by a warm air type drying unit, thereby forming a recording layer. The coating amount of the recording layer after drying fell within the range of from 1.2 to 1.3 g/m$^2$. Further, the same coating liquid for overcoat layer as in Example 1 was coated using a slide hopper and dried at 120° C. for 75 seconds by a warm air type drying unit, thereby obtaining a lithographic printing plate precursor. The coating amount of the overcoat layer was 2.3 g/m$^2$.

| <Coating liquid 2 for recording layer> | |
| --- | --- |
| (A) Component: Infrared absorber (a compound shown in Table 2 along with its amount) | |
| (B1) Component: Radical initiator (S-1) | 0.35 g |
| (C1) Component: Polymerizable compound (a compound shown in Table 2) | 2.10 g |
| (D1) Component: Binder polymer (a compound shown in Table 2) | 1.90 g |
| Compound "J-1" | 0.13 g |
| Naphthalenesulfonic acid salt of Victoria Pure Blue | 0.04 g |
| Fluorine based surfactant (MEGAFAC F-176 manufactured by Dainippon Ink and Chemicals, Incorporated) | 0.01 g |
| Methyl ethyl ketone | 9.0 g |
| Methanol | 10.0 g |
| 1-Methoxy-2-propanol | 8.0 g |

(Exposure and Development Treatment)

The thus obtained negative working lithographic printing plate precursor was subjected to exposure with infrared laser and development treatment in the same manner as in Example 1, thereby obtaining a lithographic printing plate.

[Evaluation of Development Scum]

The presence or absence of deposition of the infrared absorber in the developing solution was visually confirmed. The obtained results are also shown in Table 2.

[Evaluation of Resistance to Printing, Staining Properties of Non-Image Area and Storage Stability]

The thus obtained lithographic printing plate was subjected to printing by a LITHRONE printing machine manufactured by Komori Corporation using GEOS-G(N) BLACK manufactured by Dainippon Ink and Chemicals, Incorporated as an ink. In this case, it was visually measured how many sheets could be printed while keeping a sufficient ink concentration, thereby evaluating resistance to printing and staining properties of a non-image area.

Also, the obtained lithographic printing plate precursor was forcedly stored with time at 60° C. and 3 days and at 45° C. and at a humidity of 75% RH for 3 days, respectively, and then subjected to printing in the same manner, thereby evaluating resistance to printing and staining properties (storage stability) of a non-image area. The obtained results are also shown in Table 2.

Examples 21 to 26 and Comparative Examples 5 to 7

(Formation of Undercoat Layer)

A liquid composition (sol liquid) was prepared on the same aluminum support as in Example 1 by an SG process according the following procedures, thereby providing an undercoat layer.

| <Sol liquid composition> | |
| --- | --- |
| Methanol | 130 g |
| Water | 20 g |
| 85% by weight phosphoric acid | 16 g |
| Tetraethoxysilane | 50 g |
| 3-Methacryloxypropyltrimethoxysilane | 60 g |

The foregoing sol liquid composition was mixed and stirred. After lapsing about 5 minutes, heat generation was found. After reacting for 60 minutes, the contents were transferred into another vessel, to which was then added 3,000 g of methanol, thereby obtaining a sol liquid.

TABLE 2

| | Component (A) | Polymerizable compound | Binder polymer | Not forcedly stored with time | Resistance to printing and staining properties of non-image area At 60° C. for 3 days | At 45° C. and at a humidity of 75 RH % for 3 days | Presence or absence of deposit in developing solution |
| --- | --- | --- | --- | --- | --- | --- | --- |
| Example 12 | (A-13) 0.10 g | M-1 | B-1 | 95,000 sheets Not stained | 95,000 sheets Not stained | 95,000 sheets Not stained | No |
| Example 13 | (A-13) 0.10 g | M-2 | B-1 | 95,000 sheets Not stained | 95,000 sheets Not stained | 95,000 sheets Not stained | No |
| Example 14 | (A-13) 0.10 g | M-3 | B-1 | 95,000 sheets Not stained | 95,000 sheets Not stained | 95,000 sheets Not stained | No |
| Example 15 | (A-13) 0.10 g | M-2 | B-3 | 120,000 sheets Not stained | 120,000 sheets Not stained | 120,000 sheets Not stained | No |
| Example 16 | (A-13) 0.10 g | M-3 | B-3 | 120,000 sheets Not stained | 120,000 sheets Not stained | 120,000 sheets Not stained | No |
| Example 17 | (A-18) 0.10 g | M-1 | B-1 | 75,000 sheets Not stained | 75,000 sheets Not stained | 75,000 sheets Not stained | No |
| Example 18 | (A-19) 0.11 g | M-1 | B-1 | 70,000 sheets Not stained | 70,000 sheets Not stained | 70,000 sheets Not stained | No |
| Example 19 | (A-20) 0.11 g | M-1 | B-1 | 75,000 sheets Not stained | 75,000 sheets Not stained | 75,000 sheets Not stained | No |
| Example 20 | (A-23) 0.12 g | M-1 | B-1 | 75,000 sheets Not stained | 75,000 sheets Not stained | 75,000 sheets Not stained | No |
| Comparative Example 3 | (IR-1) 0.10 g | M-1 | B-1 | 40,000 sheets Not stained | 40,000 sheets Stained | 40,000 sheets Stained | Yes |
| Comparative Example 4 | (IR-2) 0.11 g | M-1 | B-1 | 50,000 sheets Not stained | 50,000 sheets Stained | 25,000 sheets Stained | Yes |

According to the results shown in Table 2, the lithographic printing plate precursors of Examples 12 to 20 using the specified infrared absorber (A) which is a characteristic component of the invention were excellent in resistance to printing, staining properties of a non-image area and storage stability and were free from the generation of a deposit in the developing solution. On the other hand, in Comparative Examples 3 and 4 not using the specified infrared absorber (A), the resistance to printing was inferior, and staining of a non-image are due to forced storage with time was observed. Also, the generation of a deposit was observed in the developing solution.

This sol liquid was diluted with methanol/ethylene group (weight ratio: 9/1), coated on the same support as in Example 1 such that the amount of Si on the support became 30 mg/m$^2$, and then dried at 100° C. for one minute, thereby forming an undercoat layer.

(Formation of Recording Layer)

A coating liquid 3 for recording layer having the following composition was coated on the undercoated aluminum support using a wire bar and dried at 115° C. for 45 seconds by a warm air type drying unit, thereby forming a recording layer. The coating amount of the recording layer after drying fell within the range of from 1.2 to 1.3 g/m$^2$. Further, the same coating liquid for overcoat layer as in Example 1 was coated using a slide hopper and dried at 120° C. for 75 seconds by a warm air type drying unit, thereby obtaining a lithographic printing plate precursor. The coating amount of the overcoat layer was 2.3 g/m².

| <Coating liquid 3 for recording layer> | |
|---|---|
| (A) Component: Infrared absorber (a compound shown in Table 3 along with its amount) | |
| (B1) Component: Radical initiator (a compound shown in Table 3) | 0.35 g |
| (C1) Component: Polymerizable compound "M-1" | 2.00 g |
| (D1) Component: Binder polymer "B-1" | 2.0 g |
| Naphthalenesulfonic acid salt of Victoria Pure Blue | 0.04 g |
| Fluorine based surfactant (MEGAFAC F-176 manufactured by Dainippon Ink and Chemicals, Incorporated) | 0.01 g |
| Methyl ethyl ketone | 9.0 g |
| Methanol | 10.0 g |
| 1-Methoxy-2-propanol | 8.0 g |

(Exposure and Development Treatment)

The thus obtained negative working lithographic printing plate precursor was subjected to exposure with infrared laser and development treatment in the same manner as in Example 1, thereby obtaining a lithographic printing plate.

[Evaluation of Development Scum]

The presence or absence of deposition of the infrared absorber in the developing solution was visually confirmed. The obtained results are also shown in Table 3.

[Evaluation of Sensitivity, Staining Properties of Non-image Area and Storage Stability]

The obtained lithographic printing plate was evaluated with respect to the sensitivity in the same manner as in Example 1.

Also, the obtained lithographic printing plate precursor was evaluated with respect to the staining properties of a non-image area (storage stability) in the same manner as in Example 12. The obtained results are also shown in Table 3.

According to the results shown in Table 3, the lithographic printing plate precursors of Examples 21 to 26 using the specified infrared absorber (A) which is a characteristic component of the invention had high sensitivity, were free from staining in a non-image area due to forced storage with time, and were free from the generation of a deposit in the developing solution. On the other hand, in Comparative Examples 5 to 7 not using the specified infrared absorber (A), a tendency of low sensitivity was observed, and staining of a non-image area due to forced storage with time was observed as compared with those in the Examples. Also, the generation of a deposit was observed in the developing solution.

Examples 27 to 33 and Comparative Examples 8 to 9

(Formation of Undercoat Layer)

The same aluminum support as in Example 1 was subjected to a silicate treatment for the purpose of securing hydrophilicity as a non-image area of printing plate. The treatment was carried out by keeping the temperature of a 1.5% aqueous solution of No. 3 sodium silicate at 70° C., delivering an aluminum web such the contact time became 15 seconds, and further undergoing washing with water. The deposition amount of Si was 10 mg/m². The thus prepared support had an Ra (center line surface roughness) of 0.25 µm.

(Formation of Recording Layer)

A coating liquid 4 for recording layer having the following composition was coated on the undercoated aluminum support using a wire bar and dried at 115° C. for 45 seconds by a warm air type drying unit, thereby forming a recording layer. The coating amount of the recording layer after drying fell within the range of from 1.2 to 1.3 g/m². Further, the same coating liquid for overcoat layer as in Example 1 was coated using a slide hopper and dried at 120° C. for 75 seconds by a warm air type drying unit, thereby obtaining a lithographic printing plate precursor. The coating amount of the overcoat layer was 2.3 g/m².

TABLE 3

| | Component (A) | Radical Initiator | Sensitivity (mJ/cm²) | Resistance to printing and staining properties of non-image area | | | Presence or absence of a deposit in developing solution |
|---|---|---|---|---|---|---|---|
| | | | | Not forcedly stored with time | At 60° C. for 3 days | At 45° C. and at a humidity of 75 RH % for 3 days | |
| Example 21 | (A-10) 0.12 g | S-2 | 40 | Not stained | Not stained | Not stained | No |
| Example 22 | (A-10) 0.12 g | S-4 | 40 | Not stained | Not stained | Not stained | No |
| Example 23 | (A-10) 0.12 g | S-5 | 45 | Not stained | Not stained | Not stained | No |
| Example 24 | (A-10) 0.12 g | S-6 | 40 | Not stained | Not stained | Not stained | No |
| Example 25 | (A-27) 0.12 g | S-2 | 60 | Not stained | Not stained | Not stained | No |
| Example 26 | (A-29) 0.14 g | S-2 | 65 | Not stained | Not stained | Not stained | No |
| Comparative Example 5 | (IR-2) 0.12 g | S-4 | 65 | Not strained | Stained | Stained | Yes |
| Comparative Example 6 | (IR-3) 0.10 g | S-4 | 70 | Not stained | Stained | Stained | Yes |
| Comparative Example 7 | (IR-4) 0.11 g | S-5 | 60 | Not stained | Stained | Stained | Yes |

<Coating liquid 4 for recording layer>

| | |
|---|---|
| (A) Component: Infrared absorber (a compound shown in Table 4 along with its amount) | |
| (B1) Component: Radical generator "S-1" | 0.40 g |
| (C1) Component: Polymerizable compound "M-1" | 1.80 g |
| (D1) Component: Binder polymer "B-1" | 2.20 g |
| Naphthalenesulfonic acid salt of Victoria Pure Blue | 0.04 g |
| Fluorine based surfactant (MEGAFAC F-176 manufactured by Dainippon Ink and Chemicals, Incorporated) | 0.01 g |
| Methyl ethyl ketone | 9.0 g |
| Methanol | 10.0 g |
| 1-Methoxy-2-propanol | 8.0 g |

(Exposure and Development Treatment)

The thus obtained negative working lithographic printing plate precursor was subjected to exposure with infrared laser and development treatment in the same manner as in Example 1, thereby obtaining a lithographic printing plate.

[Evaluation of Resistance to Printing and Sensitivity]

The obtained lithographic printing plate was evaluated with respect to the resistance to printing and the sensitivity in the same manner as in Example 1. The obtained results are also shown in Table 4.

TABLE 4

| | Component (A) | Sensitivity (mJ/cm²) | Resistance to printing (×10,000) | Presence or absence of deposit in developing solution |
|---|---|---|---|---|
| Example 27 | (A-7) 0.12 g | 55 | 8.5 | No |
| Example 28 | (A-24) 0.14 g | 65 | 7.0 | No |
| Example 29 | (A-26) 0.14 g | 50 | 9.0 | No |
| Example 30 | (A-31) 0.16 g | 70 | 6.5 | No |
| Example 31 | (A-33) 0.15 g | 70 | 6.8 | No |
| Example 32 | (A-41) 0.14 g | 65 | 7.2 | No |
| Example 33 | (A-47) 0.13 g | 50 | 9.2 | No |
| Comparative Example 8 | (IR-2) 0.14 g | 110 | 3.9 | Yes |
| Comparative Example 9 | (IR-4) 0.14 g | 80 | 4.5 | Yes |

According to the results shown in Table 4, the lithographic printing plate precursors of Examples 27 to 33 using the specified infrared absorber (A) which is a characteristic component of the invention were excellent in both the sensitivity and the resistance to printing as compared with those of Comparative Examples 8 to 9 not using the specified infrared absorber (A) and were free from the generation of a deposit in the developing solution.

Acid Crosslinking Composition

Examples 34 to 39 and Comparative Examples 10 to 11

(Preparation of Support)

A 0.30 mm-thick aluminum plate (material quality: 1050) was degreased by cleaning with trichloroethylene, and the surface of the aluminum plate was subjected to sand blast using a nylon brush and a 400-mesh pumistone-water suspension and then thoroughly washed with water. This plate was etched by dipping in a 25% sodium hydroxide aqueous solution at 45° C. for 9 seconds and washed with water. The aluminum plate was further dipped in 2% $HNO_3$ for 20 seconds and then washed with water. At this time, the etching amount of the sand blasted surface was about 3 g/m². Next, this plate was provided with an anodically oxidized film of 3 g/m² using 7% $H_2SO_4$ as an electrolytic liquid and using a direct current at a current density of 15 A/dm², washed with water, and then dried. Next, the following undercoating liquid was coated on this aluminum plate and dried at 80° C. for 30 seconds. The coating amount after drying was 10 mg/m².

<Undercoating liquid>

| | |
|---|---|
| β-Alanine | 0.1 g |
| Phenylphosphonic acid | 0.05 g |
| Methanol | 40 g |
| Pure water | 60 g |

(Formation of Recording Layer)

Next, a coating liquid 5 for recording layer having the following composition was prepared, coated on the undercoated aluminum plate using a wire bar, and then dried at 100° C. for one minute by a warm air type drying unit, thereby forming a recording layer. The coating amount after drying was 1.4 g/m².

<Coating liquid 5 for recording layer>

| | |
|---|---|
| (A) Component: Infrared absorber (a compound shown in Table 5 along with its amount) | |
| (B2) Component: Acid generator "SX-1" (having a structure as described below) | 0.2 g |
| (C2) Component: Acid crosslinking agent (a mixture of C2-1/C2-2 (50/50) each having a structure as described below) | 0.6 g |
| (D2) Binder polymer "BX-1" as described below | 1.4 g |
| Coloring agent (VPB-Naps manufactured by Hodogaya Chemical Co., Ltd.) | 0.04 g |
| Silicon based surfactant (TEGO GLIDE 100 (a trade name) manufactured by Tego Chemie Service GmbH) | 0.03 g |
| Methyl ethyl ketone | 1.2 g |
| Methanol | 15.8 g |
| 1-Methoxy-2-propanol | 10.0 g |

The binder polymer "BX-1" used in the foregoing coating liquid 5 for photosensitive layer refers to poly-p-hydroxysytrene (a trade name: MARUKALINKER MH2P, manufactured by Maruzen Petrochemical Co., Ltd.). Also, structures of the acid generator "SX-1" and the crosslinking agents "C2-1" and "C2-2" are shown below.

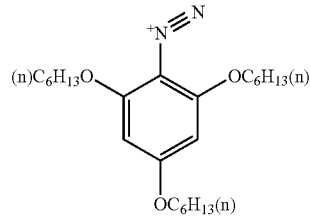

SX-1

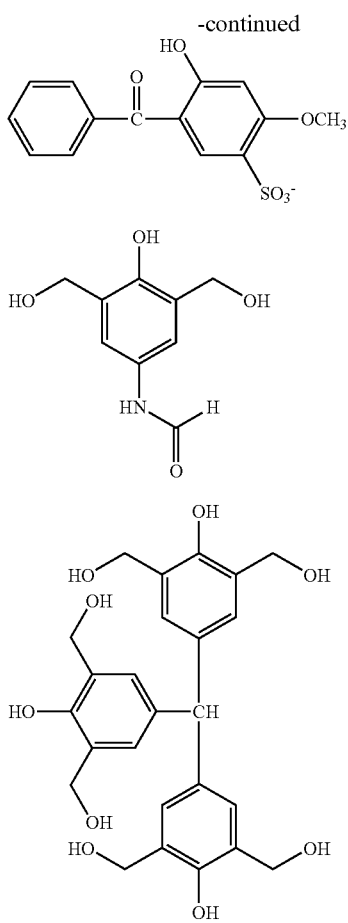

C2-1

C2-2

(Exposure and Development Treatment)

The thus obtained negative working lithographic printing plate precursor was exposed with infrared laser in the same manner as in Example 1.

After the exposure, the printing plate precursor was subjected to a development treatment using an automatic processor: STABLON 900N, manufactured by Fuji Photo Film Co., Ltd., thereby obtaining a lithographic printing plate. With respect to the developing solution, a developing solution: DP-4 (a 1/8 water-diluted solution) manufactured by Fuji Photo Film Co., Ltd. was used for a charge solution; and DP-4RW (a 1/4 water-diluted solution) manufactured by Fuji Photo Film, Co., Ltd. was used as a replenisher. The temperature of a developing bath was set up at 30° C. Also, a 1/1 water-diluted solution of FN-6 manufactured by Fuji Photo Film Co., Ltd. was used as a finisher.

[Evaluation of Sensitivity and Resistance to Printing]

The thus obtained lithographic printing plate was evaluated with respect to the sensitivity and resistance to printing in the same manner as in Example 1. The obtained resins are shown in the following Table 5.

[Evaluation of Staining Properties of Non-image Area and Storage Stability]

The obtained lithographic printing plate was evaluated with respect to the staining properties of a non-image area (storage stability) in the same manner as in Example 12. The obtained results are shown in the following Table 5.

TABLE 5

| | | | | Resistance to printing and staining properties of non-image area | | |
|---|---|---|---|---|---|---|
| | Component (A) | Sensitivity (mJ/cm$^2$) | Resistance to Printing (×10,000) | Not forcedly stored with time | At 60° C. for 3 days | At 45° C. and at a humidity of 75 RH % for 3 days |
| Example 34 | (A-7) 0.12 g | 55 | 8.5 | Not stained | Not stained | Not stained |
| Example 35 | (A-20) 0.14 g | 65 | 7.0 | Not stained | Not stained | Not stained |
| Example 36 | (A-22) 0.14 g | 50 | 9.0 | Not stained | Not stained | Not stained |
| Example 37 | (A-27) 0.16 g | 70 | 6.5 | Not stained | Not stained | Not stained |
| Example 38 | (A-29) 0.15 g | 70 | 6.8 | Not stained | Not stained | Not stained |
| Example 39 | (A-37) 0.14 g | 65 | 7.2 | Not stained | Not stained | Not stained |
| Comparative Example 10 | (IR-2) 0.14 g | 110 | 3.9 | Not stained | Stained | Stained |
| Comparative Example 11 | (IR-4) 0.14 g | 80 | 4.5 | Not stained | Stained | Stained |

According to the results shown in Table 5, it has been confirmed that the lithographic printing plate precursors of Examples 35 to 39 using the specified infrared absorber (A) which is a characteristic component of the invention are excellent in the sensitivity, the resistance to printing, the staining properties of a non-image area, and the storage stability. On the other hand, in Comparative Examples 10 to 11 not using the specified infrared absorber (A), the sensitivity and the resistance to printing were inferior, and staining of a non-image area was found due to forced storage with time.

This application is based on Japanese Patent application JP 2004-73071, filed Mar. 15, 2004, the entire content of which is hereby incorporated by reference, the same as if set forth at length.

What is claimed is:

1. A curable composition comprising:
   (A) an infrared absorber which is a cyanine dye having a structure in which hetero rings are bonded to each other via a methine chain and which has at least one substituent represented by the following formula (T-3):

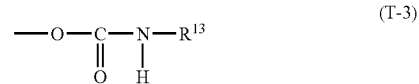

(T-3)

wherein $R^{13}$ represents a monovalent organic group, on at least one of aromatic rings at both ends, nitrogen atoms present on the hetero rings at both ends and the methine chain;
   (B) at least one of a radical generator and an acid generator; and
   (C) at least one of a radical polymerizable compound and an acid crosslinking agent.

2. The curable composition according to claim 1, wherein the cyanine dye is represented by the following formula (I):

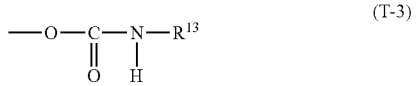

wherein $R^1$ and $R^2$ each independently represents a monovalent organic group; $Ar^1$ and $Ar^2$ each independently represents an optionally substituted aromatic group or heterocyclic group; $Y^1$ and $Y^2$ each independently represents a sulfur atom, an oxygen atom, a selenium atom, a dialkylmethylene group having not more than 12 carbon atoms or a —CH=CH— group; Q represents a pentamethine group or a heptamethine group; and $X^-$ represents an anion, provided that at least one of $R^1$, $R^2$, $Ar^1$, $Ar^2$ and Q has at least one substituent having the structure represented by (T-3).

3. The curable composition according to claim 1, wherein the cyanine dye is represented by the following formula (II):

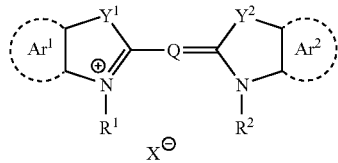

wherein $R^1$ and R2 each independently represents a monovalent organic group; $Ar^1$ and $Ar^2$ each independently represents an optionally substituted aromatic group or heterocyclic group; $Y^1$ and $Y^2$ each independently represents a sulfur atom, an oxygen atom, a selenium atom, a dialkylmethylene group having not more than 12 carbon atoms or a —CH=CH— group; $X^-$ represents an anion; $R^3$, $R^4$, $R^7$, and $R^8$ each independently represents a hydrogen atom or a monovalent organic group; and $R^5$ and $R^6$ each independently represents a hydrogen atom or a monovalent organic group and may be taken together to form a ring structure; and $R^9$ and $R^{10}$ each independently represents a monovalent organic group and may be taken together to form a ring structure, provided that at least one of $R^1$ to $R^{10}$, $Ar^1$ and $Ar^2$ has at least one substituent having the structure represented by (T-3).

4. The curable composition according to claim 1, wherein the cyanine dye is represented by the following formula (III):

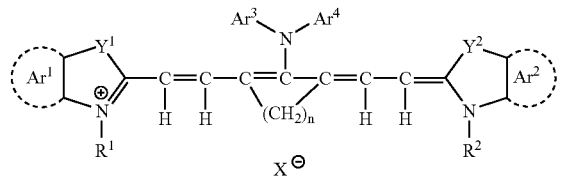

wherein $R^1$ and $R^2$ each independently represents a monovalent organic group; $Ar^1$ and $Ar^2$ each independently represents an optionally substituted aromatic group or heterocyclic group; $Y^1$ and $Y^2$ each independently represents a sulfur atom, an oxygen atom, a selenium atom, a dialkylmethylene group having not more than 12 carbon atoms or a —CH=CH— group; $X^-$ represents an anion; n represents 1 or 2; and $Ar^3$ and $Ar^4$ each independently represents an optionally substituted aromatic group or heterocyclic group, provided that at least one of $R^1$, $R^2$, $Ar^1$, $Ar^2$, $Ar^3$ and $Ar^4$ has at least one substituent having the structure represented by (T-3).

5. An image forming material comprising a support and a recording layer containing:
   (A) an infrared absorber which is a cyanine dye having a structure in which hetero rings are bonded to each other via a methine chain and which has at least one substituent having a structure represented by the following formula (T-3):

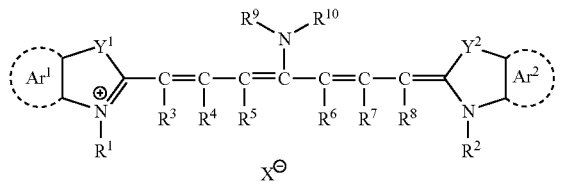

(T-3)

wherein $R^{13}$ represents a monovalent organic group, on at least one of aromatic rings at both ends, nitrogen atoms present on the hetero rings at both ends and the methine chain;
   (B) at least one of a radical generator and an acid generator; and
   (C) at least one of a radical polymerizable compound and an acid crosslinking agent.

* * * * *